US012536578B2

(12) United States Patent
Malgarini et al.

(10) Patent No.: US 12,536,578 B2
(45) Date of Patent: Jan. 27, 2026

(54) CONTACTLESS CHECKOUT SYSTEM WITH THEFT DETECTION

(71) Applicant: LEAV INC., Montreal (CA)

(72) Inventors: Kevin Malgarini, Montreal (CA); Olivier Roy, Montreal (CA); Evgeny Grachev, Montreal (CA); Charles-étienne Simard, Montreal (CA); Ghazaleh Torabi, Montreal (CA)

(73) Assignee: Leav Inc., Montreal (CA)

( * ) Notice: Subject to any disclaimer, the term of this patent is extended or adjusted under 35 U.S.C. 154(b) by 36 days.

(21) Appl. No.: 18/603,361

(22) Filed: Mar. 13, 2024

(65) Prior Publication Data

US 2024/0249342 A1 Jul. 25, 2024

Related U.S. Application Data

(63) Continuation of application No. PCT/CA2022/051382, filed on Sep. 17, 2022.

(Continued)

(51) Int. Cl.
*G06Q 30/0601* (2023.01)
*G06T 7/20* (2017.01)

(Continued)

(52) U.S. Cl.
CPC ..... *G06Q 30/0633* (2013.01); *G06Q 30/0643* (2013.01); *G06T 7/20* (2013.01);

(Continued)

(58) Field of Classification Search
CPC .......... G06Q 30/06333; G06Q 30/0643; G06T 7/70; G06T 7/20; G06V 20/52; G06V 40/20

See application file for complete search history.

(56) References Cited

U.S. PATENT DOCUMENTS 9,311,645 B2 4/2016 Edwards et al.
10,001,402 B1 6/2018 Gyori et al.

(Continued)

OTHER PUBLICATIONS

Wankhede, Kirti, Bharati Wukkadada, and Vidhya Nadar. "Just walk-out technology and its challenges: A case of Amazon Go." 2018 International Conference on Inventive Research in Computing Applications (ICIRCA). IEEE, 2018. (Year: 2018).*

(Continued)

*Primary Examiner* — Peter H Choi
(74) *Attorney, Agent, or Firm* — Smart and Biggar LP

(57) ABSTRACT

A contactless checkout system with theft detection, and related methods and devices. An inventory of an electronic shopping cart of a user in a retail environment and a virtual inventory of a physical shopping container in possession of the user in the retail environment are maintained. Actions performed by the user, such as placing or removing an item from the physical shopping container, are detected using computer vision. An item associated with each detected action is determined using computer vision based on an inventory storage location at which the detected action occurred. The virtual inventory of the physical shopping container is updated based on detected actions and the associated items. An alert is generated in response to a determination that the virtual inventory of the physical shopping container does not match the inventory of the electronic shopping cart.

20 Claims, 21 Drawing Sheets

Related U.S. Application Data

(60) Provisional application No. 63/245,580, filed on Sep. 17, 2021.

(51) Int. Cl.
*G06T 7/70* (2017.01)
*G06V 20/52* (2022.01)
*G06V 40/20* (2022.01)

(52) U.S. Cl.
CPC ................ *G06T 7/70* (2017.01); *G06V 20/52* (2022.01); *G06V 40/20* (2022.01); *G06V 2201/07* (2022.01)

(56) References Cited

U.S. PATENT DOCUMENTS

| | | | | |
|---|---|---|---|---|
| 10,064,502 | B1 | 9/2018 | Gyori et al. | |
| 10,192,408 | B2 | 1/2019 | Schoner | |
| 10,268,983 | B2 | 4/2019 | Kumar et al. | |
| 10,332,117 | B2 | 6/2019 | Krause | |
| 10,339,385 | B1 * | 7/2019 | Truong | G06Q 30/0201 |
| 10,740,742 | B2 | 8/2020 | Glaser et al. | |
| 10,846,996 | B2 | 11/2020 | Schoner | |
| 10,853,965 | B2 | 12/2020 | Fisher et al. | |
| 10,861,085 | B1 | 12/2020 | Magee et al. | |
| 10,861,086 | B2 | 12/2020 | Glaser et al. | |
| 2007/0182818 | A1 | 8/2007 | Buehler | |
| 2011/0145093 | A1 * | 6/2011 | Paradise | G06Q 30/02 705/26.1 |
| 2014/0362223 | A1 * | 12/2014 | LaCroix | H04N 7/183 348/150 |
| 2015/0012426 | A1 * | 1/2015 | Purves | G02B 27/017 705/41 |
| 2016/0189277 | A1 | 6/2016 | Davis | |
| 2016/0196575 | A1 * | 7/2016 | Uchida | G06Q 30/0255 705/14.45 |
| 2017/0255947 | A1 * | 9/2017 | Horikawa | G06V 40/20 |
| 2018/0232796 | A1 | 8/2018 | Glaser et al. | |
| 2019/0138986 | A1 | 5/2019 | Puerini | |
| 2019/0318417 | A1 | 10/2019 | Gumaru et al. | |
| 2019/0337549 | A1 | 11/2019 | Lobo et al. | |
| 2020/0111107 | A1 | 4/2020 | Herrington et al. | |
| 2021/0027360 | A1 | 1/2021 | Shmueli | |
| 2021/0201253 | A1 | 7/2021 | Fisher et al. | |
| 2021/0287226 | A1 | 9/2021 | Bondareva et al. | |

OTHER PUBLICATIONS

Liu, Chengji, et al. "Object detection based on YOLO network." 2018 IEEE 4th information technology and mechatronics engineering conference (ITOEC). IEEE, 2018. (Year: 2018).*

Polacco, Alex, and Kayla Backes. "The amazon go concept: Implications, applications, and sustainability." Journal of Business and Management 24.1 (2018): 79-92. (Year: 2018).*

Tompson, Jonathan, Arjun Jain, Yann LeCun, and Christoph Bregler. "Joint training of a convolutional network and a graphical model for human pose estimation." Advances in neural information processing systems 27 (2014). (Year: 2014).*

Tonioni, Alessio, Eugenio Serra, and Luigi Di Stefano. "A deep learning pipeline for product recognition on store shelves." 2018 IEEE International Conference on Image Processing, Applications and Systems (IPAS). IEEE, 2018. (Year: 2018).*

Qingyang Xu, Wanqiang Zheng, Xiaoxiao Liu & Punan Jing (2020) Deep Learning Technique Based Surveillance Video Analysis for the Store, Applied Artificial Intelligence, 34:14, 1055-1073 (Year: 2020).*

Notification of Transmittal of the International Search Report and Written Opinion; Dec. 23, 2022; PCT/CA2022/051382.

Alexander Toshev and Christian Szegedy, DeepPose: Human Pose Estimation via Deep Neural Networks, IEEE Conference on Computer Vision and Pattern Recognition, 9 pages, Aug. 20, 2014.

Jonathan Tompson, Ross Goroshin, Arjun Jain, Yann LeCun and Christopher Bregler, Efficient Object Localization Using Convolutional Networks, New York University, 9 pages, Jun. 9, 2015.

Shih-En Wei, Varun Ramakrishna, Takeo Kanade and Yaser Sheikh, Convolutional Pose Machines, The Robotics Institute, Carnegie Mellon University, 9 pages, Apr. 12, 2016.

Joao Carreira, Pulkit Agrawal, Katerina Fragkiadaki and Jitendra Malik, Human Pose Estimation with Iterative Error Feedback, 10 pages, Jun. 2, 2016.

Alejandro Newell, Kaiyu Yang and Jia Deng, Stacked Hourglass Networks for Human Pose Estimation, University of Michigan, 17 pages, Jul. 26, 2016.

Bin Xiao, Haiping Wu and Yichen Wei, Simple Baselines for Human Pose Estimation and Tracking, ECCV 2018, 16 pages, Aug. 21, 2018.

Ke Sun, Bin Xiao, Dong Liu and Jingdong Wang, Deep High-Resolution Representation Learning for Human Pose Estimation, 12 pages, Feb. 25, 2019.

Todd Bishop, How 'Amazon Go' works: The technology behind the online retailer's groundbreaking new grocery store, Geek Wire, http://www.geekwire.com/2016/amazon-go-works-technology-behind-online-retailers-groundbreaking-new-grocery-store/, 10 pages, Dec. 5, 2016.

Alan Boyle, Fresh patents served up for the smart shelf technologies seen in Amazon Go stores, Geek Wire, https://www.geekwire.com/2018/fresh-patents-served-smart-shelf-technologies-seen-amazon-go-stores/, 11 pages, Sep. 4, 2018.

Maggie Tillman, Amazon Go and Amazon Fresh: How the 'Just walk out' tech works, Pocket Lint, https://www.pocket-lint.com/gadgets/news/amazon/139650-what-is-amazon-go-where-is-it-and-how-does-it-work, 13 pages, at least as early as Mar. 4, 2021.

Unknown author, Never Wait in Line to Check Out Again, Published in: Amazon.com, https://www.amazon.com/b/ref=s9_acss_bw_cg_agojwo_1a1_w?node=20931388011&pf_rd_m=ATVPDKIKX0DER&pf_rd_s=merchandised-search-2&pf_rd_r=FRV5DB6AMZ1NYHADQH0W&pf_rd_t=101&pf_rd_p=202bb5f6-3afe-4534-ad20-9eb246c4051a&pf_rd_i=16008589011, 6 pages.

Gabriela Barkho, Walmart Confirms Use of AI-Powered Cameras to Detect Stealing, The Observer, Publication Date: Jun. 27, 2019, https://observer.com/2019/06/walmart-ai-cameras-detect-stealing/, 3 pages.

Unknown author, COCO 2020 Keypoint Detection Task, Common Objects in Context, (COCO), https://cocodataset.org/#keypoints-2020, Aug. 23, 2020, 4 pages.

Mykhaylo Andriluka, Leonid Pishchulin , Peter Gehler, and Bernt Schiele, http://human-pose.mpi-inf.mpg.de/, 2014, 2 pages.

Mykhaylo Andriluka, Leonid Pishchulin, Peter Gehler, and Bernt Schiele, 2D Human Pose Estimation: New Benchmark and State of the Art Analysis, 2014 IEEE Conference on Computer Vision and Pattern Recognition, Jun. 23-28, 2014, 8 pages.

Vikas Gupta, Deep Learning based Human Pose Estimation using OpenCV, https://learnopencv.com/deep-learning-based-human-pose-estimation-using-opencv-cpp-python, May 29, 2018, 15 pages.

Redmon, Joseph and Farhadi, Ali, YOLO: Real-Time Object Detection: YOLOv3: An Incremental Improvement, https://pjreddie.com/darknet/yolo/, 2018, 11 pages.

Zheng Ge, Songtao Liu, Feng Wang, Zeming Li, Jian Sun, YOLOX: Exceeding YOLO Series in 2021, arXiv:2107.08430, Aug. 6, 2021.

Chien-Yao Wang, Alexey Bochkovskiy, Hong-Yuan Mark Liao, YOLOv7: Trainable bag-of-freebies sets new state-of-the-art for real-time object detectors, arXiv:2207.02696, Wed, Jul. 6, 2022.

Chien-Yao Wang, I-Hau Yeh, Hong-Yuan Mark Liao, You Only Learn One Representation: Unified Network for Multiple Tasks, arXiv:2105.04206, May 10, 2021.

Ke Sun, Bin Xiao, Dong Liu, Jingdong Wang, Deep High-Resolution Representation Learning for Human Pose Estimation, arXiv:1902.09212, Feb. 25, 2019.

Zigang Geng, Ke Sun, Bin Xiao, Zhaoxiang Zhang, Jingdong Wang, Bottom-Up Human Pose Estimation via Disentangled Keypoint Regression, arXiv:2104.02300, Apr. 6, 2021.

Nicolai Wojke, Alex Bewley, Dietrich Paulus, Simple Online and Realtime Tracking with a Deep Association Metric, arXiv:1703.07402, Mar. 21, 2017.

(56) References Cited

OTHER PUBLICATIONS

Yifu Zhang, Peize Sun, Yi Jiang, Dongdong Yu, Fucheng Weng, Zehuan Yuan, Ping Luo, Wenyu Liu, Xinggang Wang, ByteTrack: Multi-Object Tracking by Associating Every Detection Box, arXiv:2110.06864, Apr. 7, 2022.
Zhongdao Wang, Liang Zheng, Yixuan Liu, Yali Li, Shengjin Wang, Towards Real-Time Multi-Object Tracking, arXiv:1909.12605, Jul. 14, 2020.
H. W. Kuhn, The Hungarian method for the assignment problem, Naval Research Logistics Quarterly, vol. 2, Issue 1-2, Mar. 1955, pp. 83-97, https://doi.org/10.1002/nav.3800020109.
Dan Kondratyuk, Liangzhe Yuan, Yandong Li, Li Zhang, Mingxing Tan, Matthew Brown, Boqing Gong, MoViNets: Mobile Video Networks for Efficient Video Recognition, arXiv:2103.11511v2, Apr. 18, 2021.
Michael Snower, Asim Kadav, Farley Lai, Hans Peter Graf, 15 Keypoints Is All You Need, arXiv:1912.02323, Mar. 13, 2020.
Ashish Vaswani, Noam Shazeer, Niki Parmar, Jakob Uszkoreit, Llion Jones, Aidan N. Gomez, Lukasz Kaiser, Illia Polosukhin, Attention Is All You Need, arXiv:1706.03762, Dec. 6, 2017.
Guanghan Ning, Heng Huang, LightTrack: A Generic Framework for Online Top-Down Human Pose Tracking, arXiv:1905.02822, May 7, 2019.
Kaiming He, Xiangyu Zhang, Shaoqing Ren, Jian Sun, Deep Residual Learning for Image Recognition, arXiv:1512.03385, Dec. 10, 2015.
Rudolph Emil Kalman, A New Approach to Linear Filtering and Prediction Problems, Transactions of the ASME, Journal of Basic Engineering, vol. 82, Series D, pp. 35-45, 1960.
Liang Zheng, Liyue Shen, Lu Tian, Shengjin Wang, Jingdong Wang, Q. Tian, Scalable Person Re-identification: A Benchmark, Published Dec. 7, 2015, Computer Science, 2015 IEEE International Conference on Computer Vision (ICCV), https://www.cv-foundation.org/openaccess/content_iccv_2015/papers/Zheng_Scalable_Person_Re-Identification_ICCV_2015_paper.pdf.
https://en.wikipedia.org/wiki/Cosine_similarity.
https://en.wikipedia.org/wiki/Mahalanobis_distance.
Zhengyou Zhang, A Flexible New Technique for Camera Calibration, Technical Report MSR-TR-98-71, Dec. 2, 1998, https://www.microsoft.com/en-us/research/wp-content/uploads/2016/02/tr98-71.pdf.
Mark Hedley Jones, Calibration Checkerboard Collection, https://markhedleyjones.com/projects/calibration-checkerboard-collection, Apr. 15, 2018.
Tsung-Yi Lin, Michael Maire, Serge Belongie, Lubomir Bourdev, Ross Girshick, James Hays, Pietro Perona, Deva Ramanan, C. Lawrence Zitnick, Piotr Dollár, Microsoft COCO: Common Objects in Context, arXiv:1405.0312, Feb. 21, 2015.
Mykhaylo Andriluka, Leonid Pishchulin, Peter Gehler and Bernt Schiele, 2D Human Pose Estimation: New Benchmark and State of the Art Analysis, 2014 IEEE Conference on Computer Vision and Pattern Recognition, Jun. 23-28, 2014, DIO 10.1109/CVPR.2014.471, https://openaccess.thecvf.com/content_cvpr_2014/papers/Andriluka_2D_Human_Pose_2014_CVPR_paper.pdf.
Patrick Dendorfer, Hamid Rezatofighi, Anton Milan, Javen Shi, Daniel Cremers, Ian Reid, Stefan Roth, Konrad Schindler, and Laura Leal-Taixe, MOT20: A benchmark for multi object tracking in crowded scenes, arXiv:2003.09003, Mar. 19, 2020.
Joao Carreira, Eric Noland, Andras Banki-Horvath, Chloe Hillier and Andrew Zisserman, A Short Note about Kinetics-600, arXiv:1808.01340, Aug. 3, 2018.
Sijie Yan, Yuanjun Xiong, Dahua Lin, Spatial Temporal Graph Convolutional Networks for Skeleton-Based Action Recognition, arXiv:1801.07455, Jan. 25, 2018.
Philipp Bergmann, Tim Meinhardt, Laura Leal-Taixe, Tracking without bells and whistles, arXiv:1903.05625, Aug. 17, 2019.

* cited by examiner

9:41
leav.com
Total to Pay
$183.91
Double Click to Pay
Pay
Cancel
APPLE CARD
683 JEFFERSON STREET, TIB...
SHIPPING
JOHN APPLESEED
683 JEFFERSON STREET
TIBURON, CA 94920
METHOD
EXPRESS SHIPPING.
CONTACT
J.APPLESEED@ICLOUD.COM
(408) 555-0198
Subtotal $159.95
TPS $8.00
TVQ $15.96
PAY APPLE $183.91
Confirm with Button

FIG. 6F

CONTACTLESS CHECKOUT SYSTEM WITH THEFT DETECTION

RELATED APPLICATION DATA

The present application is a continuation of international PCT patent application no. PCT/CA2022/051382, filed Sep. 17, 2022, which claims priority to, and the benefit of, provisional U.S. patent application No. 63/245,580, filed Sep. 17, 2021, the content of which is incorporated herein by reference.

TECHNICAL FIELD

The present disclosure relates to checkout systems, and more specifically, to a contactless checkout system with theft detection, and more specifically, to a contactless payment system with theft detection.

BACKGROUND

Checkout systems are electronic inventory systems used to transfer ownership or custody of items. Checkout systems are commonly used in libraries and retail environments. Checkout systems in retail environments may also be configured to process payments for retail transactions (e.g., sales). A retail transaction in a physical store of a merchant typically involves the use of a cash register or point-of-sale (POS) terminal to scan items and accept payment from a customer. A representative of the merchant (commonly referred to as a cashier) processes the items for purchase by the customer and initiates a payment transaction via the cash register or POS terminal. The customer completes the payment transaction via cash, credit, debit or other accepted means of payment.

Although contactless checkout systems that do not involve a cash register, POS terminal or merchant representative have been proposed, theft prevention remains an obstacle to wide adoption of contactless checkout systems.

SUMMARY

The present disclosure provides a contactless checkout system with theft detection, and related methods and devices. An inventory of an electronic shopping cart of a user in a retail environment and a virtual inventory of a physical shopping container in possession of the user in the retail environment are maintained. Multiple data sources, including data comprised or derived from computer vision (CV) and radio frequency identification (RFID), are provided to detect actions performed by a person in a retail environment to determine the virtual inventory of the physical shopping container in the possession of the user. Actions performed by the user, such as placing or removing an item from the physical shopping container, are detected using computer vision. An item associated with each detected action is determined using computer vision based on an inventory storage location at which the detected action occurred. The virtual inventory of the physical shopping container is updated based on detected actions and the associated items. The virtual inventory of the physical shopping container is compared to the inventory of an electronic shopping cart on a wireless communication device such as a smartphone. An alert is generated in response to a determination that the determined inventory of the physical shopping container does not match the inventory of the electronic shopping cart. The present disclosure provides a solution for detecting theft in a retail environment utilizing a contactless checkout system at a low computational cost.

In accordance with a first aspect of the present disclosure, there is provided a method performed by a computing device of maintaining virtual inventories of physical shopping containers in possession of persons in a retail environment, comprising: detecting, via a computer vision system, each person in a video frame captured by a camera located in the retail environment; determining, via the computer vision system, a pose of each detected person in the video frame from the respective coordinates of the detected person; tracking, via the computer vision system, each detected person in the video frame and one or more previous video frames; determining, via the computer vision system, a set of actions associated with each detected person in a sequence of video frames consisting of the video frame and one or more previous video frames, wherein the set of actions comprise an action of placing an item in the physical shopping container and an action of removing an item from the physical shopping container, wherein a first set of confidence scores for the set of actions is output in response to determining the set of actions, one confidence score associated with each action in the set of actions; localizing the coordinates of each detected person within the retail environment in a three-dimensional (3D) coordinate system using camera parameters; determining, via the computer vision system, a set of items associated with the set of actions of each detected person based on an inventory storage location associated with the localized coordinates of the respective person within the retail environment and a planogram of the retail environment, wherein a second set of confidence scores for the set of items is output in response to determining the set of items, one confidence score associated with each item in the set of items; associating each detected person with an inventory of an electronic shopping cart of a shopping application, wherein the electronic shopping cart is associated with an active session of a user; and updating the virtual inventory of the physical shopping containers for each detected person in response to a determination that, for the respective person, both the confidence score of an action in the set of actions having the highest confidence score exceeds an action confidence threshold and the confidence score of an item in the set of items having the highest confidence score exceeds an item confidence threshold.

In some or all examples of the first aspect, updating the virtual inventory of the physical shopping container comprises one of: adding the item having the highest confidence score to the virtual inventory of the physical shopping container in response to detection of an item being added to the physical shopping container; or removing the item having the highest confidence score from the virtual inventory of the physical shopping container in response to detection of an item being removed from the physical shopping container.

In some or all examples of the first aspect, updating the virtual inventory of the physical shopping container comprises: in response to detection of an item being added to the physical shopping container, the item is added to the virtual inventory of the physical shopping container; and in response to detection of an item being removed from the physical shopping container, the item is removed from the virtual inventory of the physical shopping container.

In some or all examples of the first aspect, the method further comprises: performing a security check in response to a trigger, wherein performing a security check comprises determining whether the virtual inventory of the physical shopping container matches the inventory of the electronic shopping cart; and generating an alert in response to a determination that the virtual inventory of the physical shopping container does not match the inventory of the electronic shopping cart.

In some or all examples of the first aspect, the trigger is one of receiving input from a wireless communication device of the user to perform an electronic checkout or a determination that the user and/or physical shopping container is in a detection zone of the retail environment.

In some or all examples of the first aspect, in response to the trigger comprising receiving input from the wireless communication device of the user to perform an electronic checkout, the electronic checkout is not allowed to proceed in response to the generation of the alert.

In some or all examples of the first aspect, the detection zone is an entrance/exit zone of the retail environment.

In some or all examples of the first aspect, the trigger is detection of a radio frequency identification (RFID) tag by an RFID reader located in a detection zone of the retail environment.

In some or all examples of the first aspect, the detection zone is an entrance/exit zone of the retail environment.

In some or all examples of the first aspect, determining whether the virtual inventory of the physical shopping container matches the inventory of the electronic shopping cart comprises: comparing items in the virtual inventory of the physical shopping container with the inventory of the electronic shopping cart; and determining any items in the virtual inventory of the physical shopping container that are not in the electronic shopping cart; wherein a determination that virtual inventory of the physical shopping container does not match the inventory of the electronic shopping cart is made in response to a determination that one or more items in the virtual inventory of the physical shopping container are not in the electronic shopping cart.

In some or all examples of the first aspect, determining whether the virtual inventory of the physical shopping container matches the inventory of the electronic shopping cart comprises: determining any items associated with an RFID tag in the virtual inventory of the physical shopping container; comparing any items associated with an RFID tag in the virtual inventory of the physical shopping container with the inventory of the electronic shopping cart; and determining any items in the virtual inventory of the physical shopping container associated with an RFID tag that are not in the electronic shopping cart based on the comparing; wherein a determination that the virtual inventory of the physical shopping container does not match the inventory of the electronic shopping cart is made in response to a determination that one or more items in the virtual inventory of the physical shopping container associated with an RFID tag are not in the electronic shopping cart.

In some or all examples of the first aspect, the method further comprises: determining a confidence score that the virtual inventory of the physical shopping container does not match the inventory of the electronic shopping cart; wherein the alert is generated in response to a determination that the confidence score exceeds a confidence threshold.

In some or all examples of the first aspect, the alert comprises an audible alert generated via a speaker.

In some or all examples of the first aspect, the speaker is located in a detection zone of the retail environment.

In some or all examples of the first aspect, the alert comprises a visual alert generated via a light.

In some or all examples of the first aspect, the light is located in a detection zone of the retail environment.

In some or all examples of the first aspect, the alert comprises an electronic alert.

In some or all examples of the first aspect, the computer vision system has been trained by artificial intelligence or machine learning.

In some or all examples of the first aspect, the computer vision system comprises a trained neural network.

In some or all examples of the first aspect, an electronic checkout is not allowed to proceed in response to a determination that the virtual inventory of the physical shopping container does not match the inventory of the electronic shopping cart.

In some or all examples of the first aspect, an electronic checkout is allowed to proceed in response to a determination that the virtual inventory of the physical shopping container matches the inventory of the electronic shopping cart.

In some or all examples of the first aspect, the method further comprises: generating an alert in response to a determination that the virtual inventory of the physical shopping container matches the inventory of the electronic shopping cart while the user and/or physical shopping container is in a detection zone of the retail environment and the electronic shopping cart has an unpaid cart status.

In some or all examples of the first aspect, the method further comprises: adding and removing items from the inventory of the electronic shopping cart in response to inputs received via a visual user interface (VUI) of the electronic shopping application operating on a wireless communication device of the user.

In some or all examples of the first aspect, the method further comprises: maintaining, via data received by a wireless communication device of the user, the inventory of the electronic shopping cart.

In some or all examples of the first aspect, the item associated with each detected action is determined based on an identification of an inventory storage area and an identification of a product area in the inventory storage area performed by computer vision.

In accordance with a second aspect of the present disclosure, there is provided a method performed by a computing device for operating a contactless checkout system. The method comprises: maintaining, via data received by a wireless communication device of the user, an inventory of an electronic shopping cart of a user in a retail environment; maintaining, via a sensor data collected by sensors in the retail environment, a virtual inventory of a physical shopping container in possession of the user in the retail environment; updating the virtual inventory of the physical shopping container based on each detected action and the associated item; performing a security check in response to a trigger, wherein performing a security check comprises determining whether the virtual inventory of the physical shopping container matches the inventory of the electronic shopping cart; and generating an alert in response to a determination that the virtual inventory of the physical shopping container does not match the inventory of the electronic shopping cart.

In some examples of the second aspect, the maintaining the virtual inventory of the physical shopping container in possession of the user comprises: detecting, via a computer vision system, actions performed by the user from video captured by one or more cameras located in the retail environment, wherein the camera is one of a plurality of cameras in the retail environment, each camera being uniquely located such that each camera in the plurality of cameras has a unique field of view (FOV) of a portion of the retail environment, wherein the actions are one of placing an item in the physical shopping container or removing an item from the physical shopping container; determining an item associated with each detected action based on an inventory storage location at which the detected action occurred from the video captured by the camera and a planogram of the retail environment; and updating the virtual inventory of the physical shopping container based on each detected action and the associated item.

In some or all examples of the second aspect, the method further comprises: determining a confidence score of each detected action and the item associated with each detected action; wherein the virtual inventory of the physical shopping container is updated based on each detected action and the associated item in response to a determination that the confidence score exceeds a confidence threshold.

In some or all examples of the second aspect, maintaining the inventory of the electronic shopping cart comprises adding and removing items from the inventory of the electronic shopping cart in response to inputs received via a visual user interface (VUI) of an electronic shopping application operating on the wireless communication device.

In some or all examples of the second aspect, maintaining the virtual inventory of the physical shopping container comprises adding and removing items from the electronic shopping cart in response to detection of an item being added to the physical shopping container and in response to detection of an item being removed from the physical shopping container, respectively.

In some examples of the second aspect, the maintaining the virtual inventory of the physical shopping container in possession of the user comprises: detecting, via a computer vision system, the user in a video frame captured by a camera located in the retail environment; determining, via the computer vision system, a pose of the user in the video frame from the respective coordinates of the user; tracking, via the computer vision system, the user in the video frame and one or more previous video frames; determining, via the computer vision system, a set of actions associated with the user in a sequence of video frames consisting of the video frame and one or more previous video frames, wherein the set of actions comprise an action of placing an item in the physical shopping container and an action of removing an item from the physical shopping container, wherein a first set of confidence scores for the set of actions is output in response to determining the set of actions, one confidence score associated with each action in the set of actions; localizing the coordinates of the user within the retail environment in a three-dimensional (3D) coordinate system using camera parameters; determining, via the computer vision system, a set of items associated with the set of actions of the user based on an inventory storage location associated with the localized coordinates of the respective person within the retail environment and a planogram of the retail environment, wherein a second set of confidence scores for the set of items is output in response to determining the set of items, one confidence score associated with each item in the set of items; associating the user with the inventory of the electronic shopping cart of a shopping application, wherein the electronic shopping cart is associated with an active session of the user; and updating the virtual inventory of the physical shopping containers for each detected person in response to a determination that, for the respective person, both the confidence score of an action in the set of actions having the highest confidence score exceeds an action confidence threshold and the confidence score of an item in the set of items having the highest confidence score exceeds an item confidence threshold.

In some or all examples of the second aspect, the method further comprises: generating an alert in response to a determination that the virtual inventory of the physical shopping container matches the inventory of the electronic shopping cart while the user and/or physical shopping container is in a detection zone of the retail environment and the electronic shopping cart has an unpaid cart status.

In some or all examples of the second aspect, the trigger is one of (i) receiving input from the wireless communication device of the user to perform an electronic checkout or (ii) a determination that the user and/or physical shopping container is in a detection zone of the retail environment.

In some or all examples of the second aspect, the trigger is receiving input from the wireless communication device of the user to perform an electronic checkout, and the electronic checkout is not allowed to proceed in response to the generation of the alert.

In some or all examples of the second aspect, the trigger is detection of an RFID tag by an RFID reader located in a detection zone of the retail environment.

In some or all examples of the second aspect, the detection zone is an entrance/exit zone of the retail environment.

In some or all examples of the second aspect, the item associated with each detected action is determined based on an identification of an inventory storage area and an identification of a product area in the inventory storage area performed by computer vision.

In some or all examples of the second aspect, determining whether the virtual inventory of the physical shopping container matches the inventory of the electronic shopping cart comprises: comparing items in the virtual inventory of the physical shopping container with the inventory of the electronic shopping cart; and determining any items in the virtual inventory of the physical shopping container that are not in the electronic shopping cart; wherein a determination that virtual inventory of the physical shopping container does not match the inventory of the electronic shopping cart is made in response to a determination that one or more items in the virtual inventory of the physical shopping container are not in the electronic shopping cart.

In some or all examples of the second aspect, updating the virtual inventory of the physical shopping container comprises: in response to detection of an item being added to the physical shopping container, the determined item is added to the virtual inventory of the physical shopping container; in response to detection of an item being removed from the physical shopping container, the item is removed from the virtual inventory of the physical shopping container.

In some or all examples of the second aspect, the method further comprises: determining a confidence of each detected action and the item associated with each detected action; wherein the virtual inventory of the physical shopping container is updated based on each detected action and the associated item in response to a determination that the confidence exceeds a confidence threshold.

In some or all examples of the second aspect, determining whether the virtual inventory of the physical shopping container matches the inventory of the electronic shopping cart comprises: determining any items associated with an RFID tag in the virtual inventory of the physical shopping container; comparing any items associated with an RFID tag in the virtual inventory of the physical shopping container with the inventory of the electronic shopping cart; and determining any items in the virtual inventory of the physical shopping container associated with an RFID tag that are not in the electronic shopping cart based on the comparing; wherein a determination that the virtual inventory of the physical shopping container does not match the inventory of the electronic shopping cart is made in response to a determination that one or more items in the virtual inventory of the physical shopping container associated with an RFID tag are not in the electronic shopping cart.

In some or all examples of the second aspect, the method further comprises: determining a confidence that the virtual inventory of the physical shopping container does not match the inventory of the electronic shopping cart; wherein the alert is generated in response to a determination that the confidence exceeds a confidence threshold.

In some or all examples of the second aspect, the alert comprises an audible alert generated via a speaker.

In some or all examples of the second aspect, the speaker is located in a detection zone of the retail environment.

In some or all examples of the second aspect, the alert comprises a visual alert generated via a light.

In some or all examples of the second aspect, the light is located in a detection zone of the retail environment.

In some or all examples of the second aspect, the alert comprises an electronic alert, such as generating and sending an electronic message or notification to a local or remote communication device or an in-application notification.

In some or all examples of the second aspect, the computer vision system has been trained by artificial intelligence or machine learning.

In some or all examples of the second aspect, the computer vision system comprises a trained neural network.

In some or all examples of the second aspect, an electronic checkout is not allowed to proceed in response to a determination that the virtual inventory of the physical shopping container does not match the inventory of the electronic shopping cart.

In some or all examples of the second aspect, an electronic checkout is allowed to proceed in response to a determination that the inventory of the physical shopping matches the inventory of the electronic shopping cart.

In some or all examples of the second aspect, maintaining the inventory of the electronic shopping cart comprises adding and removing items from the inventory of the electronic shopping cart in response to inputs received via a visual user interface (VUI) of an electronic shopping application operating on the wireless communication device.

In some or all examples of the second aspect, maintaining the virtual inventory of the physical shopping container comprises adding and removing items from the electronic shopping cart in response to detection of an item being added to the physical shopping container and in response to detection of an item being removed from the physical shopping container, respectively.

In accordance with another aspect of the present disclosure, there is provided a computing device comprising a processor, a memory and a communication subsystem. The memory having tangibly stored thereon executable instructions for execution by the processor. The executable instructions, in response to execution by the processor, cause the computing device to perform the methods described above and herein.

In accordance with a further aspect of the present disclosure, there is provided a system, such as a communication system. The system comprises at least one sensor located in a retail environment, the at least one sensor comprising a least one camera. The system further comprises a computing device comprising a processor, a communication subsystem coupled to the processor, and a memory coupled to the processor, wherein the processor is configured to perform the methods described above and herein. The computing device may be located physically remote, or distant, from the at least one sensor. The computing device may provide cloud computing functions for a local terminal in the retail environment.

In some or all examples, the system comprises a plurality of sensors located in the retail environment.

In accordance with a further aspect of the present disclosure, there is provided a non-transitory machine-readable medium having tangibly stored thereon executable instructions for execution by a processor of a wireless communication device. The executable instructions, in response to execution by the processor, cause the wireless communication device to perform the methods described above and herein.

Other aspects and features of the present disclosure will become apparent to those of ordinary skill in the art upon review of the following description of specific implementations of the application in conjunction with the accompanying figures.

BRIEF DESCRIPTION OF THE FIGURES

FIGS. 6A-6L are visual user interface screens of a shopping application operating on a wireless communication device of a user in accordance with an embodiment of the present disclosure.

DETAILED DESCRIPTION OF EXAMPLE EMBODIMENTS

Figure 1:
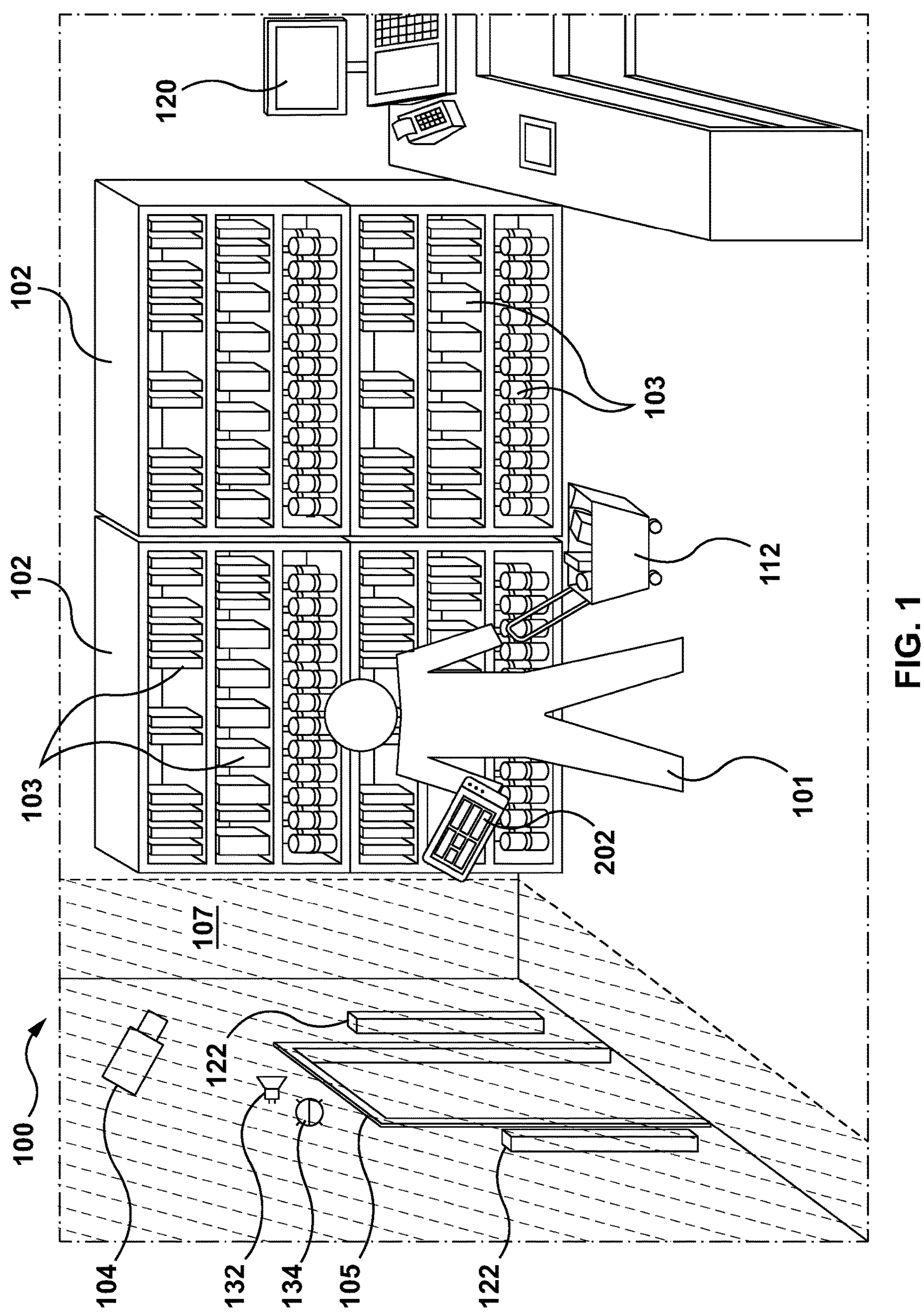
FIG. 1 is a schematic block diagram of a retail environment in accordance with the present disclosure.

The present disclosure is made with reference to the accompanying drawings, in which embodiments are shown.

However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Individual functions described below may be split or subdivided into multiple functions, or multiple functions may be combined. Lastly, elements referred to in the singular may be plural and vice versa, except where indicated otherwise either explicitly or inherently by context.

Within the present disclosure, the following sets of terms may be used interchangeably: (i) merchant and retailer, (ii) user and customer, (iii) cart and electronic shopping cart, (iv) functions, operations and steps, and (v) products and items.

FIG. 1 illustrates a retail environment 100 such as a store of a merchant or retailer in accordance with the present disclosure. The retail environment 100 comprises a plurality of inventory storage areas 102, only one of which is shown. The inventory storage areas 102 may comprise shelves, display cases, coolers, refrigerators, display tables, bins or other suitable storage units. The inventory storage areas 102 are each used to stock a plurality of items 103 for sale by the merchant. Each inventory storage area 102 comprises one or more inventory storage locations depending on the type of inventory storage area and item. Each inventory storage location is used to store a particular type of item 103 and only one type of item 103. A planogram (also known as a POG, shelf space plan/schematic or space plan/schematic) identifies the location of the items 103 in the retail environment 100 in terms of one or more inventory storage locations in one or more each inventory storage areas 102 in either two or three-dimensions, depending on the embodiment. A three-dimensional (3D) planogram may be used with 3D image data (e.g., video data) either from a 3D camera or a 3D projection from two-dimensional (2D) image data (e.g., video data). For example, the location of the items 103 may be identified in terms of one or more shelf areas in one or more shelves. The planogram is a diagram that depicts how and where specific retail products are located in the retail environment 100. The planogram for the retail environment 100 is typically maintained by a retail management system 210 (FIG. 3), described below. The planogram may also identify one or more detection zones 107 within the retail environment 100. The detection zones are defined areas within the retail environment 100 in front of, and surrounding, each entrance/exits which are used to detect the presence of customers and trigger security checks, as described more fully below.

The items 103 may include merchandise (e.g., clothing, toys), commodities, perishables (e.g., food), or any suitable type of item 103 depending on the nature of the enterprise that operates the retail environment 100. The items 103 located in each inventory storage area 102 are identified in a planogram of the retail environment 100. The planogram of the retail environment 100 identifies items 103 (e.g., products) located at a plurality of inventory storage locations. The planogram is used for localization and image recognition functions performed by a computer vision system 230 (FIG. 2) described more fully below. The size of each inventory storage location associated with an item 103 is based on the size of the item 103 and the amount of space allocated to the item 103, which may vary. Like items 103 may be stored or displayed together on shelves, display tables, display cases, or in bins or other suitable storage units such that all items 103 of a given kind are stored in one inventory storage location. Alternatively, like items 103 may be stored in different locations. Thus, items 103 of a given kind may be located in one or more inventory storage locations. For example, an item of a given kind may be located on one or more store shelves at different locations in the retail environment 100, on a shelf and a display table, or other combinations of inventory storage locations.

The retail environment 100 may comprise a plurality of electromagnetic (EM) wave-based sensors that collect data about the retail environment 100. The EM wave-based sensors comprise a plurality of image capture devices such as cameras 104 and may also include, for example, light detection and ranging (LiDAR) units and/or radar units such as synthetic aperture radar (SAR) units. The EM wave-based sensors (e.g., cameras 104) are connected to the computer vision system 230. The cameras 104 may be positioned overhead, such as on the ceiling, or on walls of the retail environment 100 to capture images of users 101 and inventory storage areas 102 in the retail environment 100. The cameras 104 typically comprises RGB (red, green, blue) cameras but may comprise depth sensing cameras or 3D cameras in some examples. The cameras 104 are preferably ceiling mounted. The cameras 104 are positioned about the retail environment 100 to have different fields of view (FOVs) or coverage areas to capture video showing all inventory storage areas 102 and all inventory storage locations in the retail environment 100. Thus, each camera 104 is uniquely located to a unique viewing angle, unique perspective and unique FOV of a portion of the retail environment 100. The FOVs or coverage areas of some or all of the cameras 104 may be partially overlapping. The FOV of the cameras 104 is preferably overlapping to account for occlusions in the retail environment 100 resulting from retail items, shelving units, bins, tables and other inventory storage locations, signage, lightning, and other obstacles. In addition, customers may face away from the cameras 104, which makes action detection more difficult from some angles. The amount of overlap between the cameras 104 depends on the store plan, fiscal budget and computing resources (more overlap results in more cameras and more processing). A planogram of the portion of the retail environment in the FOV of each camera 104 may be provided.

Items 103 are stocked or placed on inventory storage areas 102 after being received from a supplier at a receiving area (not shown) of the merchant. Stocking or placing an item on the inventory storage areas 102 may involve unpacking and arranging the items in or on an inventory storage area 102. An inventory management system 220, which may be a module of a retail management system 210, which may be provided by a software application(s) operating on a computer terminal 120, such as a personal computer or tablet computer in the retail environment 100, is used to maintain an inventory of the items 103 in the retail environment 100. The inventory of the items 103 in the retail environment 100 may be maintained in real-time or near real-time. Although one computer terminal 120 is shown, the retail environment 100 may have several computer terminals 120 connected via a communications network 240 and share common computing resources such as databases, price lists, etc.

The inventory management system 220 may differentiate between items 103 located on inventory storage areas 102 and items 103 in a storage area (not shown), such as a storeroom, in which case the inventory management system 220 is updated in response to items being placed in, or on, the inventory storage areas 102. The inventory management system 220 may track the quantity, cost, inventory storage area and inventory storage location of the items 103. Other suitable parameters such as a type or condition of the items 103 may also be tracked by the inventory management system 220. Each item 103 is associated with a product name, a product code(s) or identifier (ID) in the inventory management system 220, and a barcode. The product code(s) may comprise a stock-keeping unit (SKU), manufacture number or ID, Global Tracking ID number (GTIN), Universal Product Code (UPC), International Article Number (IAN), or European Article Number (EAN). The barcode may be a one-dimensional or two-dimensional barcode which, for example, may be an IAN, EAN, UPC or QR code or other suitable barcode symbology and numbering system. The inventory of the items 103 in the retail environment 100 indicates a quantity of each item 103 including a quantity of each item 103 in one or more inventory storage areas 102 and optionally a quantity of each item 103 in storage (if any). Each inventory item 103 is associated with the corresponding inventory storage location(s) in which the item 103 is stored, and the association is maintained in an inventory database 215 (FIG. 2) accessible by the inventory management system 220.

A user 101 in the retail environment 100 uses a shopping application 560 (FIG. 5) on his or her wireless communication device 220 (e.g., smartphone) while shopping. The shopping application 560 may be a native smartphone application (e.g., for iOS or Android operating systems) or a Web application. The user launches or runs the shopping application 560 before he or she starts shopping. If the user does not have the application on his or her wireless communication device 220, the shopping application 560 may be downloaded from an application store associated with the wireless communication device 220, a website or other suitable means, or when the application is a Web application, accessed via a Web browser. For example, the Web application may be accessed by scanning a store QR code for the shopping application 560 presented on in-store signage or Near Field Communication (NFC) tag. Bluetooth™ similar short range wireless communication protocol may be used to identify the entrance of a customer in the retail environment 100. With customer approval, the shopping application 560 may provide geolocation services that track the customers locations, learning about retail environments that the customers go to, allowing the study of the relationship between bought items and customer behaviour (season, time of the day, etc.).

The shopping application 560 is a lightweight application that communicates with back-end services provided by a remote (e.g., cloud) server 250 that provide a hosted service managing the different POS, payment processors, inventory, security and other functions. The on-site computer terminal 120 communicates with the remote server 250 and provides a security/anti-thief system. The on-site computer terminal 120 may be used as an interface with on-site devices and Cloud hosted services. It may filter access both ways improving security for both parties. It may also reduce workload on the Cloud services by polling RFID readers directly and performing some computations on-site, such as AI-based methods. The computer terminal 120 may also be used by store employees and customers to access the retail management system 210.

A RFID label printer may be installed on-site depending on customer requirements. The RFID label printer allows the employees to print labels for the store products on the go and may provide printing directly from a merchant dashboard VUI inventory interface of the retail management system 210. The RFID label printer may be connected to the on-site computer terminal 120 or the network. An example of a suitable RFID label printer is a Sato CL4NX.

One or more Ethernet network switch is used to connect the different devices with each other on the same subnet. Through this subnet, the on-site computer terminal 120 is connected to the RFID label printer, the security systems, the alarming system, and other devices. An example of a suitable is a Gigabit Ethernet switch.

A 5G modem may be connected to the on-site site computer terminal 120 to provide connectivity with the Cloud services, improving availability time compared to relying on the customer's network infrastructure. Most of the on-site devices could be connected using 5G connectivity, removing the requirement to set up cable on site and easing hardware setup and configuration.

The alarming system comprises at least one light and at least one speaker. Connecting directly to the Cloud and a developed service is possible. Depending on the connectivity, the light and speaker may be connected to the on-site computer GPIO, the RFID reader GPIO, Wi-Fi network or Ethernet network. The alarming system also comprises merchant dashboard VUI displays. The carts are displayed in the merchant dashboard VUI where carts may be flagged as alarmed, and one or more of a visual, audio and electronic notification (i.e., electronic message sent to smartphone or other personal electronic device of store employee) triggered to alert store employees of possible theft, as described more fully below.

The shopping application 560 maintains an inventory of an electronic shopping cart of the user 101 via data received by a wireless communication device 220. A virtual (or synthetic) inventory of a physical shopping container 104, such as a shopping cart, basket or bag, in possession of the user in the retail environment 100 is also maintained by the retail management system 210 via a sensor data collected by sensors 204 in the retail environment 100. Thus, two "virtual containers" are maintained for each user 101. The first virtual container is the electronic shopping cart of the user 101. The inventory of the electronic shopping cart is directly linked to, and based on, the inputs provided by the customer through the shopping application 560 maintains which provides information such as product identifiers and a timestamp related to adding/removing an item product from the electronic shopping cart. The second virtual container is a virtual (or synthetic) shopping container which is intended to replicate the physical contents of the physical shopping container 104 of the user 101. The inventory of the physical shopping container is based on detected actions of the computer vision system 230, namely the detection of an item being added to the physical shopping container and the detection of an item being removed from the physical shopping container. A mismatch or discrepancy between the two virtual containers is used to detect theft, as described more fully herein.

The inventory of an electronic shopping cart and the virtual inventory of the physical shopping container 104 are preferably maintained in real-time or near real-time. For the purpose of the present disclosure, real-time means that a computing operation or process is completed within a relatively short maximum duration, typically milliseconds or microseconds, fast enough to affect the environment in which the computing operation or process occurs, such as the inputs to a computing system. The virtual inventory of the physical shopping container 104 may be shared with the shopping application 560 in response to changes or triggers, such as a request to checkout or purchase the items in the electronic shopping cart.

Items 103 may be stored and tracked in terms of countable, individual units or multiples of units, such as packages, cartons, boxes or other aggregate unit, and associated with a barcode (e.g., UPC or QR code) that may be scanned by a user 101. Alternatively, some items 103 may not be packaged and not associated with a barcode (e.g., UPC or QR code) such as bulk products and produce (e.g., fruits, vegetables, etc.). Unpackaged items 103 may be managed in terms of measurable quantities such as number of units, weight, or other measurable property. A quantity of an unpackaged item 103 may refer to either a countable number of individual or aggregate units of the unpackaged item 103 or a measurable amount of the unpackaged item 103, as appropriate. Unpackaged items may be dispensed with an automatic product dispensing machine (not shown) that dispenses the unpackaged item 103 in a measured quantity. For example, the customer specify an unpackaged item 103 and quantity via a human machine interface (HMI) of the automatic product dispensing machine (e.g., touchscreen), scan a barcode corresponding to the specified item 103 and quantity displayed by the HMI (e.g., touchscreen) or tap an NFC transmitter and receiver of the automatic product dispensing machine which transmits the NFC data corresponding to the specified item 103 and quantity, and receive the specified item 103 in the measured quantity from the automatic product dispensing machine. The barcode or NFC data is read by the user's wireless communication device 220 (e.g., smartphone) and automatically updates the electronic shopping cart of the user for the specified item 103 and quantity.

The retail environment 100 comprises an entrance/exit 105 and a detention zone (area) 107 in front of, and surrounding, each entrance/exit 105. The arrangement of the retail environment 100 is depicted functionally rather than schematically. For example, multiple different entrances/exits 105, multiple inventory storage areas 102, and multiple detention zones 107 may be present and located in a variety of configurations throughout the retail environment 100. When there is more than one entrance/exit 105, there is more than one detection zone 107 as there is at least one detention zone 107 for each entrance/exit 105. Detection zones 107 may also be defined in other areas of the retail environment 100 in some examples, such as in front of, and surrounding, inventory storage areas 102, changerooms, washrooms or the like. The detection zones 107 are different from a checkout or cashier zone (area) of the retail environment 100. The determination/classification of whether a customer is in a detection zone 107 may be based on detection of an RFID reader of the RFID system 122 or the computer vision system 230 (e.g., customer location in the video field and the planogram of the store environment/map).

A speaker 132 and/or a light 134 are preferably located in each detention zone 107 for providing alerts in response to a determination that the virtual inventory of the physical shopping container does not match the inventory of the electronic shopping cart, as described more fully below.

A user 101 of the shopping application 560 may add item 103 to the inventory of the electronic shopping cart in a number of ways, depending on the item 103. One method of adding items to the inventory of the electronic shopping cart that is suitable for packaged items 103 is scanning a barcode (e.g., UPC or QR code) associated with the item 103 via a camera of the wireless communication device 220. In some examples, a scanned item is added to the inventory of the electronic shopping cart with a quantity of one by default. A user may change the quantity of an item in the inventory of the electronic shopping cart via corresponding input via a visual user interface (VUI) of the shopping application 560 (e.g., by entering a new quantity in a quantity field or tapping an increase or decrease button, which may be presented as arrows) or re-scanning the item 103 until the desired quantity is reflected in the inventory of the electronic shopping cart. Each input received by the shopping application 560 may add an item, remove an item or change a quantity of an item in the electronic shopping cart, and is associated with a timestamp representing a time at which the corresponding input was received.

Another method of adding items to the inventory of the electronic shopping cart is inputting a product code such as the SKU or a barcode number of a barcode (e.g., UPC or QR code) or product name and a quantity or weight via the VUI of the shopping application 560. As noted above, the quantity (or weight) of the item in the inventory of the electronic shopping cart may be changed via corresponding input via the VUI of the shopping application 560. For unpackaged items 103 such as produce or bulk items that are not associated with a product code or barcode (e.g., UPC or QR code), a lookup or search function for determining the product code or product name may be provided by the shopping application 560 for unpackaged items 103. In addition, for unpackaged items 103 such as produce or bulk items that are not associated with a product code or barcode (e.g., UPC or QR code), a weight may be determined by the user 101 by a scale (not shown) located in the retail environment 100. The scale may be an electronic scale that is part of a POS terminal which may be operated by the user 101 or which may be operated by a representative of the merchant (e.g., cashier). The electronic scale may be part of a POS terminal that is part of a self-checkout machine or register.

Some items 103 may be provided with an RFID tag which may be detected by an RFID system 122 with RFID readers/detectors located in each detection zone 107 of the retail environment 100, such as one or more RFID ultra high frequency (UHF) readers and its associated antennas. The RFID system 122 is configured to detect RFID tags attached to items 103. The RFID reader may be connected by Ethernet to the on-site (local) computer terminal 120. The RFID UHF readers identify RFID tags (e.g., EPC field) within a reading proximity and sends the information back to the computer terminal 120. Examples of a suitable RFID Reader include the Zebra FX7500 and FX9600. The RFID tags may be attached to high value items. A high value item designation depends on the retailer and the nature of the merchandise being sold. In some retail environments, such as a luxury goods retailer, all items may be high value items. In other retail environments, such as a grocery store, high value items may include meat, seafood and other higher priced items. In some examples, all items 103 may be provided with an RFID tag.

Yet another method of adding items 103 to the inventory of the electronic shopping cart is capturing an image of the item 103 or signage near the item 103 (e.g., on the shelf or other inventory storage location in which the item 103 is located, for example below the item 103) via the camera of the user's wireless communication device 220 and performing optical character recognition (OCR) on the capture image to determine the product code or product name, and add an item corresponding to the determined product code or product name to the inventory of the electronic shopping cart. As noted above, the quantity of the item in the inventory of the electronic shopping cart may be changed via corresponding input via the VUI of the shopping application 560.

Yet another method of adding items 103 to the inventory of the electronic shopping cart is performing object (e.g., product) recognition on an image of the item 103 captured by the camera of the user's wireless communication device 220 using computer vision. As noted above, the quantity of the item in the inventory of the electronic shopping cart may be changed via corresponding input via the VUI of the shopping application 560.

Yet another method of adding items to the inventory of the electronic shopping cart is via NFC (or other RFID). A user may tap their wireless communication device 220 on an NFC tag or similar RFID tag associated with the item 103. The NFC tag (also known as a smart tag) may be located on or near the item 103, for example, on signage near the item 103 (e.g., on the shelf or other inventory storage location in which the item 103 is located, for example below the item 103). The wireless communication device 220 receives and interprets the NFC data which includes product code or name, and adds an item corresponding to the product code or name to the inventory of the electronic shopping cart. As noted above, the quantity of the item in the inventory of the electronic shopping cart may be changed via corresponding input via the VUI of the shopping application 560.

Other suitable means for adding an item 103 to the inventory of the electronic shopping cart may be used.

Each item 103 added to the shopping cart is associated with a timestamp indicating a time at which it was added to the shopping cart. The user 101 may also remove items 103 from the electronic shopping cart via the VUI, for example, by selecting a remove button or reducing a quantity (or weight) associated with the corresponding item 103 in the electronic shopping cart.

As the user 101 moves through the retail environment 100, video of the user 101 is captured by the cameras 104. The computer vision system 230 tracks the user's local in the retail environment 100, preferably in real-time or near real-time. For example, when the user 101 removes an item 103 from an inventory storage location in an inventory storage area 102 and places the item 103 in a physical shopping container 104, video of the user 101 removing the item 103 and placing the item 103 in the physical shopping container 104 is captured. The video of the user 101 is analyzed using computer vision to determine an action performed by the user 101. For example, object recognition is performed to determine user actions. When an action of placing an item in the physical shopping container 104 or removing an item from the physical shopping container 104 is detected via the computer vision system 230, the retail management system 210 receives the user's location in the retail environment 100 from the computer vision system 230 which uses the planogram of the retail environment 100 to determine an item 103 associated with each detected action based on an inventory storage location at which the detected action occurred from the video and the planogram of the retail environment 100. The determination of the item 103 is based on determining an inventory storage location which corresponds to the user's location in the retail environment 100 at the time the action was detected action and determining an item 103 which corresponds to the inventory storage location based on the planogram of the retail environment 100. Next, the virtual inventory of the physical shopping container 104 based on each detected action and the associated item is updated. Each item 103 in the virtual inventory of the physical shopping container 104 is associated with a timestamp indicating a time at which it was added to the physical shopping container 104 by the retail management system 210.

When the user 101 wishes to purchase the items 103 in the shopping cart, a sales transaction may be completed entirely via the shopping application 560 on the wireless communication device 220 without interacting with a representative of the merchant or POS terminal of a POS system of the merchant. The POS terminal may be a mPOS (mobile POS) terminal. An mPOS may be a smartphone, tablet or dedicated wireless device that performs the functions of a cash register or electronic POS terminal) wirelessly. To perform an electronic checkout of the electronic shopping cart, the user 101 provides corresponding input via the shopping application 560 on the wireless communication device 220. Alternatively, a POS terminal which wirelessly communicates with the shopping application 560 on the wireless communication device 220 may be used to complete the sales transaction. The POS terminal may have built-in wireless communication capabilities via a Wi-Fi communication subsystem, cellular radio network subsystem or the like, or may have a wired connection to a WLAN in the retail environment 100. Alternatively, a POS and a payment service provider (PSP) terminal may be provided as a lightweight cashier system. The POS terminal may be used, for example, when desired by the merchant or when the user 101 has items without a barcode (e.g., UPC or QR code) and desires or is required to use the POS terminal to add such items to the electronic shopping cart.

A security check is performed in response to a trigger. The trigger may be one of a plurality of triggers monitored by the retail management system 210. 210. A trigger may be receiving input from the wireless communication device 220 of the user 101 to perform an electronic checkout of the electronic shopping cart to complete a sales transaction. Another trigger may be determination that the user and/or physical shopping container is in a detection zone 107 of the retail environment, which may be determined by computer vision or detection of an RFID tag in a detection zone 107. A further trigger is detection of an RFID tag in a detection zone 107 by the RFID system 122. A further trigger may be the expiry of a countdown timer set for a threshold duration (e.g., 1 or 2 minutes), for example, a security check may be performed periodically at the threshold duration (e.g., every 1 or 2 minutes). A further trigger may be user input, for example by an employee or the retailer, received by the computer terminal 120 or wireless communication device of the retail management system 210.

The performing of the security check comprises determining whether the virtual inventory of the physical shopping container matches the inventory of the electronic shopping cart. In response to a determination that the virtual inventory of the physical shopping container does not match the inventory of the electronic shopping cart, the status of the cart is electronic shopping cart is changed to alarmed or the like, and an alert is generated. Depending on how and when the security check is triggered, the alert may comprise one or a combination of an electronic alert in the form of an electronic message or notification, an audible generated by a speaker 132 in the retail environment 100, or a visual alert generated by a light 234 in the retail environment 100. An electronic alert may be generated, sent to, and displayed upon any one or more of the wireless communication device 220 of the user and/or a computing device of the merchant.

The content of the electronic alert displayed upon the wireless communication device 220 of the user and the electronic alert displayed upon the computing device of the merchant are typically different. The electronic alert for the user is presented as a reminder notification message about the item(s) determined to be in the physical shopping container but not in the electronic shopping cart with a reminder to add the item(s) to the electronic shopping cart. The electronic alert for the user may include a button to add the corresponding item to the electronic shopping cart and a button to ignore/dismiss the electronic alert/notification. The electronic alert for the merchant comprises a potential theft notification message about the item(s) determined to be in the physical shopping container but not in the electronic shopping cart. The potential theft notification message may include user information (identifying user information, the user's location in the retail environment 100 such as an aisle and/or shelf location, and potentially including directions from a receiving store employee's current location to the location to the user) and information about the item(s) determined to be in the physical shopping container but not in the electronic shopping cart. The electronic alert for the merchant may include a button for triggering an audible generated by a speaker 132 in the retail environment 100 and/or a visual alert generated by a light 234 in the retail environment 100.

The electronic alert may comprise one or more of an in-application notification displayed with a respective application operating on a computing device of the user and/or merchant, and an electronic message sent to a designated messaging address of the user or merchant, such as an email, SMS (Short Message Service) or Multimedia Messaging Service (MMS). The messaging address for an electronic message sent to the user may be stored in the user database 242 whereas the messaging address of the merchant may be a setting or configuration of the retail management system 210. The in-application notification for the user may be an in-application notification within the VUI of the shopping application 560 operating on the wireless communication device 220. The in-application notification for the merchant may comprise an in-application notification within the VUI of the retail management system 210 operating on the computer terminal 120 of the merchant (e.g., via the merchant dashboard VUI) or within the VUI of a POS (e.g., an mPOS) of the merchant.

The electronic alert for a merchant may be sent directly to a store employee via a personal computing device of the store employee and displayed upon an available display such as a display of a smartphone of the employee or an optical head mounted display, such as augmented reality (AR) glasses. The user and merchant notification/electronic message of the electronic alert may be accompanied by a physical and/or audible alert such as a tone or ring provided by a speaker or the like, or a buzz provided by a buzzer, etc. depending on the capabilities of the receiving device.

In one example, an electronic alert may be used in response to a trigger. The trigger may be generated in response to a determination that the virtual inventory of the physical shopping container does not match the inventory of the electronic shopping cart (i.e., the status of the cart is electronic shopping cart is changed to alarmed or the like) and the user and/or physical shopping container is not in a detection zone 107 of the retail environment 100, such as in response to the user selecting "Checkout" in the shopping application 560 or otherwise provides input on the wireless communication device 220 to perform an electronic check-out of the electronic shopping but is not in a detection zone 107 of the retail environment 100. The electronic alert may comprise an in-application notification or other type of notification on the wireless communication device 220. Alternatively, the electronic alert may be a text message, such as an SMS or MMS message, sent to a text messaging address (e.g., telephone number) associated with the wireless communication device 220 or an email message sent to an email address associated with the wireless communication device 220. The electronic alert may cause the user to check the inventory of the physical shopping container against the inventory of the electronic shopping cart and update the inventory of the electronic shopping cart with any missing items, or speaker of an employee or other representation of the merchant about the discrepancy between the inventory of the physical shopping container and the inventory of the electronic shopping cart. One or more of an audible generated by a speaker 132 in the retail environment 100 and a visual alert generated by a light 234 in the retail environment 100 may be generated in response to a determination that the virtual inventory of the physical shopping container does not match the inventory of the electronic shopping cart (i.e., the status of the cart is electronic shopping cart is changed to alarmed or the like) and the user and/or physical shopping container is in a detection zone 107 of the retail environment 100. In response to there being more than one detection zone 107 in the retail environment 100, the audible and/or visual alert may be generated in all detection zones 107 or in the detection zone 107 nearest the user. The detection zones 107 in which the audible and/or visual alert is generated may be determined in advance by a setting in the retail management system 210 or based on user input of a store employee, depending on how the audible and/or visual alert is triggered. The detection zone 107 nearest the user may be determined by the planogram for the retail environment 100 and a location of the user extracted from the computer vision system 230. The audible and/or visual alert may be generated in respect of whether an electronic alert was generated. In other examples, no electronic alerts are generated.

Figure 2:
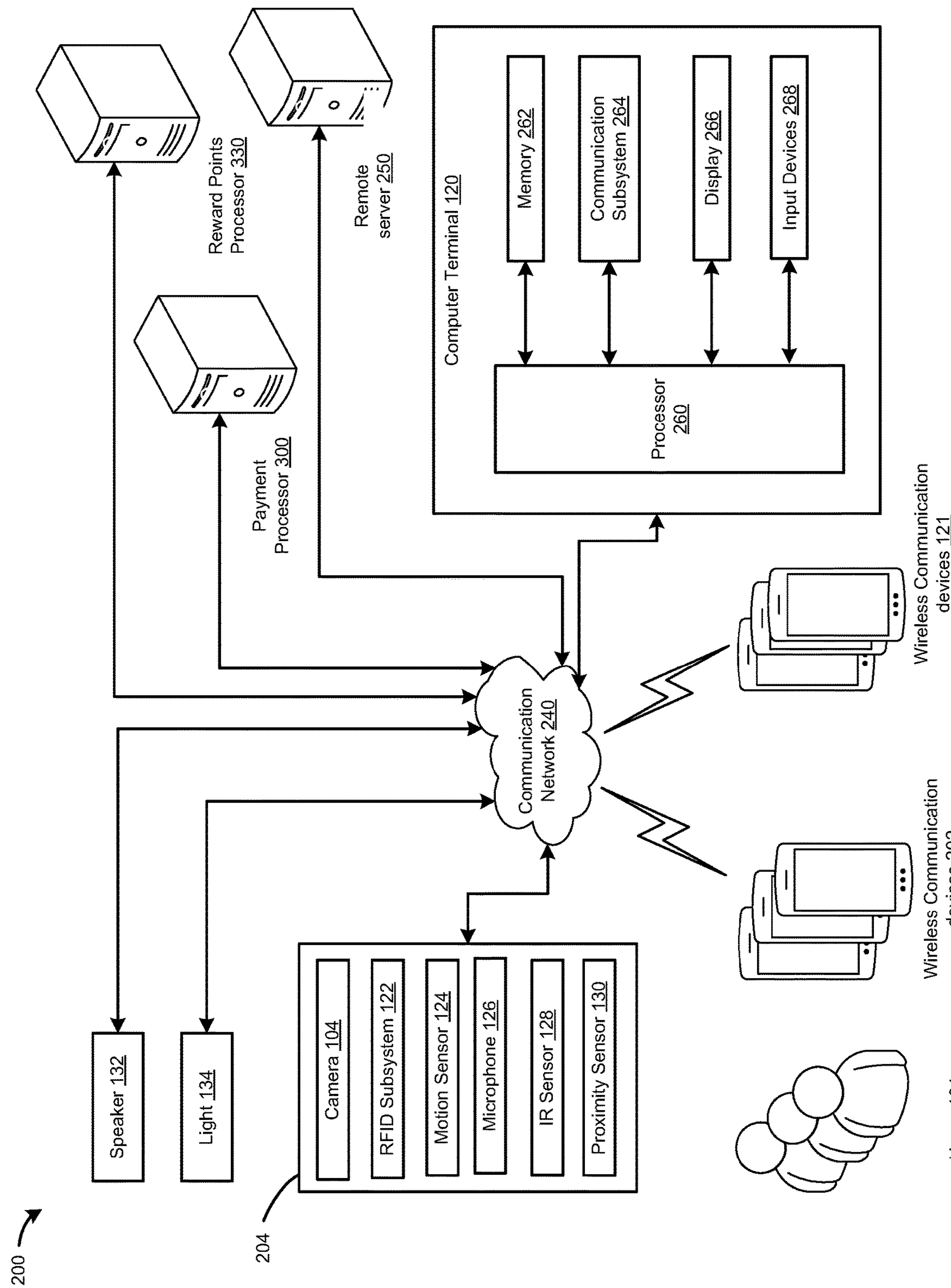
FIG. 2 is a schematic block diagram of a contactless checkout system in accordance with the present disclosure.

Reference is next made to FIG. 2 which shows in schematic block diagram form a contactless checkout system 200 in accordance with one example embodiment of the present disclosure. The contactless checkout system 200 includes a plurality of wireless communication devices 202 operated by users, sensors 204 located in the retail environment 100 and a retail management system 210 operated by a merchant or retailer. The retail management system 210 comprises one or more computer devices operated by a merchant or retailer, such as one or more computer terminals 120 (only one of which is shown) and one or more wireless communication devices 121 which may be used as an mPOS. Although not shown, the computer terminal 120 may comprise the components of a conventional POS terminal, a self-checkout machine (which may itself comprise an electronic scale), and/or automatic product dispensing machine.

The sensors 204 include the cameras 104 and the RFID system 122 with one or more RFID readers/detectors located in each detection zone 107, and may further include any one or more of a motion sensor 124, a microphone 126, an infrared (IR) sensor 128, and/or a proximity sensor 130. One or more of the sensors 204 may be housed in a modular unit or the sensor 204 may be located discreetly (e.g., separately and individually). The sensors 204 are communicatively coupled to the computer terminal 120 via wireless and/or wired connections. The sensors 204 sense a coverage area within the retail environment 100. The sensors 204 are spaced around the retail environment 100 to increase the coverage area, each of the sensors having a FOV of a portion of the retail environment 100.

The computer terminal 120 communicates with the wireless communication devices 202 via the communication network 240 which comprises, or is connected to, the Internet. The computer terminal 120 provides the retail management system 210, including the inventory management system 220, inventory database 225 and computer vision system 230. The computer terminal 120 communicates with the remote server 250 (e.g., web application server) or communication service infrastructure via the communication network 240, which provides cloud-based, back-end services of retail management system 210. Some or all of the computational functions of the retail management system 210, for example computer vision computational functions, may be performed by the remote server 250, with the computer terminal 120 acting as a thin client that performs primarily data input and output functions. Different components of the contactless checkout system 100 may communicate with each other via different channels of the communication network 240, in some examples.

The retail management system 210 also communicates with, or comprises, a payment processor 300 (also known as a transaction processor) via the communication network 240. The payment processor 300 comprises one or more servers and may be operated by a third-party unrelated to the merchant or retailer. Alternatively, the retail management system 210 may comprise the payment processor 300. Examples of payment processors 300 include Lightspeed Payments™ provided by Lightspeed POS Inc., Global Payments™ by Global Payments Inc., or Moneris™ and Vantiv™ provided by Vantiv, Inc. Other suitable payment processors 300 may be provided by financial institutions, financial service providers, and the like. The payment processor 300 processes financial transactions relating to sales of the merchant or retailer. Alternatively, the transaction/cart may be processed through the merchant dashboard VUI of the retail interface management system 210 or a POS terminal, and payment for the transaction may be made with cash. This provides the merchant with an option that avoids processing credit cards etc. and processing payments through a PSP, which reduces transaction costs for the merchant.

The payment may be fully or partially performed using reward points (or loyalty points), either through external reward points systems such as Air Miles™ or the like or internal systems reward points systems of the merchant. In such embodiments, the retail management system 210 also communicates with, or comprises, a reward (or loyalty) points processor 330 (also known as a transaction processor) via the communication network 240. Alternatively, the retail management system 210 may comprise the reward points processor 330. The reward points processor 330 manages reward (or loyalty) points associated with user accounts of the retail management system 210. Each reward (or loyalty) point may have a dollar value, which may vary depending on the reward points system/provider. During payment while completing a transaction, a selected amount of reward (or loyalty) points may be deducted from their reward (or loyalty) account and a dollar amount corresponding to the selected amount of reward (or loyalty) points is deducted from the purchase price. The reward (or loyalty) point transaction is typically performed by the reward points processor 330 after which a financial transaction for the balance due is performed by settled by the payment processor 300. Furthermore, after the transaction is completed, g a reward (or loyalty) points may be allocated or assigned to the user's reward (or loyalty) account based on the net pre-tax amount paid after any deductions for reward (or loyalty) points, coupons, promotions or the like.

Similar to reward points (or loyalty points), the payment may be fully or partially performed using coupons or promotions, which may be received electronically via an in-application message which is automatically received and processed by the shopping application 560, input via scanning a QR code or other bar code associated with the coupons or promotions, or input a code associated with the coupons or promotions via a keypad of the wireless communication devices 202.

The communication network 240 enables exchange of data between the wireless communication devices 202 and the computer terminal 120, the sensors 204 and the computer terminal 120, the computer terminal 120 and the remote server 250. The communication network 240 may comprise one or a plurality of networks of one or more network types coupled via appropriate methods known in the art such as a local area network (LAN), a wireless local area network (WLAN) such as Wi-Fi™, a wireless personal area network (WPAN) such as Bluetooth™ based WPAN, a wide area network (WAN), a public-switched telephone network (PSTN), or a public-land mobile network (PLMN), also referred to as a wireless wide area network (WWAN) or a cellular network. The WLAN may include a wireless network which conforms to IEEE 802.11x standards or other communication protocol.

The computer terminal 120 includes a controller comprising at least one processor 260 (such as a microprocessor) which controls the overall operation of the computer terminal 120. The processor 260 is coupled to a plurality of components via a communication bus (not shown) which provides a communication path between the components and the processor 260.

The processor 260 is coupled to one or more memories 262 which may include Random Access Memory (RAM), Read Only Memory (ROM), and persistent (non-volatile) memory such as flash memory, and a communication subsystem 264 for exchanging data signals with components of the contactless checkout system 200. The communication subsystem 264 may include a wireless transceiver for wireless communications and a wireline transceiver for wireline communications with wired networks such as a LAN. The wireless transceivers may include one or a combination of Bluetooth transceiver or other short-range wireless transceiver, a Wi-Fi or other WLAN transceiver for communicating with a WLAN via a WLAN access point (AP), or a cellular transceiver for communicating with a radio access network (e.g., cellular network). The computer terminal 120 also includes a display 266 and one or more input devices 268 such as a keyboard and mouse.

Figure 3:
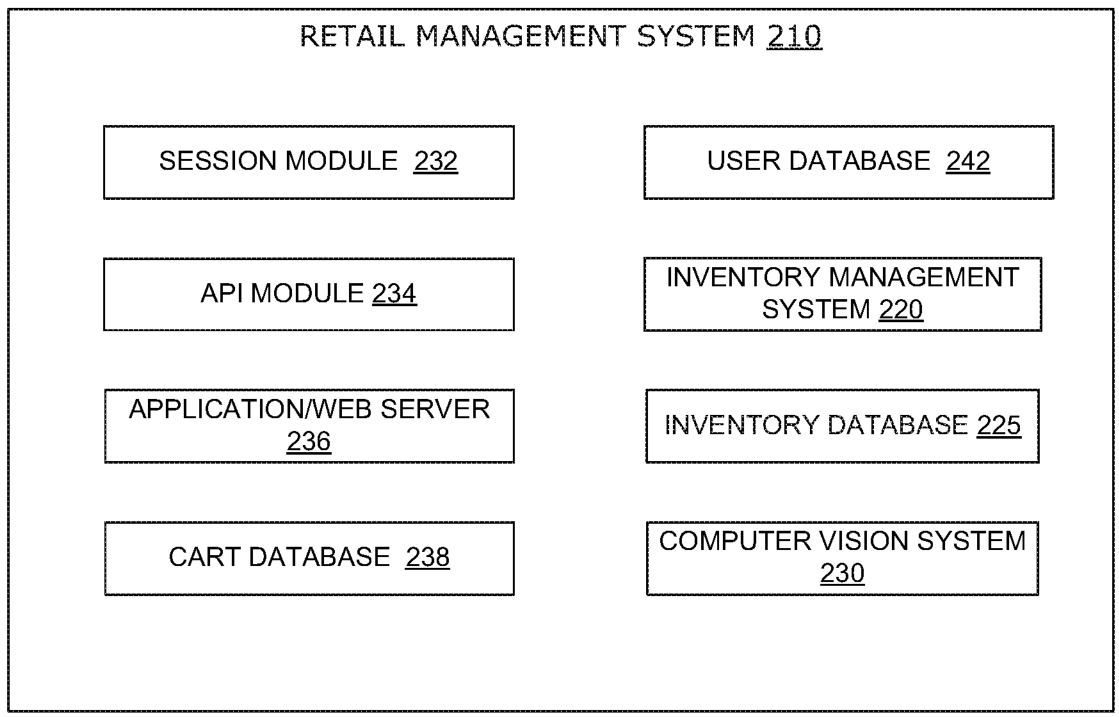
FIG. 3 is a block diagram of a subset of the functional components of a retail management system in accordance with the present disclosure.

FIG. 3 is a block diagram of a subset of the functional modules of the retail management system 210 in accordance with the present disclosure. The functional modules comprise a session module 232, an application programming interface (API) module 234, an application or Web server module 236, a cart database 238, a user database 242, an inventory management system 220, inventory database 225 and computer vision system 230. The retail management system 210 may also comprise a product database (not shown) of items sold by the merchant or store. The product database may include items not in the inventory database 225 because the item has yet to arrive, is out of stock, on backorder, or the like. Other databases may be used for handling customer invoices, product prices, turnover, spending by customers according to certain product categories, multistore taxes, events such as operational log messages and triggered alarms, or other data such as in-store promotional or advertising data. The retail management system 210 may define prices for items 103, sales tax data and information, and other transaction data and information for completing and recording sales. The retail management system 210 includes a payment module (not shown) generates payment instructions for the payment processor 300 (FIG. 1), to which the payment instructions are sent via the communications network 240. The payment processor 300 comprises one or more servers and may be operated by a third party. The payment module may be configured to accept payments with credit card, e-transfer (e.g., Interac™) or payment services such as Apple Pay™, Google Pay™, Paypal™ and AliPay™. The modules and databases of the computer terminal 120 may store data and information for one or multiple retail locations (e.g., stores). Some data of an enterprise having multiple retail locations may be shared such as product information, retail prices, sales prices, coupon data, promotion data, loyalty (reward) points and employee information; however, cart data and store inventory for an enterprise having multiple retail locations are typically managed separately on a per retail location basis. Although separate modules and databases are described, the modules and/or databases may be combined in other embodiments.

The remote server 250 records data regarding events related to different users and products, and how users interact with different endpoints (interfaces) to understand how different types of customers are interacting with its endpoints, how customers are interacting with each store, advantages provided to customers, and system improvements. Computer vision data is used to train/improve the AI models of the security system. Some information is stored on by the remove server 250 for easy access by the retail management dashboard and the shopping application 560.

The session module 232 manages sessions with the retail management system 210 via the shopping application. The shopping application 560 may be used by registered users or unregistered users (also known as guests). Each registered user has a user account stored in a user registry stored in a user account database 242. Each user has unique user credentials stored in the user account database, such as a username or user identifier (ID) and password or personal identifier plurality (PIN), for logging into and using the shopping application. The session module 232 receives user login information and attempts to authenticate the user at the start of a session. In response to a user being authenticated, the session module 232 may receive a session token and send the session token to a corresponding wireless communication device 202. Each session is associated with an electronic shopping cart. User data for each session is stored in a cart database 238. The API module 234 may be used to extract, transform, and combine information such as product information from the inventory database 225 or external other sources.

Figure 4:
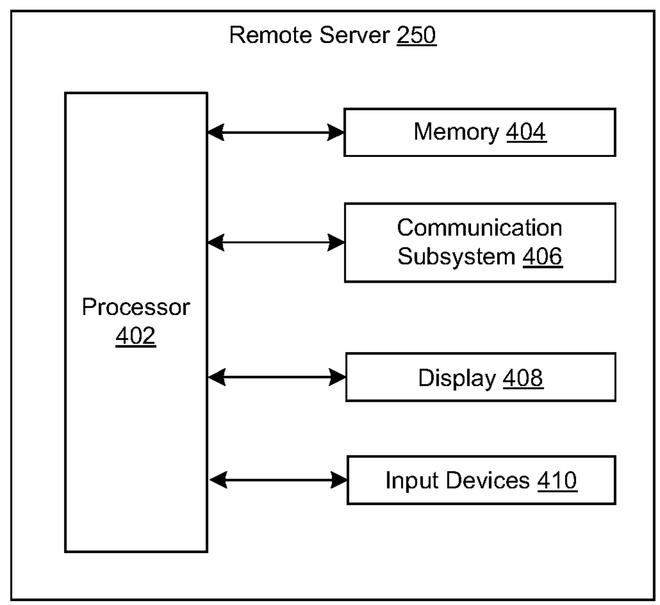
FIG. 4 is a schematic block diagram of a remote server in accordance with the present disclosure.

FIG. 4 shows in schematic block diagram form the remote server 250 in accordance with the present disclosure. The remote server 250 includes a controller comprising at least one processor 402 (such as a microprocessor) which controls the overall operation of the remote server 250. The processor 402 is coupled to a plurality of components via a communication bus (not shown) which provides a communication path between the components and the processor 402.

The processor 402 is coupled to one or more memories 404 which may include RAM, ROM, and persistent memory such as flash memory, and a communication subsystem 406 for exchanging data signals with components of the contactless checkout system 200. The communication subsystem 406 may include a wireless transceiver for wireless communications and a wireline transceiver for wireline communications with wired networks such as a LAN. The wireless transceivers may include one or a combination of Bluetooth transceiver or other short-range wireless transceiver, a Wi-Fi or other WLAN transceiver for communicating with a WLAN via a WLAN AP, or a cellular transceiver for communicating with a radio access network. The remote server 250 may also include a display 408 and one or more input devices 410 such as a keyboard and mouse.

The above-described contactless checkout system 200 is provided for the purpose of illustration only. The above-described contactless checkout system 200 includes one possible communication network configuration of a multitude of possible configurations. Suitable variations of the contactless checkout system 200 will be understood to a person of skill in the art and are intended to fall within the scope of the present disclosure. In some embodiments, the contactless checkout system 200 includes multiple components distributed among a plurality of computing devices (e.g., servers, computer terminals, etc.), some of which may be located locally while other components may be located remotely. One or more components may be in the form of machine-executable instructions embodied in a machine-readable medium.

Data from the wireless communication device 202 and/or the sensors 204 may be received by the computer terminal 120 (e.g., via the communication subsystem 264) for processing, or for forwarding to the remote server 250 for processing, depending on the embodiment. Data may also be communicated directly from the wireless communication device 202 and/or the sensors 204 to the remote server 250 (e.g., web application server), for example, wirelessly via Wi-Fi or other suitable wireless communication protocol, without being passed through the computer terminal 120. The computer terminal 120 may still communicate with the remote server 250 during a communication session but some data may be communicated directly to the remote server 250 from the wireless communication device 202 and/or the sensors 204 via a separate data channel. Alternatively, if the wireless communication device 202 and/or the sensors 204 are configured to wirelessly communicate directly with the remote server 250, the computer terminal 120 may be omitted provided the speaker 132 and light 134 are similarly configured to wirelessly communicate directly with the remote server 250 and generate alerts in response to instructions from the remote server 250.

The remote server 250 is located remote from the retail environment 100 and may be implemented as multiple servers that, in some examples, provide a network-accessible computing platform implemented as a computing infrastructure of processors, storage, software, data access, and so forth that is maintained and accessible by the computer terminal 120 via the communication network 240. For example, the remote server 250 provides computer vision computational functions including processing sensor data such as video obtained from the retail environment 100 to detect user actions and determine items associated with each detected action to determine whether one or more items have been added or removed from a physical shopping container of the user 101. The computational functions performed by the remote server 250 may be referred to as "on-demand computing," "software as a service (SaaS)," "platform computing," "network-accessible platform," "cloud services," "data centers," and so forth.

Figure 5:
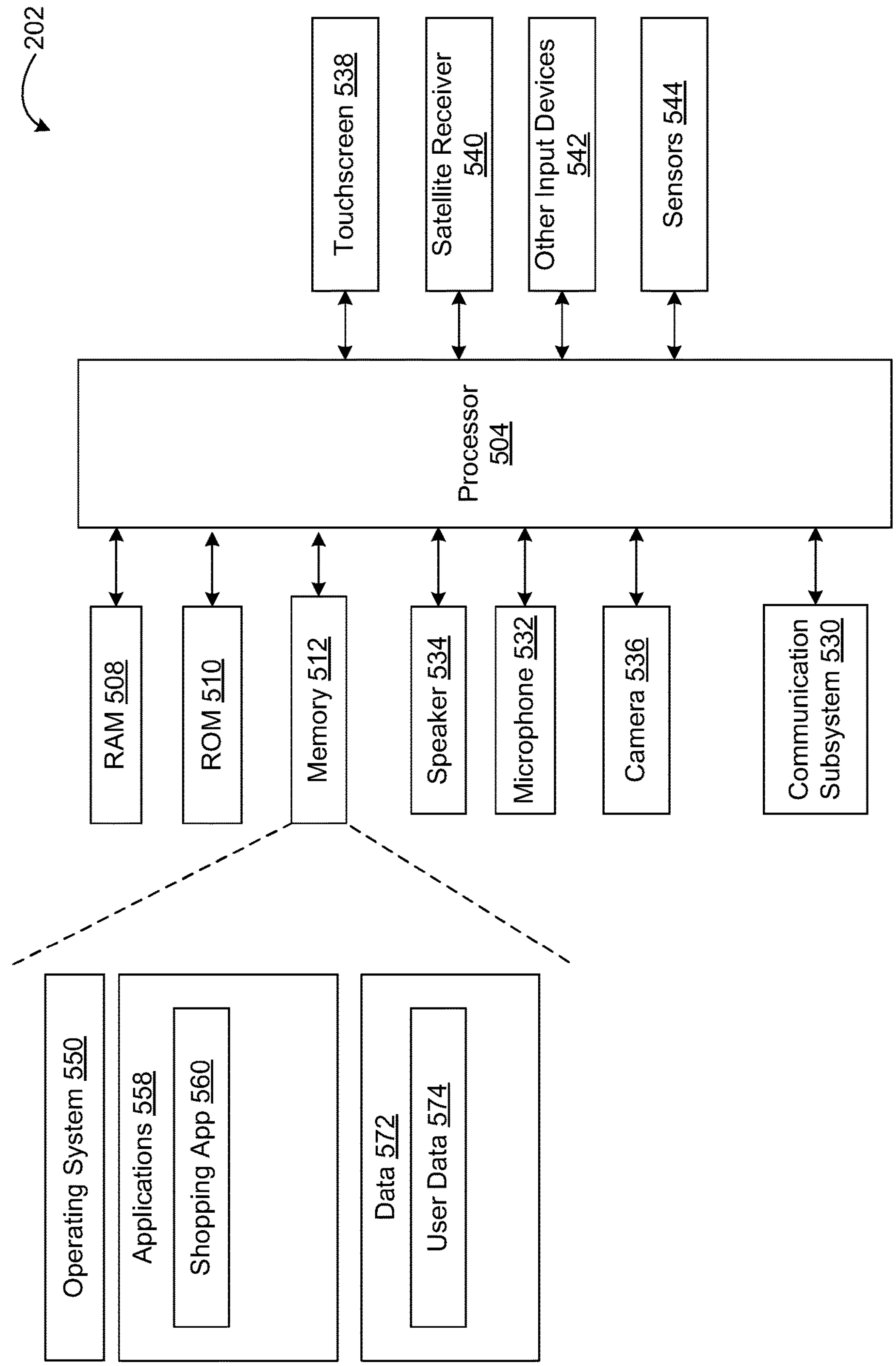
FIG. 5 is a block diagram of an example wireless communication device in accordance with the present disclosure.

Reference is next made to FIG. 5 which illustrates a wireless communication device 202 in accordance with the present disclosure. Examples of the wireless communication device 202 include, but are not limited to, a smartphone or tablet. The wireless communication device 202 includes a processing system comprising a processor 504 (such as a microprocessor or central processing unit (CPU)) which controls the overall operation of the wireless communication device 202. The processor 504 is coupled to a plurality of components via a communication bus (not shown) which provides a communication path between the components and the processor 504. The processor 504 is coupled to RAM 508, ROM 510, and persistent memory 512 such as flash memory and a communication subsystem 530.

The communication subsystem 530 includes one or more wireless transceivers for exchanging radio frequency signals with wireless networks. The communication subsystem 530 may also include a wireline transceiver for wireline communications with wired networks. The wireless transceivers may include one or a combination of Bluetooth transceiver or other short-range wireless transceiver, a Wi-Fi or other WLAN transceiver for communicating with a WLAN via a WLAN AP, or a WWAN transceiver such as a cellular transceiver for communicating with a radio access network. The cellular transceiver may communicate with any one of a plurality of fixed transceiver base stations of the cellular network within its geographic coverage area. The wireless transceivers may include a multi-band cellular transceiver that supports multiple radio frequency bands. Other types of short-range wireless communication include NFC, IEEE 802.15.3a (also referred to as UltraWideband (UWB)), Z-Wave, ZigBee, ANT/ANT+ or infrared (e.g., Infrared Data Association (IrDA) communication).

The wireless communication device 202 also comprises a microphone 532, a speaker 534, a camera 536, a touchscreen 538, a clock (not shown) and a satellite receiver 540 for receiving satellite signals from a satellite network that includes a plurality of satellites which are part of a global or regional satellite navigation system, each coupled to the processor 504. The touchscreen 538 is typically a capacitive touchscreen. The wireless communication device 202 may also comprise a plurality of sensors 544 coupled to the processor 504. The sensors 544 may comprise a biometric sensor such as face scanner or fingerprint scanner, a motion sensor such as an accelerometer, an IR sensor, a proximity sensor, an orientation sensor, electronic compass or altimeter, among possible embodiments. The wireless communication device 202 may also comprise one or more other input devices 542 such as buttons, switches, dials, a keyboard or keypad, or navigation tool, depending on the type of the wireless communication device 202.

Operating system software 550 executable by the processor 504 is stored in the persistent memory 512 but may be stored in other types of memory devices, such as ROM 508 or similar storage element. The operating system software 550 provides a VUI for user interaction with the wireless communication device 202 in the form of touch inputs detected via the touchscreen 538 and/or other input devices 542. A number of application programs 558 executable by the processing system, including the processor 504 are also stored in the persistent memory 512. The application programs 558 include the shopping application 560.

The memory 512 stores a variety of data 572, including sensor data acquired by the sensors 544, location data about the location of the wireless communication device 202, input data acquired by the touchscreen 538 and/or other input devices 542, user data 574 including data about the inventory of an electronic shopping cart of the shopping application 560, user preferences, settings and possibly biometric data about the user for authentication and/or identification, a download cache including data downloaded via the wireless transceivers, and saved files. System software, software modules, specific device applications, or parts thereof, may be temporarily loaded into RAM 508. Communication signals received by the wireless communication device 202 may also be stored in RAM 508. Although specific functions are described for various types of memory, this is merely one embodiment, and a different assignment of functions to types of memory may be used in other embodiments.

The wireless communication device 202 may also comprise a battery (not shown) as a power source, such as one or more rechargeable batteries that may be charged, for example, through charging circuitry coupled to a battery interface such as the serial data port. The battery provides electrical power to at least some of the components of the wireless communication device 202, and the battery interface (not shown) provides a mechanical and electrical connection for the battery.

Figure 6A:
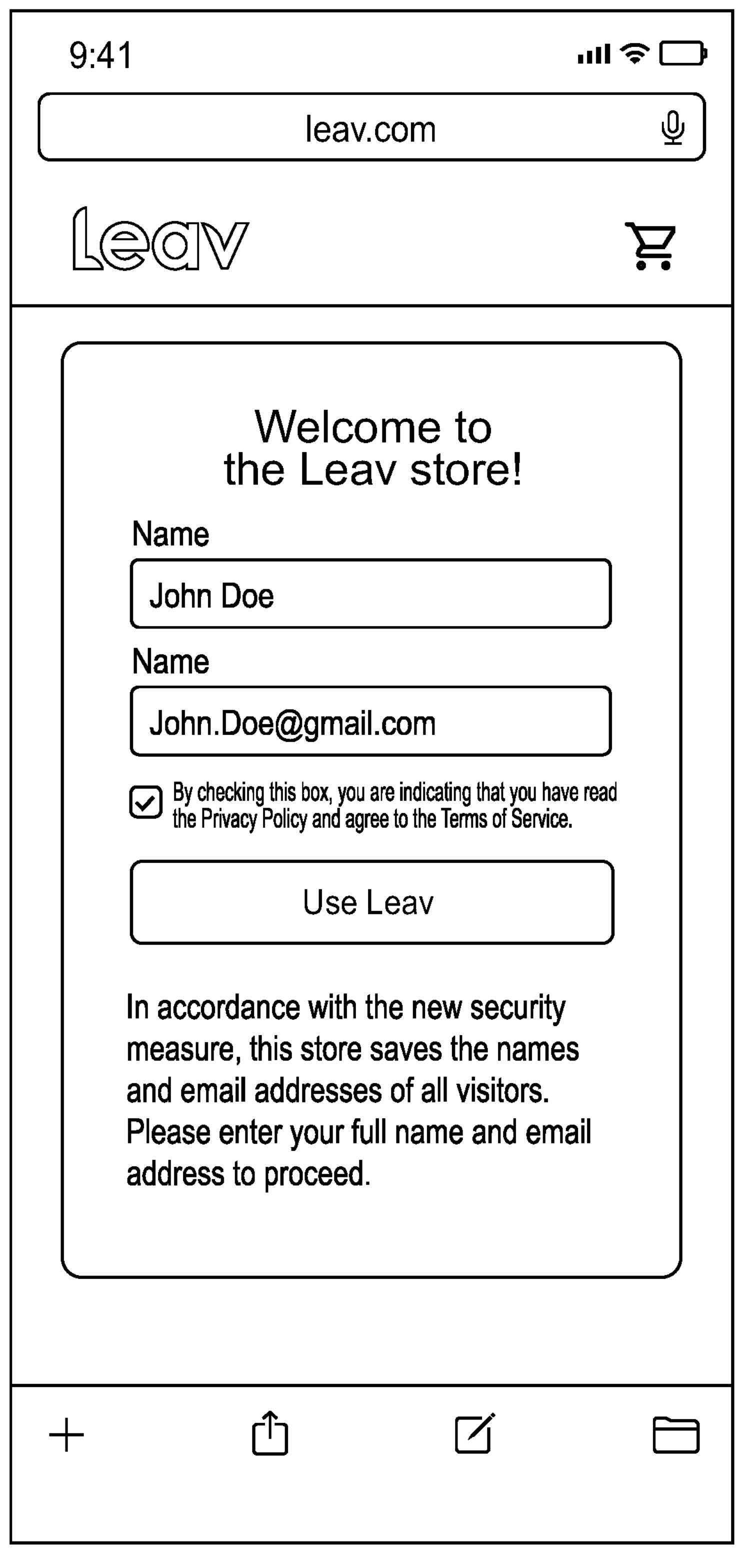
Figure 6B:
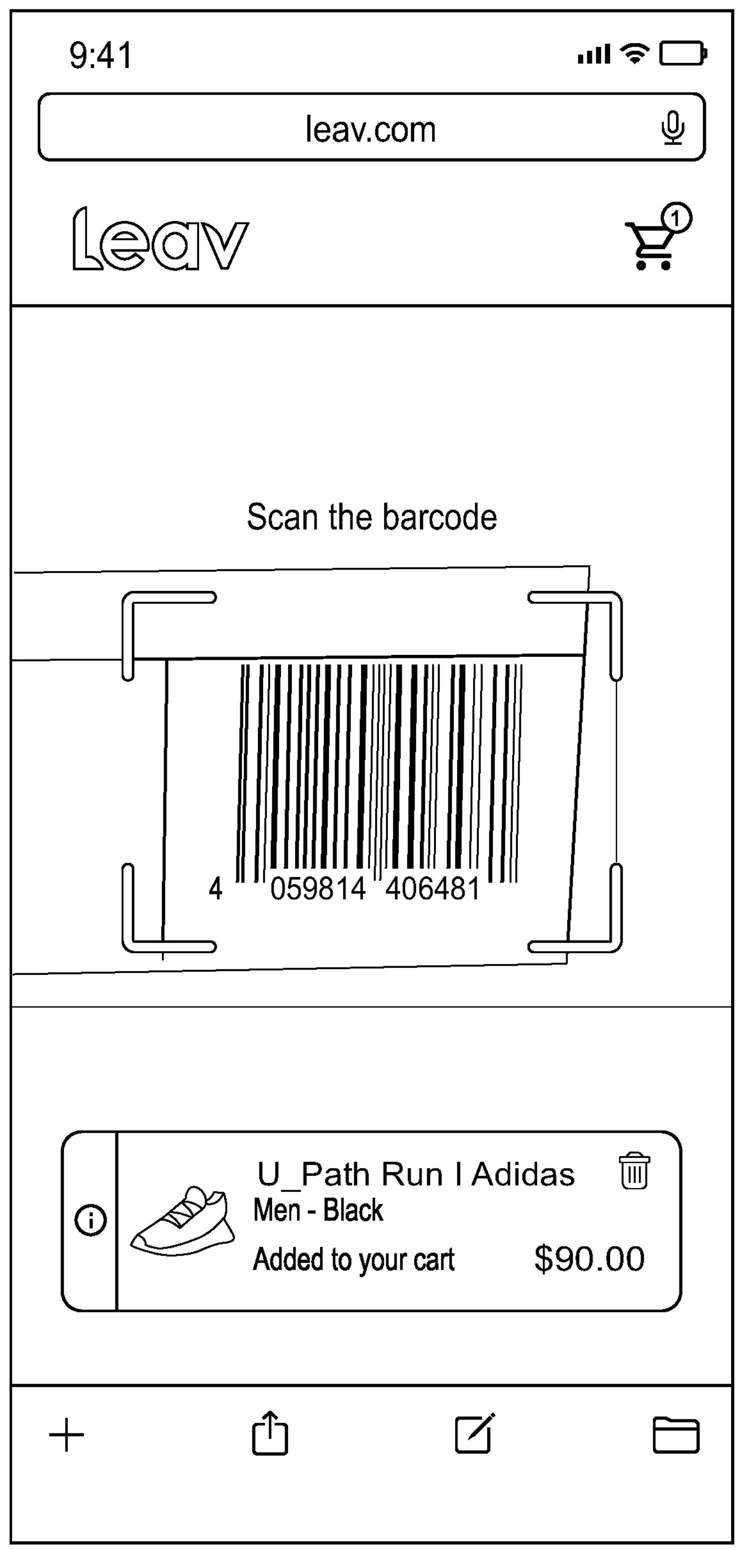

Referring now to FIGS. 6A-6L, the VUI of the shopping application 560 operating on a wireless communication device 202 of a user 101 in accordance with an embodiment of the present disclosure will be described. FIGS. 6A-6L illustrate a series of VUI screens. FIG. 6A illustrates a log-in VUI screen used to initiate a session. FIG. 6B illustrates a scanning VUI screen in which the camera 536 of the wireless communication device 202 is used to capture an image of a barcode (e.g., UPC or QR code) of an item 103 upon which image recognition is performed to read the barcode (e.g., UPC or QR code), determine product code from the barcode (e.g., UPC or QR code), and automatically add the item 103 to the electronic shopping cart of the respective user 101. An "Added Item" notification is displayed on the VUI screen with information about the item, such as a name, image and price, and a button to easily delete from the electronic shopping cart. If no electronic shopping cart exists in the current session, for example because the session has just started, scanning an item 103 using the shopping application 560 creates an electronic shopping cart and a sales transaction that is in progress. If an electronic shopping cart exists, scanning an item 103 using the shopping application 560 adds the scanned item 103 to the inventory of the electronic shopping cart.

Figure 6C:
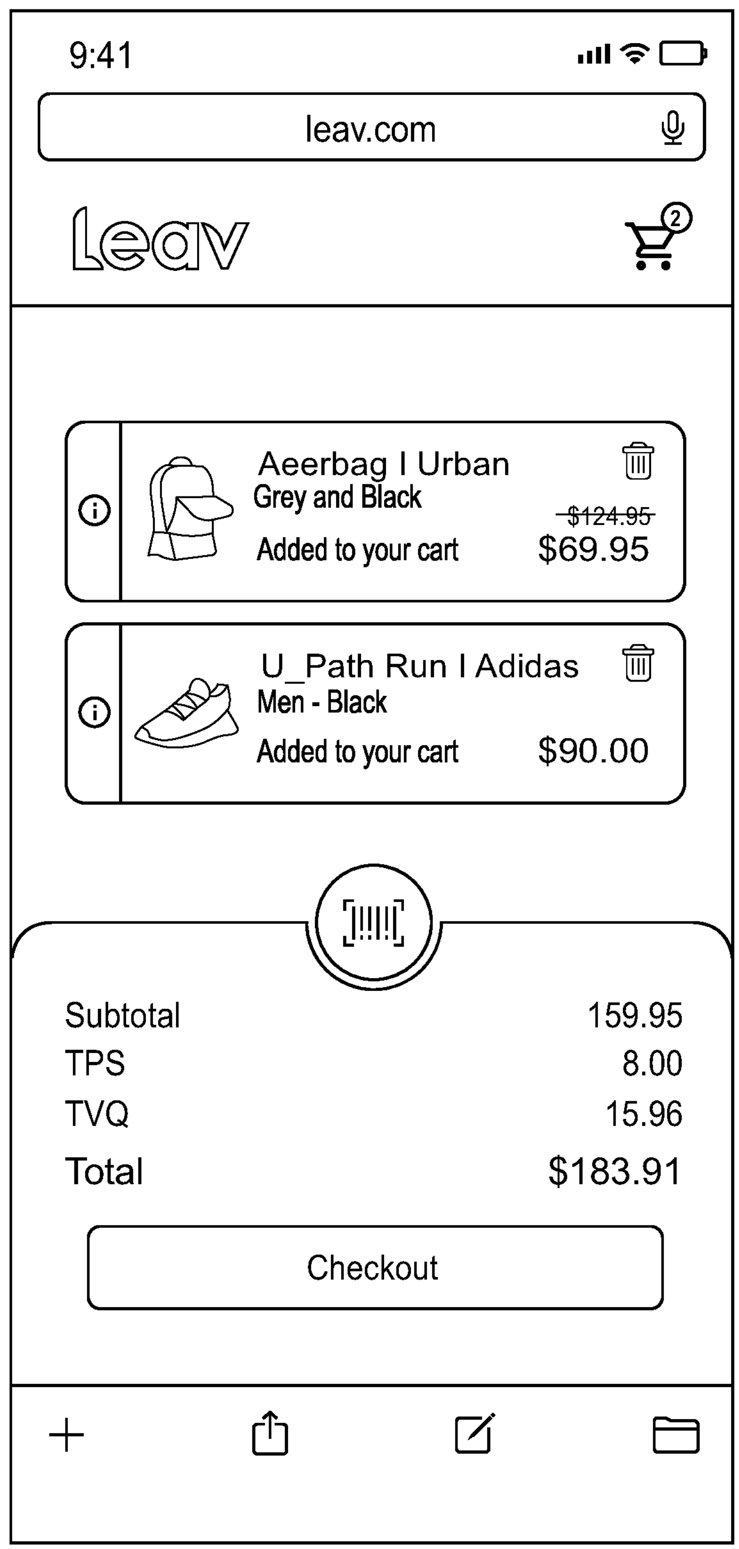

FIG. 6C illustrates an electronic shopping cart VUI screen showing the current content (inventory) of electronic shopping cart, the total of the electronic shopping cart including taxes, and a checkout button to easily initiate an electronic checkout (e.g., a request to complete a sales transaction). Selecting the checkout button causes an electronic checkout VUI screen (an example of which is shown in FIG. 6E) to checkout the electronic shopping cart to be displayed.

Figure 6D:
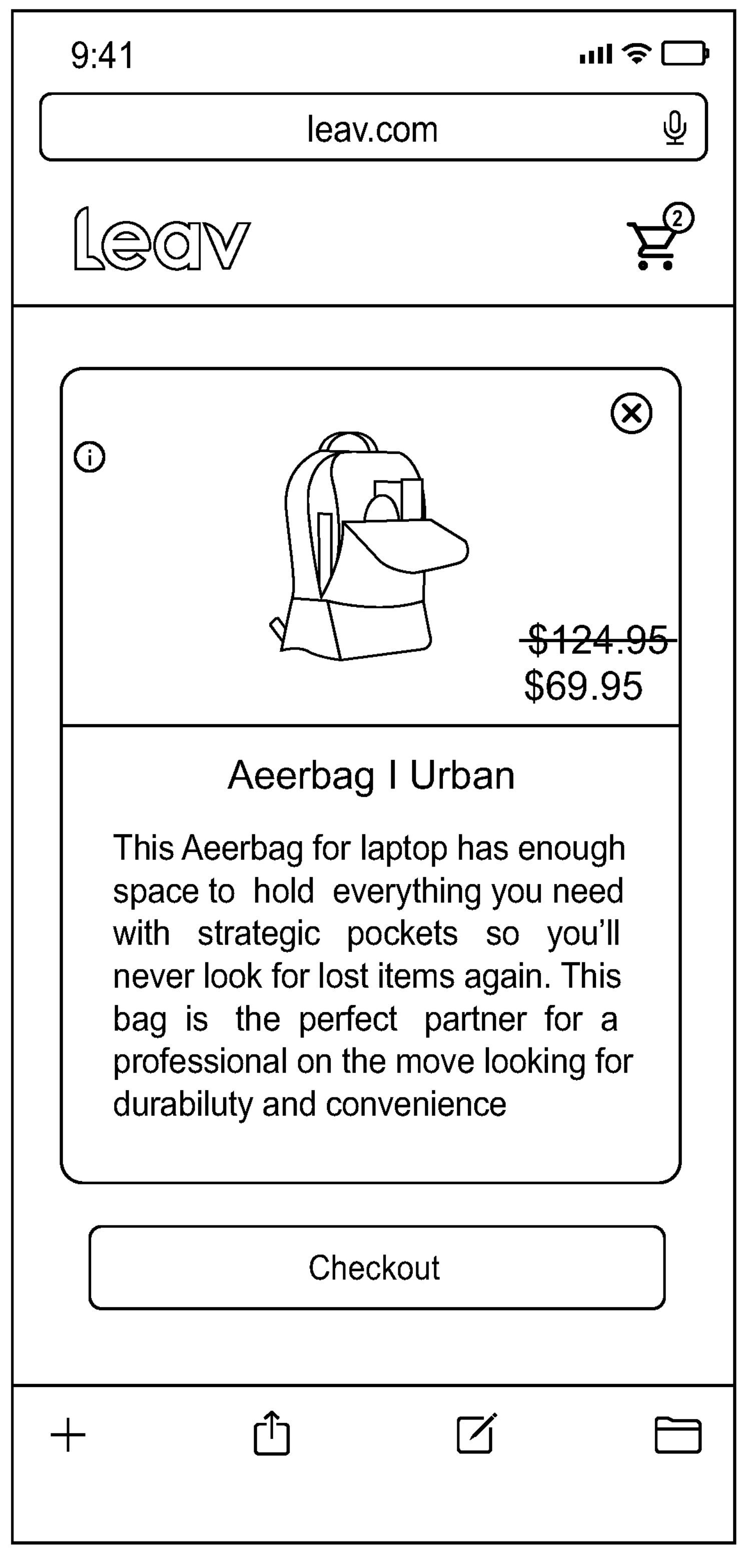
Figure 6E:
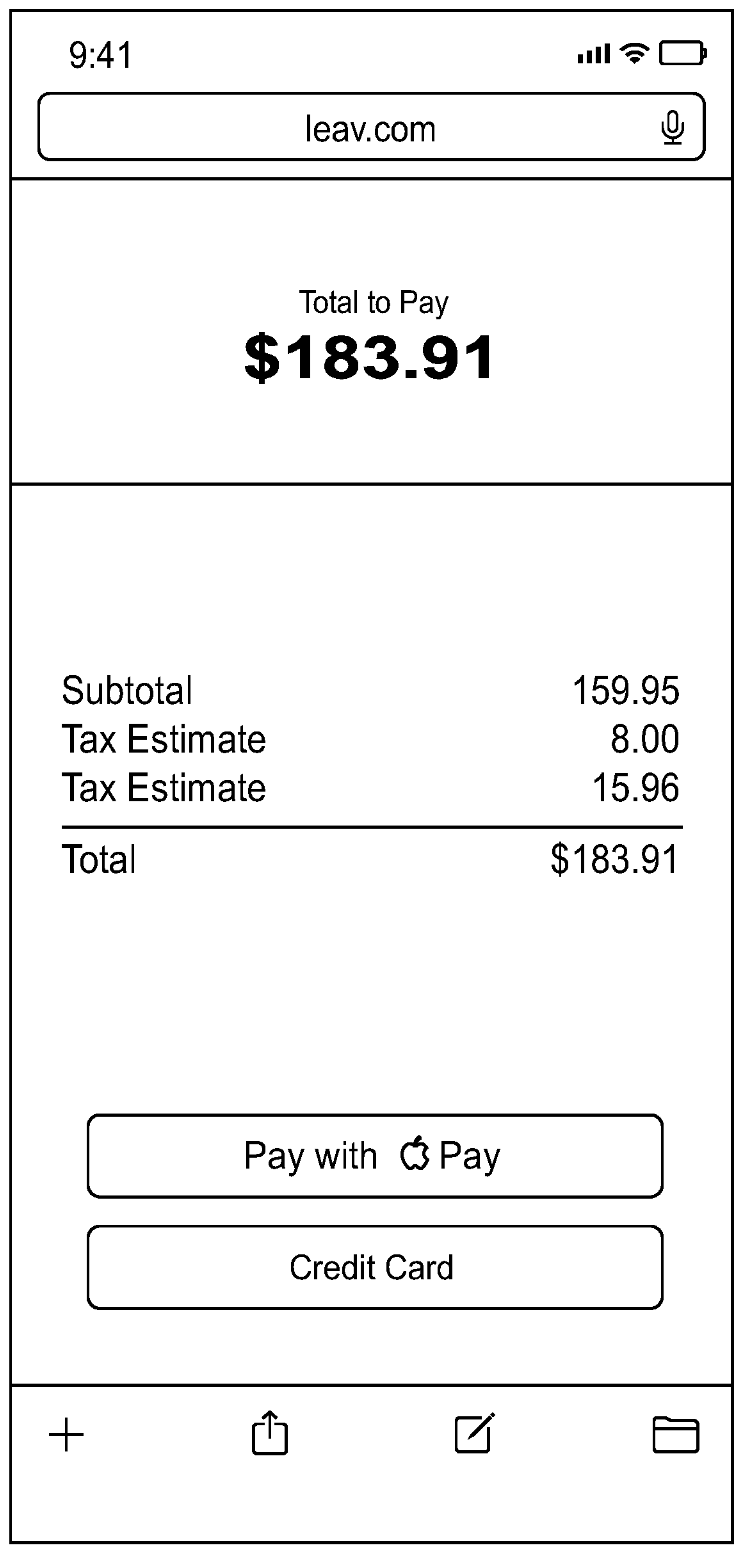

FIG. 6D is a product information VUI screen that provides information about item 103. The product information VUI screen is displayed in response to selecting an information button located in each item entry in the electronic shopping cart or the "Added Item" notification. FIG. 6E illustrates an electronic checkout VUI screen that is displayed in response to selecting the checkout button of the electronic shopping cart VUI screen. The electronic checkout VUI screen to checkout the electronic shopping cart may be easily accessed at any time by selecting the cart icon in the toolbar at the top of the VUI screen of the shopping application 560. FIG. 6F illustrates an "Apple Pay" VUI screen that is displayed in response to selecting the "Apple Pay" button of the electronic checkout VUI screen. The Apple Pay VUI screen of FIG. 6F sets forth details of a payment instruction for the electronic checkout. Confirming the payment instruction, for example by double selecting an indicated button on the wireless communication device 202, causes the payment instruction to be sent to the payment processor 300. The sales transaction is closed or completed in response to receiving a notification from the payment processor 300 that the payment instruction was approved.

Figure 6G:
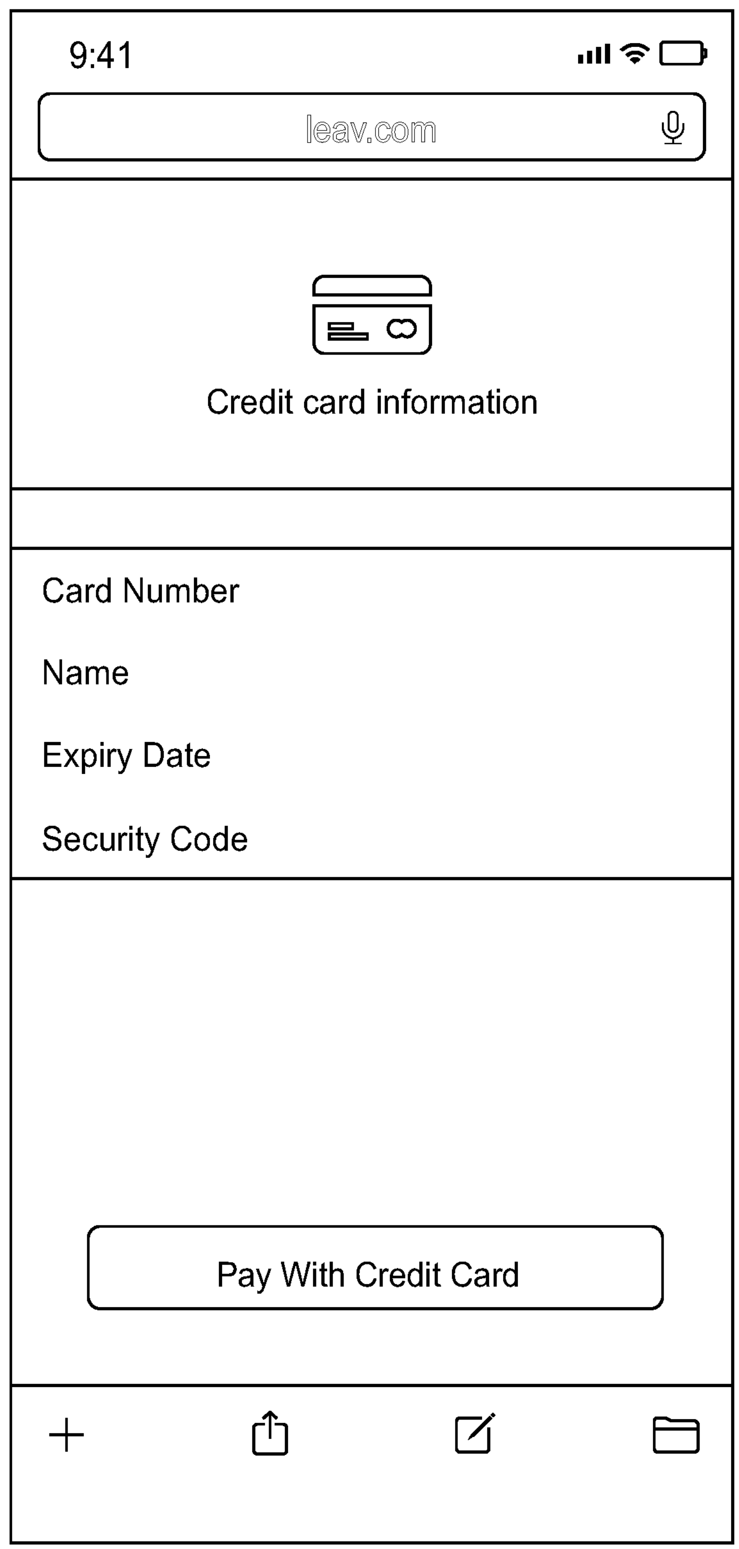
Figure 6H:
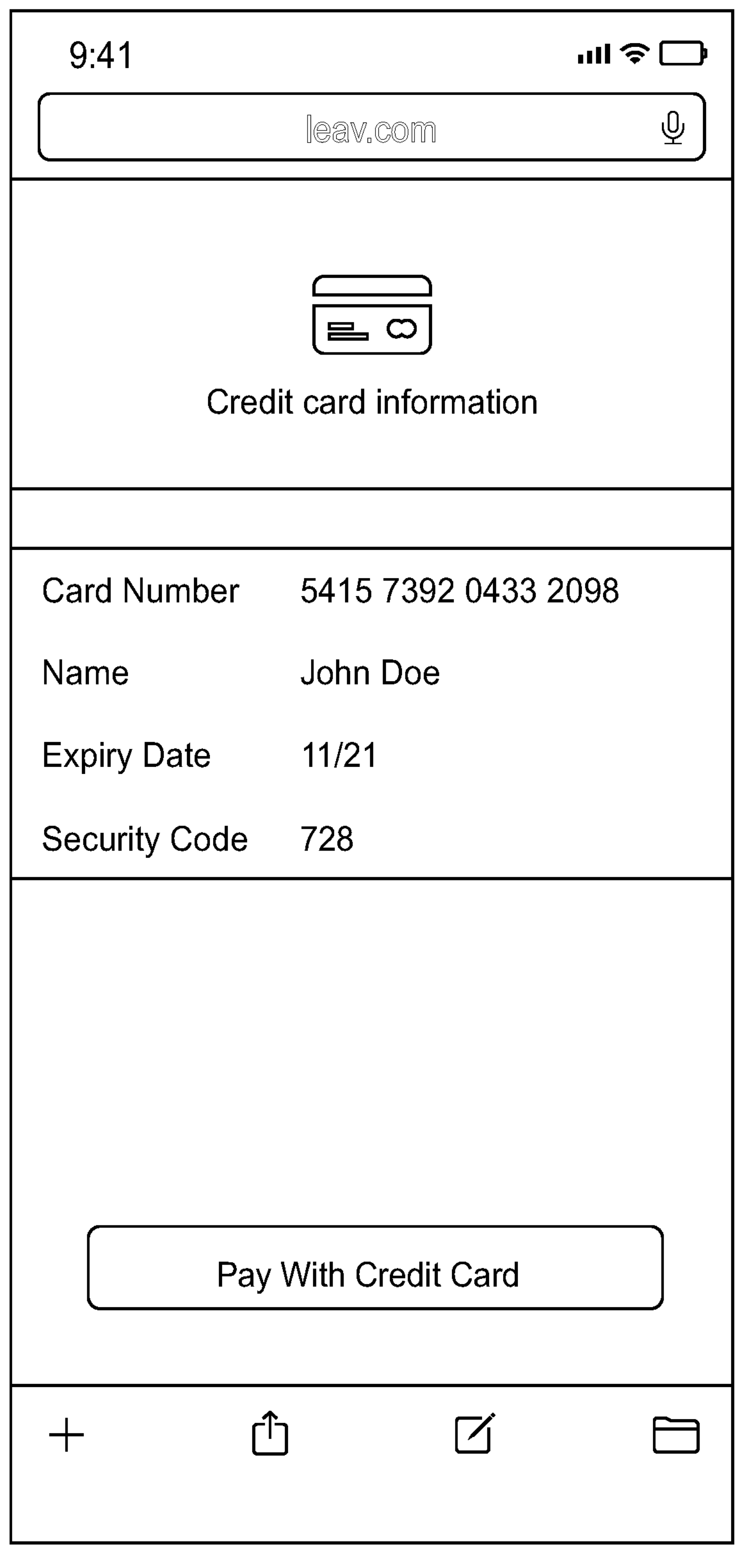

FIG. 6G illustrates a "Credit Card pay" VUI screen that is displayed in response to selecting the "Credit Card" button of the electronic checkout VUI screen. FIG. 6H illustrates a "Credit Card pay" VUI screen after it has been populated by the user 101 with payment information. In some examples, payment information is stored by the retail management system 210, for example in the user database 242 with user data, for subsequent use and so the "Credit Card pay" VUI screen may only be shown in response to payment information being added for the first time, or in response to previously entered payment information being deemed invalid (e.g., credit card has expired or been revoked). The Credit Card pay VUI screen of FIG. 6H sets forth details of a payment instruction for the electronic checkout. Confirming the payment instruction, for example by selecting the "Pay with credit card button" of the Credit Card pay VUI screen displayed by the wireless communication device 202, causes the payment instruction to be sent to the payment processor 300. The sales transaction is closed or completed in response to receiving a notification from the payment processor 300 that the payment instruction was approved.

Figure 6I:
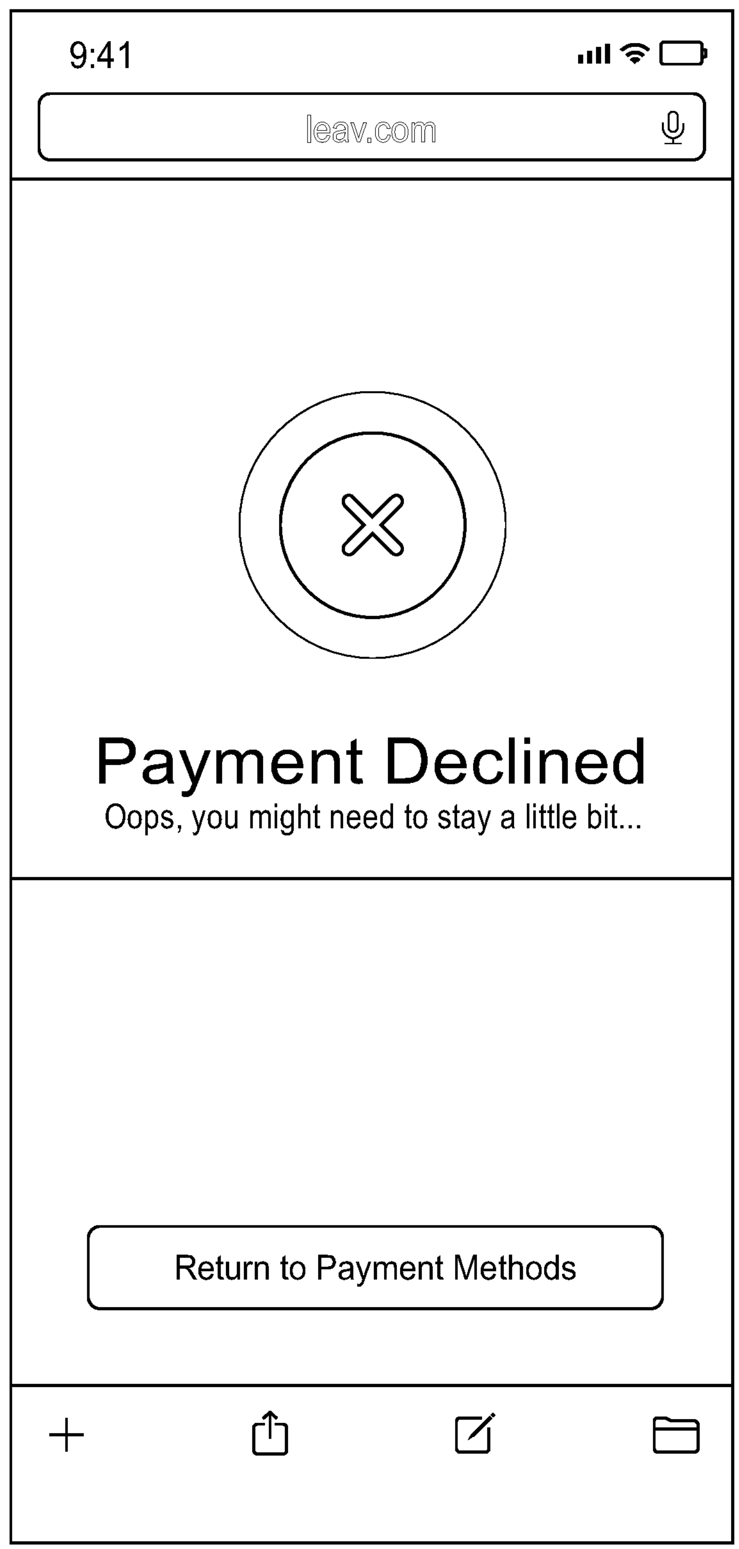
Figure 6J:
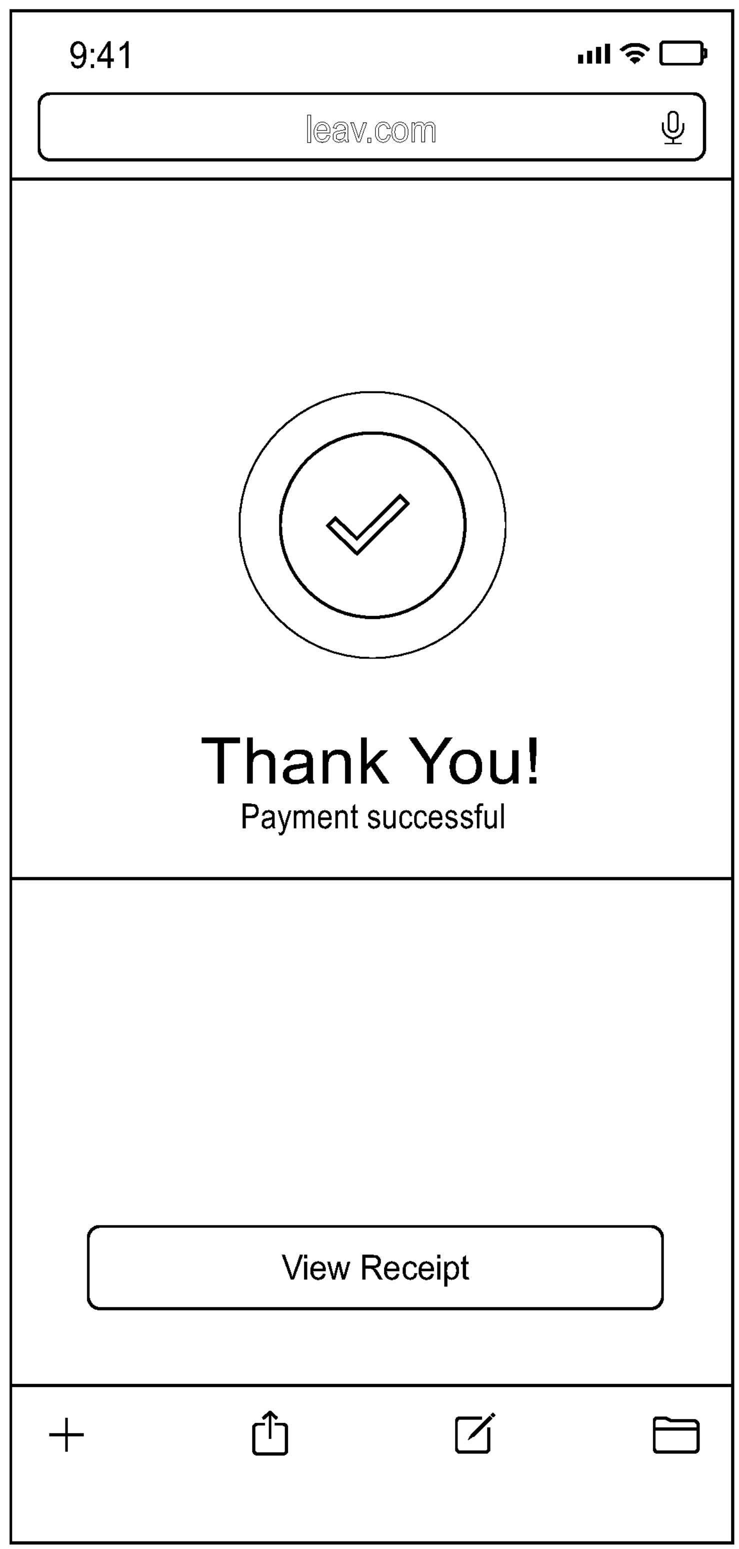
Figure 6K:
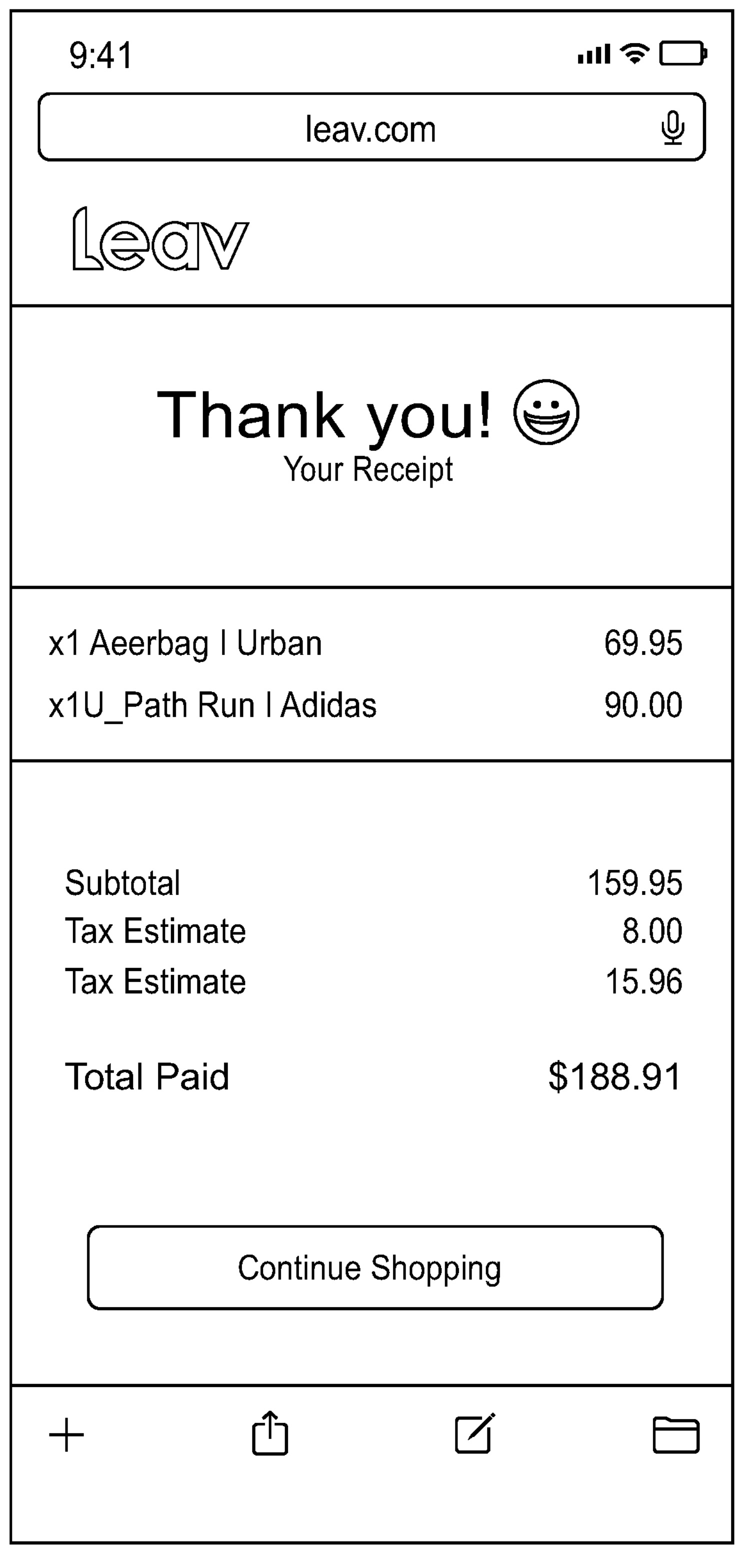
Figure 6L:
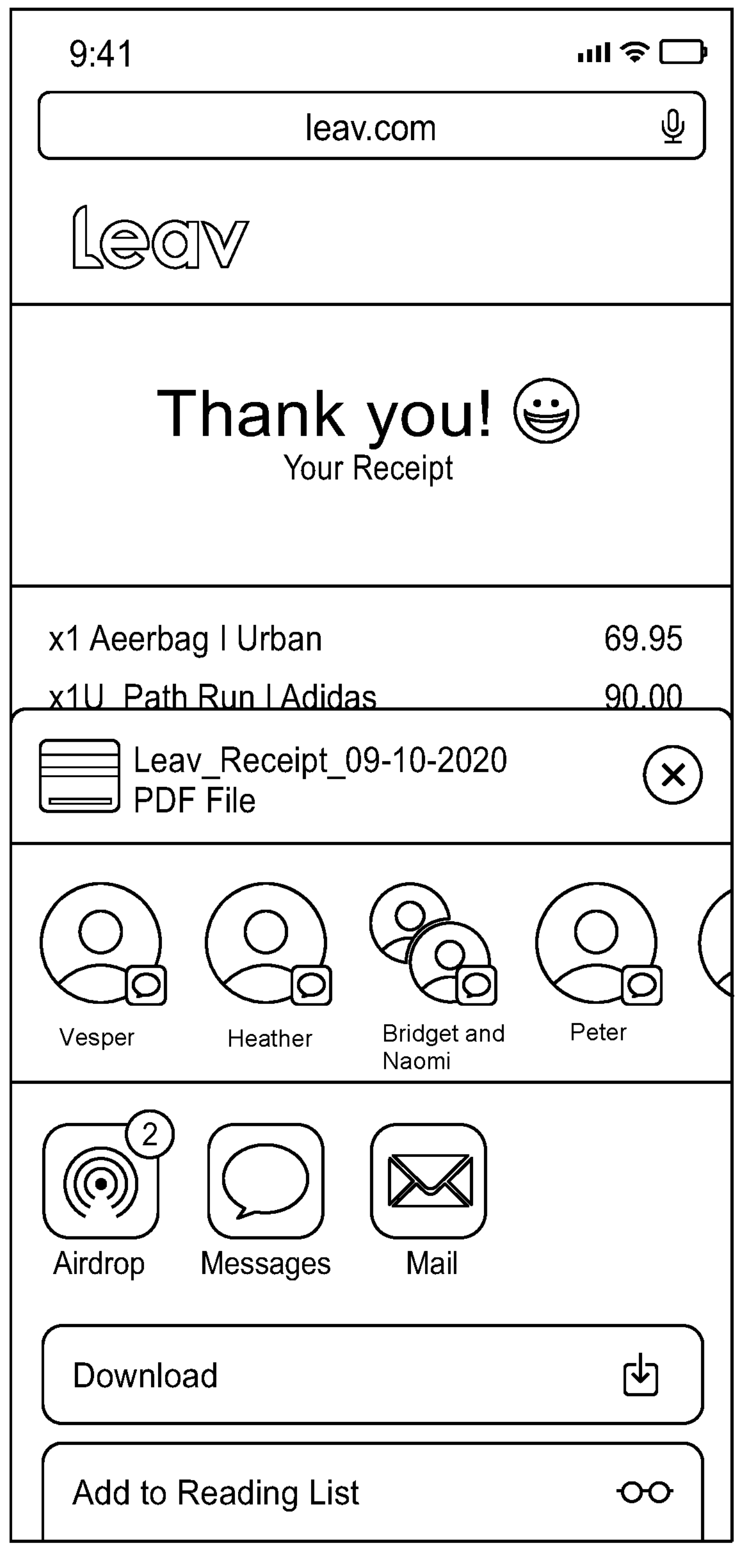

FIG. 6I illustrates a "Payment Declined" VUI screen that is displayed in response to the transaction being declined during the checkout process. FIG. 6J illustrates a "Payment Success" VUI screen that is displayed in response to the transaction being approved during the checkout process. FIG. 6K illustrates a "Receipt" VUI screen that is displayed in response to selecting a "View Receipt" button on the "Payment Success" VUI screen. FIG. 6L illustrates a "Receipt Options" VUI screen that is displayed in response to selecting a "Forward" button on the "Receipt" VUI screen, which provides the user 101 with options to send or download the receipt, among other options.

Figure 7:
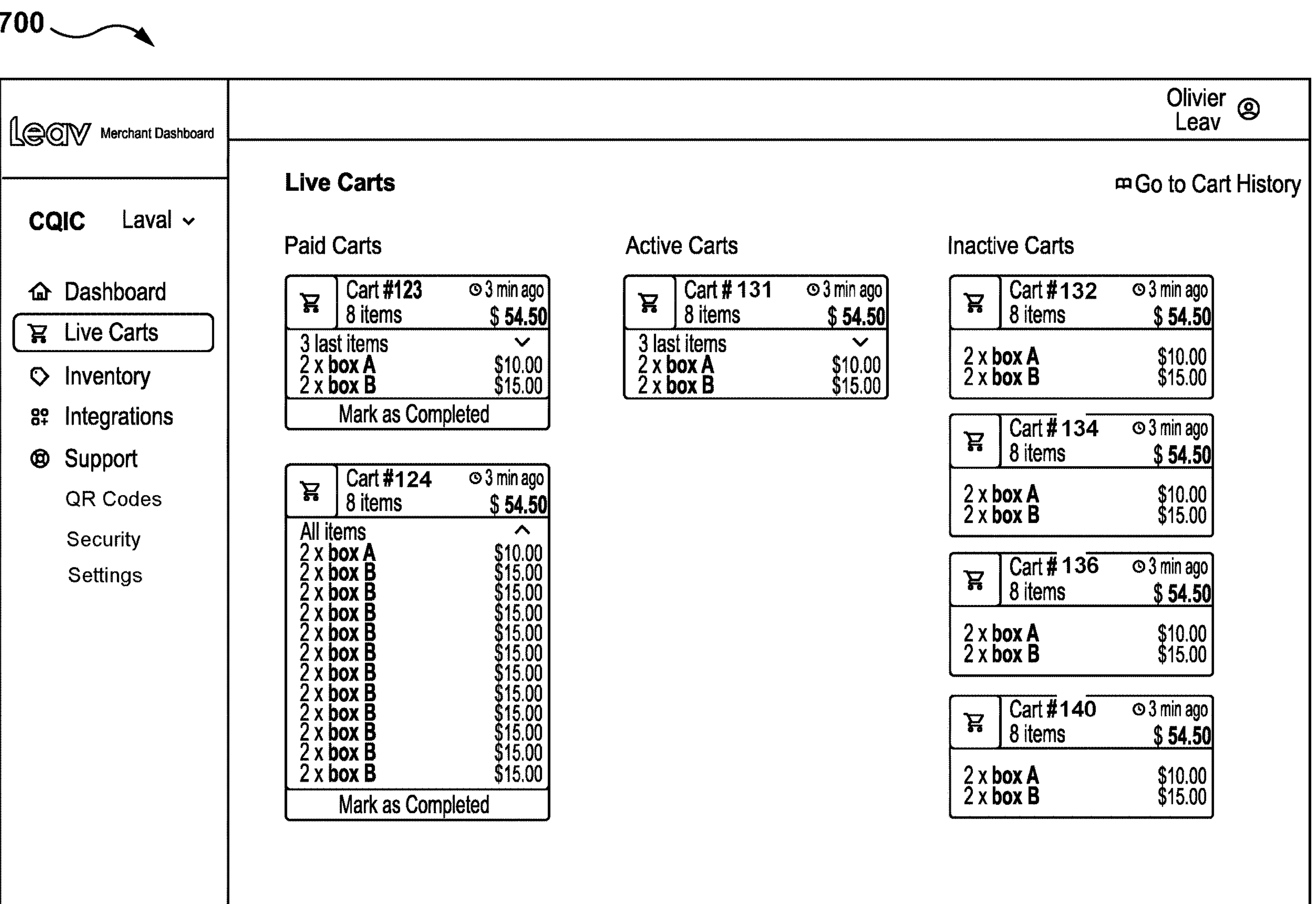
FIG. 7 is a visual user interface screen of a retail management system operating on a computer terminal of a merchant in accordance with an embodiment of the present disclosure.

Referring now to FIG. 7, the VUI of the retail management system 210 operating on a computer terminal 120 of a merchant in accordance with an embodiment of the present disclosure will be described. FIG. 7 illustrates a merchant dashboard VUI screen 700 providing an inventory and cart status for all electronic shopping carts in the retail environment 100 in a given day referred to as the "Live Carts" VUI screen. The cart status of one embodiment will now be described. A new cart is created in response to a new session of the shopping application 560. A new session may be started upon login from a logged out state, scanning an item while in a logged out state, a previous transaction have been completed, a previous cart having been expired (due to inactivity) or being canceled/deleted, when launching the application in a new store, or identifying that the user is in another store (i.e., with geolocation), among other possibilities. A corresponding sale transaction that is in progress is created for each cart. Each cart has a cart status that is one of active, inactive, paid, or alarmed. Carts with a status of active, inactive or alarmed are considered unpaid. The cart status changes based on activity within the shopping application 560 or input via the retail management system 210—a user of the retail management system 210 may change the cart status and/or contents of the cart. An active cart is a cart for which activity has occurred within the shopping application 560 within a predetermined time duration, for example 15 minutes. Activity may include cart and non-cart related activity. Cart related activity includes creating an empty cart, getting an existing cart, adding an item(s) to the cart (an empty or existing one), removing an item(s) from the cart, changing the number of items in the cart, and paying for the cart/checking out. Non-cart related activity includes receiving an invoice/transaction receipt (email or download), adding a preferred payment method, and leaving feedback.

An inactive cart is a cart that has been idle (inactive) for at least the predetermined time duration. A timer for the time duration is set (or reset) each time an item is added or deleted from the cart. The cart status changes from active to inactive after the expiry of the predetermined time duration.

A paid cart is a cart for which an electronic checkout has been completed and payment has been received through the shopping application 560 or POS system.

An alarmed cart is a cart flagged in response to a determination that the virtual inventory of the physical shopping container does not match the inventory of the electronic shopping cart as described herein, and likely contains unscanned (e.g., stolen) items. All carts may be alarmed whether the carts are active, inactive or paid. For example, if an unpaid item is added to the physical shopping container associated with a "paid" cart status, the paid cart is alarmed. A message may be displayed in the "Live Carts" VUI screen of merchant dashboard such as "Paid cart x: Unpaid item detected at Door y". The cart payment/process status is based on data received by the shopping application 560 and customer actions detected by the computer vision system 230 (active/inactive/paid/unpaid). The cart alarm status is based on data received by the shopping application 560, customer actions detected by the computer vision system 230 (active/inactive/paid/unpaid), and RFID tag detection events detected by the RFID system 122.

An alarmed cart may have its status changed based on activity via the shopping application 560 or corresponding user input received by the retail management system 210, for example, based on input from a store employee. For example, adding the item(s) determined to be in the physical shopping container but not in the electronic shopping cart to the electronic shopping cart, by the user via the shopping application 560, changes the cart status from "alarmed" to "active". A store employee may change the status of a cart via the retail management system 210, for example, in response to a determination that the inventory of the electronic shopping cart matches the inventory of the physical shopping container based on a physical or virtual inspection of the physical shopping container. Alternatively, a virtual inspection may be performed by the computer vision system 230 rather than a store employee, which may be trained to perform object recognition on the contents of the physical shopping container in response to the contents of the physical shopping container being shown to and imaged by a camera 104 at an inspection station, area or the like, the camera 104 being connected to the computer vision system 230.

Each cart is displayed in the merchant dashboard VUI of the retail management system 210 until hidden/cleared. A non-alarmed cart (e.g., active, inactive, unpaid, paid) may be hidden/cleared by a user, for example, via corresponding user input received by the retail management system 210 or expiry of a predetermined time duration (e.g., 30 minutes) from the time of payment (the expiry of a predetermined time duration being measured by a countdown timer). The options for displaying an alarmed cart is configurable. An alarmed cart may be hidden/cleared by one or both of user input and expiry of a predetermined time duration. Cart data is reset daily shown in the Live Carts VUI screen 700. Historical cart data and transaction data is maintained by the retail management system 210. The inventory and cart status of each electronic shopping cart is updated based on data received from the respective wireless communication devices 202, preferably in real-time or near real-time.

Figure 8A:
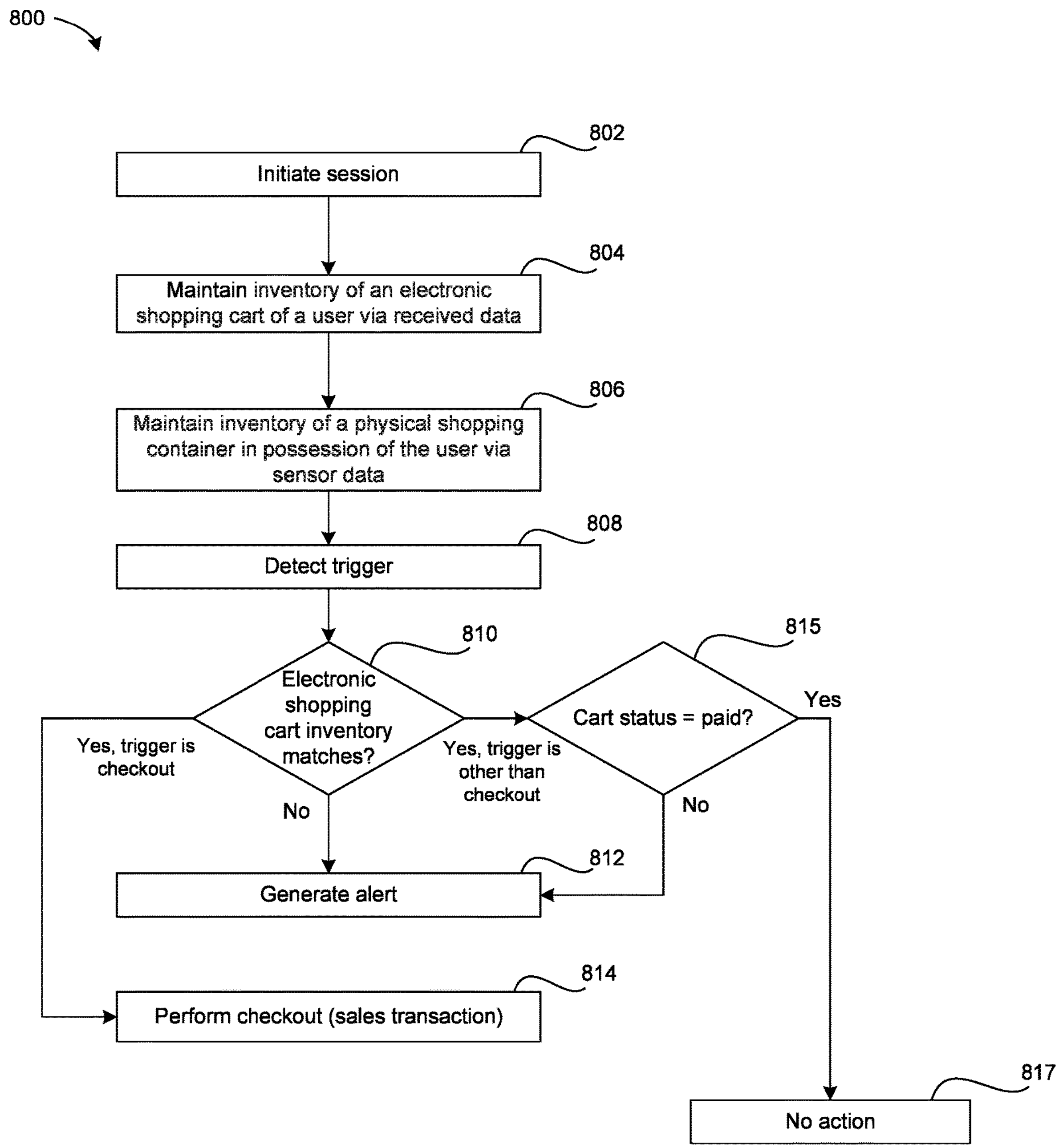
FIG. 8A is a flowchart of a method performed by a computer terminal for operating a contactless checkout system in accordance with a first embodiment of the present disclosure.

Referring now to FIG. 8A, a method 800 performed by a computer terminal for operating a contactless checkout system in accordance with a first embodiment of the present disclosure will be described. At least parts of the method 800 are carried out by software executed by a processor, such as the processor 260 of the computer terminal 120 or the processor 402 of the remote server 250.

At operation 802, a session is initiated on the wireless communication device 202 of a user 101. The session may be initiated in response to input such as a sign-in or log-in to the shopping application 560 or sensor data received by the wireless communication device 202. For example, the sign-in or log-in may occur based on input to launch the shopping application 560 and optionally enter user credentials to authenticate the user 101, or the sign-in or log-in may occur automatically based on location data obtained by the sensors 544 of the wireless communication device 202 in response to the processor 504 determining that the wireless communication device 202 is within a geofence or geographical boundary of the retail environment 100. The location data of the geofence or geographical boundary of the retail environment 100 may be stored by the shopping application 560.

At operation 804, an inventory of an electronic shopping cart is maintained by the retail management system 210 on the computer terminal 120 and/or the remote server 250 via data received from the wireless communication device 202. During the session, the shopping application 560 maintains the inventory of the electronic shopping cart of a user 101 in a retail environment 100 as items are added or removed to the electronic shopping cart as described above, for example, by scanning items 103 using the shopping application 560. The shopping application 560 communicates the inventory of the electronic shopping cart to the retail management system 210 on the computer terminal 120 and/or the remote server 250 in real-time or near real-time. This allows the computer terminal 120 and/or the remote server 250 to maintain a copy of the inventory of the electronic shopping cart of the user 101. Each time an item is added or removed from the electronic shopping cart of the shopping application 560, an update with corresponding item details including the name, product ID and quality of the item added to the electronic shopping cart is sent to the computer terminal 120 and/or the remote server 250.

At operation 806, the retail management system 210 on the computer terminal 120 and/or the remote server 250 maintains a virtual inventory of a physical shopping container 104 in possession of the user 101 in the retail environment 100 via a sensor data collected by the sensors 204 in the retail environment 100, as described below.

At operation 808, the retail management system 210 on the computer terminal 120 and/or the remote server 250 detects a trigger for performing a security check. The retail management system 210 monitors for a plurality of triggers for performing a security check, as described above. The triggers may include any one or a combination of receiving input from the wireless communication device 202 of the user 101 to perform an electronic checkout, a determination that the user is in a detection zone 107 of the retail environment 100, and detection of an RFID tag by an RFID reader/detector located in a detection zone 107 of the retail environment 100. As noted above, the detection zone 107 may be an entrance/exit zone 103 of the retail environment 100.

At operation 810, the security check is performed. Performing the security check comprises determining whether the virtual inventory of the physical shopping container matches the inventory of the electronic shopping cart. In some examples, determining whether the virtual inventory of the physical shopping container matches the inventory of the electronic shopping cart comprises comparing items in the virtual inventory of the physical shopping container with the inventory of the electronic shopping cart, and determining any items in the virtual inventory of the physical shopping container that are not in the electronic shopping cart. A determination that virtual inventory of the physical shopping container does not match the inventory of the electronic shopping cart is made in response to a determination that one or more items in the virtual inventory of the physical shopping container are not in the electronic shopping cart.

In some examples, determining whether the virtual inventory of the physical shopping container matches the inventory of the electronic shopping cart comprises determining any items associated with a RFID tag in the virtual inventory of the physical shopping container, comparing any items associated with an RFID tag in the virtual inventory of the physical shopping container with the inventory of the electronic shopping cart, and determining any items in the virtual inventory of the physical shopping container associated with an RFID tag that are not in the electronic shopping cart based on the comparing. A determination that the virtual inventory of the physical shopping container does not match the inventory of the electronic shopping cart is made in response to a determination that one or more items in the virtual inventory of the physical shopping container associated with an RFID tag are not in the electronic shopping cart.

At operation 812, in response to a determination that the virtual inventory of the physical shopping container does not match the inventory of the electronic shopping cart, the status of the cart is electronic shopping cart is changed to alarmed or the like, and an alert is generated.

Depending on how and when the security check is triggered, the alert may comprise one or a combination of an electronic alert in the form of an electronic message or notification, an audible generated by a speaker 132 in the retail environment 100, or a visual alert generated by a light 234 in the retail environment 100. In response to the trigger being receiving input from the wireless communication device 202 of the user 101 to perform an electronic checkout, the electronic checkout is not allowed to proceed in response to the generation of the alert. As noted above, an electronic alert may be used in response to a trigger. The trigger may be, or comprise, a determination that the virtual inventory of the physical shopping container does not match the inventory of the electronic shopping cart (i.e., the status of the cart is electronic shopping cart is changed to alarmed or the like) and the user and/or physical shopping container is not in a detection zone 107 of the retail environment 100, such as in response to the user selecting "Checkout" in the shopping application 560 or otherwise provides input on the wireless communication device 220 to perform an electronic checkout of the electronic shopping but is not in a detection zone 107 of the retail environment 100. The electronic alert is typically sent to the user 101 on the wireless communication device 202 and to the merchant. The electronic alert to the merchant may be sent directly to a store employee via a personal computing device of the store employee and displayed upon an available display such as a display of a smartphone of the employee or an optical head mounted display, such as AR glasses, or an in-application notification within the VUI of the retail management system 210 operating on the computer terminal 120 of the merchant (e.g., via a merchant dashboard VUI) or within the VUI of a POS (e.g., an mPOS) of the merchant. The electronic alert may be accompanied by an audible alert generated via a speaker 132, which may be located in the detection zone(s) 107 of the retail environment 100 and/or a visual alert generated via a light 134, which may be located in the detection(s) zone 107 of the retail environment 100.

At operation 814, in response to the trigger being receiving input from the wireless communication device 202 of the user 101 to perform an electronic checkout, the electronic checkout is allowed to proceed and is subsequently performed in response to a determination that the virtual inventory of the physical shopping container matches the inventory of the electronic shopping cart.

In response the trigger being an event other than receiving input from the wireless communication device 202 of the user 101 to perform an electronic checkout, such as a determination that the user/physical shopping container is in a detection zone 107 of the retail environment 100, in response to a determination that the virtual inventory of the physical shopping container matches the inventory of the electronic shopping cart, processing proceeds to operation 815 at which a cart status of the corresponding electronic shopping cart is determined. In response to a determination that the cart status of the corresponding electronic shopping cart is "paid", no action is taken at 817. Alternatively, rather than taking no action a notification may be caused to be displayed on the display of the wireless communication device 202, such as a thank you message, a loyalty points balance, a promotion, an advertisement or the like.

In response to the trigger being an event other than receiving input from the wireless communication device 202 of the user 101 to perform an electronic checkout, such as a determination that the user/physical shopping container is in a detection zone 107 of the retail environment 100, in response to a determination that the cart status of the corresponding electronic shopping cart is a cart status other than "paid", processing proceeds to operation 812 at which the status of the electronic shopping cart is changed to alarmed or the like, and an alert is generated.

Figure 8B:
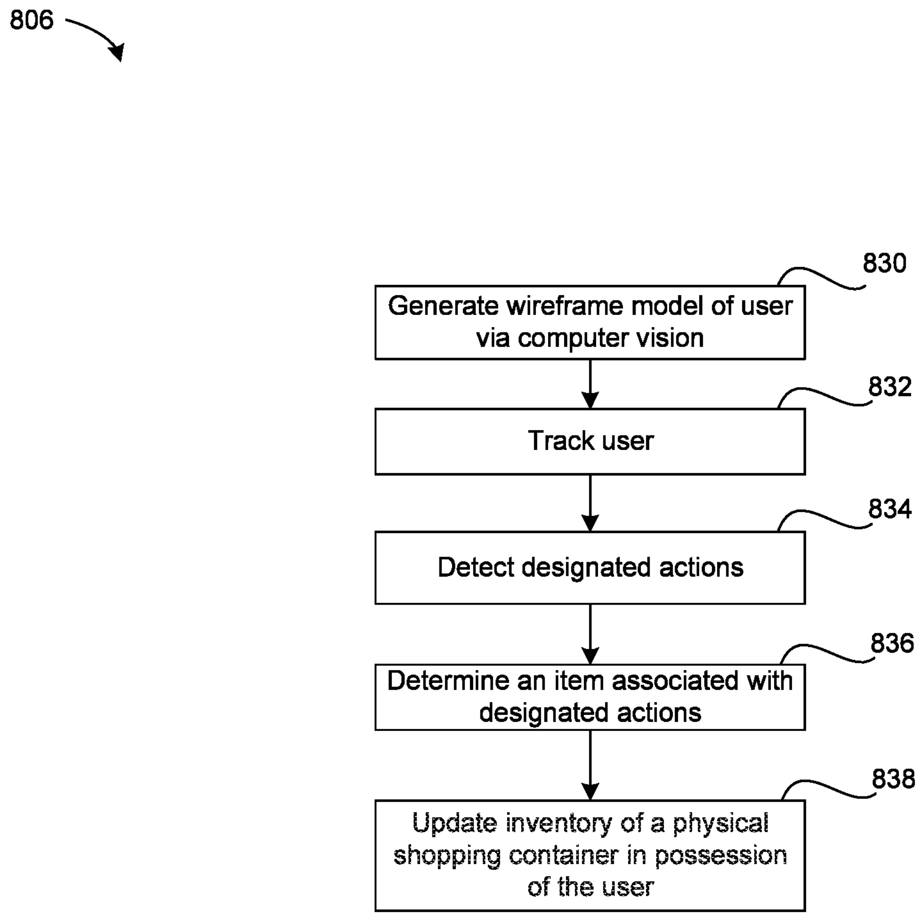
FIG. 8B is a flowchart of a method of maintaining a virtual inventory of the physical shopping container in possession of users in accordance with a first embodiment of the present disclosure.

Referring now to FIG. 8B, a method of maintaining a virtual inventory of the physical shopping container 104 in possession of users 101 in the retail environment 100 via a sensor data collected by the sensors 204 in accordance with a first embodiment of the present disclosure will now be described. At operation 830, the computer vision system 230 generates a wireframe model (also referred to as a skeleton or skeletal model) of the user 101 from sensor data, including video, captured by sensors 204, including cameras 104, in the retail environment 100. The generation of the wireframe model may be assisted by the use of depth information obtained from depth sensing cameras, proximity data obtained from depth from proximity sensors and/or motion data obtained from depth from motion sensors. The generation of the wireframe model may be based on human pose estimation based on deep neural networks or other artificial intelligence or machine learning techniques, examples of which are known in the art. Examples of suitable human pose estimation techniques are described in the following documents, which are incorporated herein by reference: Alexander Toshev and Christian Szegedy, DeepPose: Human Pose Estimation via Deep Neural Networks, IEEE Conference on Computer Vision and Pattern Recognition, 9 pages, Aug. 20, 2014; Jonathan Tompson, Ross Goroshin, Arjun Jain, Yann LeCun and Christopher Bregler, Efficient Object Localization Using Convolutional Networks, New York University, 9 pages, Jun. 9, 2015; Shih-En Wei, Varun Ramakrishna, Takeo Kanade and Yaser Sheikh, Convolutional Pose Machines, The Robotics Institute, Carnegie Mellon University, 9 pages, 12 Apr. 2016; Joao Carreira, Pulkit Agrawal, Katerina Fragkiadaki and Jitendra Malik, Human Pose Estimation with Iterative Error Feedback, 10 pages, Jun. 2, 2016; Alejandro Newell, Kaiyu Yang and Jia Deng, Stacked Hourglass Networks for Human Pose Estimation, University of Michigan, 17 pages, Jul. 26, 2016; Bin Xiao, Haiping Wu and Yichen Wei, Simple Baselines for Human Pose Estimation and Tracking, ECCV 2018, 16 pages, Aug. 21, 2018; and Ke Sun, Bin Xiao, Dong Liu and Jingdong Wang, Deep High-Resolution Representation Learning for Human Pose Estimation, 12 pages, Feb. 25, 2019.

At operation 832, the computer vision system 230 uses the wireframe model to track the user 101 as the user 101 moves through the retail environment 100. As the user 102 moves through the retail environment 100, the sensors 204 used by the computer vision system 230 to track the user may change as the user moves between in and out of the sensor range or FOV of the various sensors 204. The computer vision system 230 uses body mapping and tracking algorithms to track the wireframe model of the user 101 as the user 101 moves through the retail environment 100. The tracking of the wireframe model may be based on human pose estimation based on deep neural networks or other artificial intelligence or machine learning techniques, examples of which are known in the art and mentioned above. For example, human pose estimation may be provided using OpenCV described above and at https://learnopencv.com/deep-learning-based-human-pose-estimation-using-opencv-cpp-python/, the content of which is incorporated herein by reference. Human pose estimation for generating and tracking the wireframe model may be provided by a first convolutional neural network (CNN). The first CNN may be trained on data from the COCO training dataset described in and available, for example, at https://cocodataset.org/#keypoints-2020, and MPII Human Pose dataset available, for example, at http://human-pose.mpi-inf.mpg.de/, the content of which is incorporated herein by reference. The architecture of the first CNN may vary. The first CNN is trained to generate a wireframe mode comprised of a plurality of linked skeletal nodes based on pictures with annotated skeletal nodes in the COCO training dataset or other similar dataset. The first CNN is further trained to track the movement of the wireframe model through the retail environment 100 based at least in part on human pose data in the MPII Human Pose dataset. As described more fully below with respect to operation 834, the output of the first CNN is input to an action classification system, which may comprise a second CNN. It will be appreciated that skeletal mapping provides anonymity and removes the ability to perform facial recognition at a later stage, thereby providing customer privacy.

The first CNN may be configured to perform operations 830 and 832 simultaneously, i.e., generate a wireframe model for each user 101 in the retail environment 100 and track the wireframe models for each user 101 through the retail environment 100. The wireframe model of each user 101 may be overlaid over the source video from which the wireframe model was generated and displayed on a display 408 of the computer terminal 120 and/or a display connected to the remote server 250. Each wireframe model (and optionally source video) may be displayed in a separate window or box in a corresponding user interface screen of the VUI of the retail management system 210 for easier viewing by a store employee, a remote administrator or the like. The wireframe models may be arranged tiles in the user interface screen of the VUI of the retail management system 210. The first CNN may be referred to as a wireframe model generator. The output of the first CNN may be a set of positional point data over time for each user 101, each time sample being represented by a set of positional point data such as 3D point cloud. As would be understood to a person skilled in the art, a point cloud is a large set of points in a coordinate system, typically a 3D coordinate system. Each point in the point cloud has three (3) coordinates namely x, y, and z, which determine where the point is located along x, y, and z axes of the 3D coordinate system, respectively. A point cloud at a given time may be referred to as a frame. Thus, the output of the first CNN may be a point data stream comprising one or more point cloud sequences (e.g., sets of point cloud frames), one point cloud sequence for each user 101 in the retail environment 100.

At operation 834, the computer vision system 230 detects designated actions performed by the user from a plurality of different actions based on g the wireframe model using an action classification system, which may comprise a second CNN (which may be referred to as an action classifier). The second CNN is trained to recognize and detect the designated actions using a training data representing the form of detectable/recognizable actions. The second CNN may be trained using supervised learning based an input data set of pre-classified wireframe models (point cloud data) over time, each representing a designated action. The input dataset is, or comprises, a proprietary input dataset that considers information from the MPII dataset (pose estimation). The point cloud sequence may be generated manually and/or automatically using synthetic data generation).

The computer vision system 230 may also be used to perform object recognition and tracking, for example, based on video generated by the cameras in the retail environment 100. The computer vision system 230 may use the "You only look once" or "YOLO" algorithm to identify objects in the video frame(s) and track the objects. The "YOLO" algorithm is described, for example, at https://pjreddie.com/darknet/yolo/, the content of which is incorporated herein by reference. Movement object tracking may be performed, for example, to know whether the person has an object in hand or not. The same or similar method may be used to classify objects (phone, bottle, etc.). Image segmentation may also be performed to improve object recognition, tracking and classification. Image segmentation, each video frame is partitioned into multiple segments. Each segment is defined by a set or pixels known as image objects. Each of the pixels in a segment are similar with respect to a characteristic or computed property such as colour, intensity, or texture, and may be correlated to a shared/common semantic concept.

In each frame, the following information may be extracted: customer skeleton/joint position; product(s); product movement through the frame (the object and the defining box changes). The relationship between the product and the customer's action may be defined based on the customer hand related joints and the product movement—this may be performed in 2D based on a single video feed, or 3D based on multiple video feeds reducing blind zones or via the use of 3D cameras The additional information on the product (may be up to the article category or the reference itself) may assist in differentiating between similar actions. For example, a customer stretching near the ice cream shelf could look similar to a customer reaching to grab a panettone on the top shelf of the Italian section if the presence of a product/object near the hand of a customer is not taken into account. In addition, the object could be the customer's smartphone and smartphone identification may help reduce false positives.

The designated actions are a subset of detectable/recognizable actions predesignated from a set of detectable/recognizable actions which the computer vision system 230 is trained to recognize. In some examples, the designated actions are placing an item in the physical shopping container and removing an item from the physical shopping container. The computer vision system 230 may be trained to recognize and detect a plurality of other actions such as one or more of scanning an item 103, removing an item 103 from an inventory storage location, returning an item 103 to an inventory storage location, pickup up an item 103, returning an item 103, switching an item 103, giving an item 103 to another user, dwelling with an item 103 in-hand, viewing/gazing/starting/looking at an item 103, walking or moving, moving to or from a detection zone, moving to or from a checkout area, entering the retail environment via an exit/entrance, and exiting the retail environment via an exit/entrance. The computer vision system 230 may also identify a type of the physical shopping container 104 of the user 101, such as a shopping cart, basket, or bag, and a head orientation or gaze of the user 101 with regards to the product position, for example, to determine what items the user was looking at.

Each detected action is associated with a timestamp indicating a time at which the action was detected, which is stored in memory along with the action in an action log. Each detected action may also be stored in the action log along with an associated timestamp indicating a time at which the action was recognized. In addition to use in determining the virtual inventory of the physical shopping container, detected actions may be used for retail analytics (e.g., measuring customer interest in products and/or product packaging), in-store employee notifications, in-store customer notifications, in-store product placement and disposition, analytics metrics about the ease of use of the shopping application 560 and/or retail management system 210, among other potential applications. For an example, an in-store employee notification may be generated if a customer exhibits signs of being confused or is acting suspiciously so that employees may be notified and directed to the person. The in-store or employee notification may include in-store location information about the customer and optionally in-store navigation information and/or image(s) of the customer and/or detected action generated from the sensor data. For an example, an in-store customer notification may comprise a real-time promotion for complementary or suggested products based on purchase history, etc. For another example, an in-store customer notification may comprise a direct notification between the customer and an employee such as, for example, a notification from a customer in a changing room asking for an employee for another size. In-store product placement and disposition relates to analytics of customer movements and where customers expect products to be located to improve product conversion rates (e.g., sales). Customer movements in the form of detected actions may be used to determine whether the retailer may improve product placement and store layout, for example, by recommending which products to put at the front of the store based on shopping trends, season, etc.

At operation 836, the computer vision system 230 determines an item 103 associated with each detected action based on an inventory storage location at which the detected action occurred from sensor data, including video, captured by sensors 204, including cameras 104, in the retail environment 100 and a planogram of the retail environment. The item associated with each detected action is determined based on an identification of an inventory storage area and an identification of a product area in the inventory storage area performed by computer vision.

At operation 838, the virtual inventory of the physical shopping container is updated based on each detected action and the associated item. In some examples, updating the virtual inventory of the physical shopping container comprises adding the item to the virtual inventory of the physical shopping container in response to detection of an item being added to the physical shopping container, and removing the item from the virtual inventory of the physical shopping container in response to detection of an item being removed from the physical shopping container.

A confidence score (also known as a probability or likelihood) of each detected action and the item associated with each detected action may be determined in some examples. The confidence score may be determined and stored in memory along with the respective action. The virtual inventory of the physical shopping container is only updated based on each detected action and the associated item in response to a determination that the confidence score exceeds a confidence threshold (i.e., probability threshold), for example, in response to the confidence score exceeding a confidence threshold of 50% or more, 60% or more, etc. The confidence threshold may be configurable.

A confidence score that the virtual inventory of the physical shopping container does not match the inventory of the electronic shopping cart may be determined in some examples. An alert is only generated in response to a determination that the confidence score exceeds a confidence threshold.

In at least some examples, the computer vision system 230 has been trained by artificial intelligence or machine learning. In some examples, the computer vision system 230 comprises a trained neural network.

Figure 9:
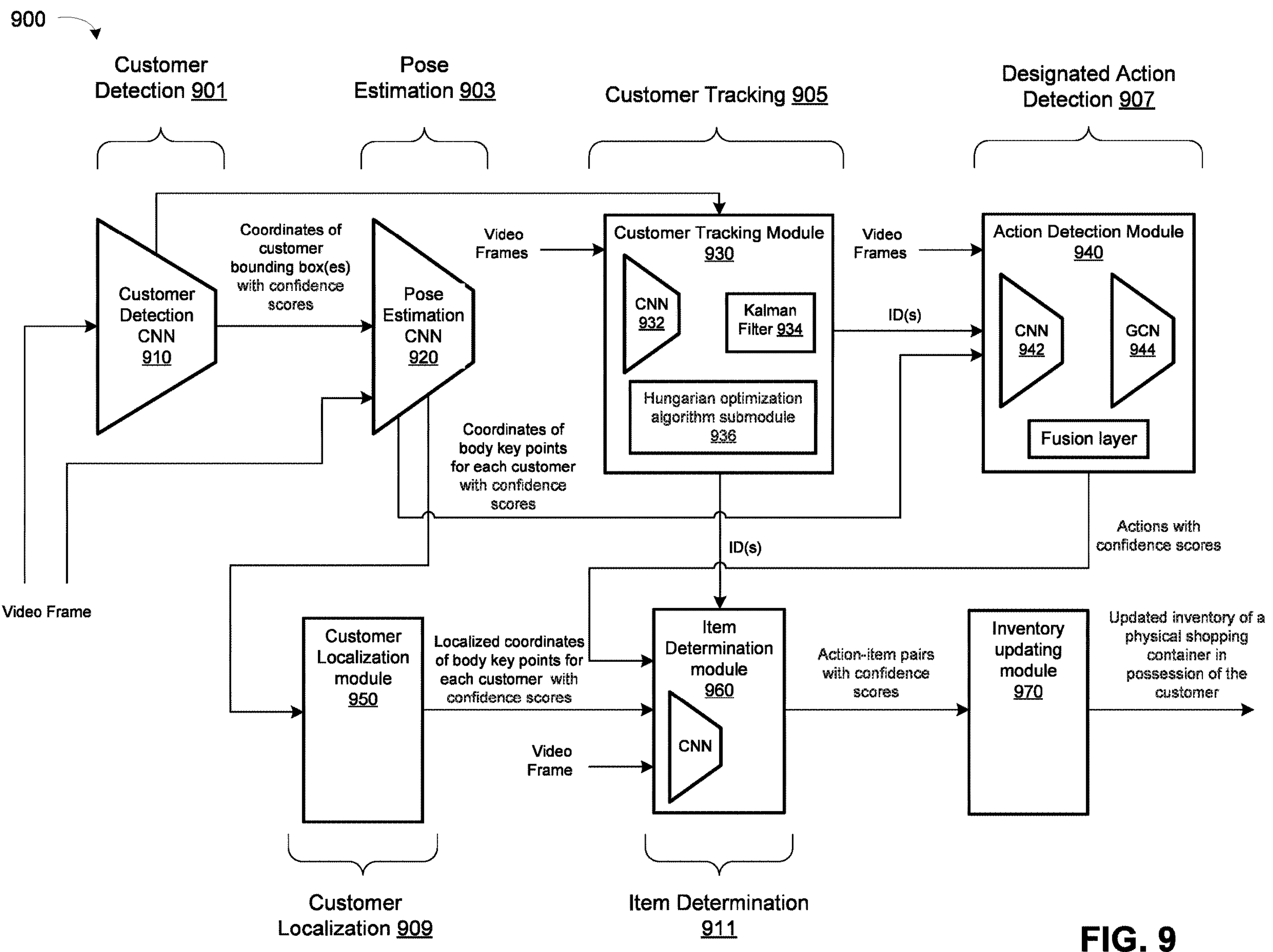
FIG. 9 is a schematic block diagram of a computer vision system comprising one or more neural networks for maintaining a virtual inventory of the physical shopping container in possession of users in accordance with an embodiment of the present disclosure.
Figure 10:
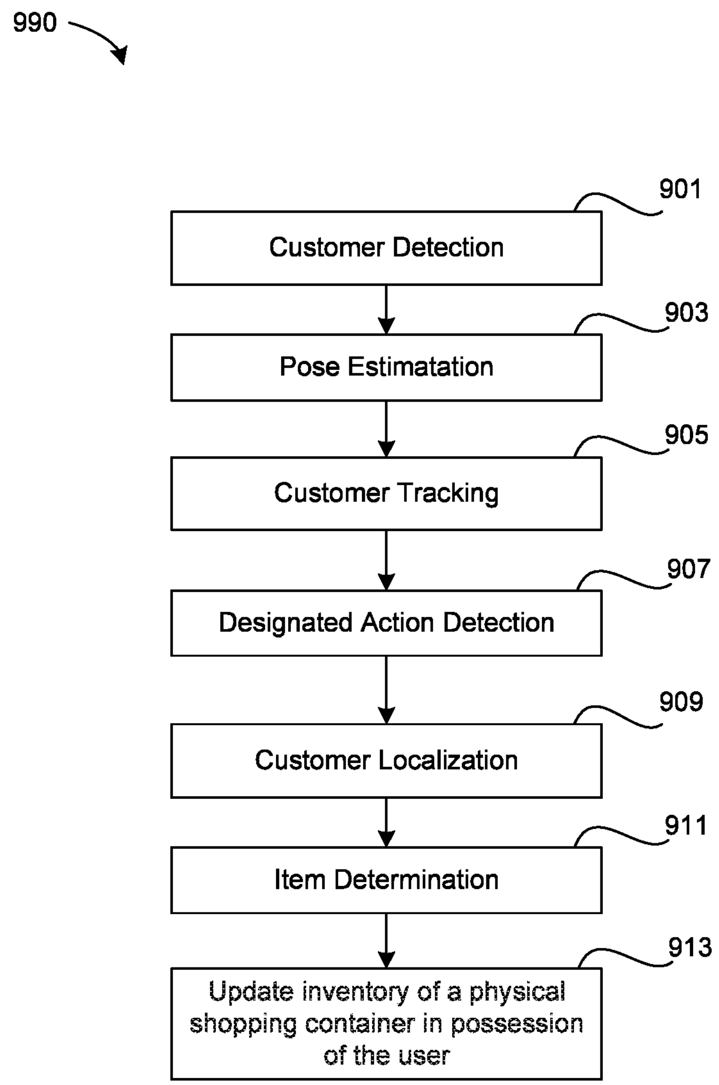
FIG. 10 is a flowchart of a method of maintaining a virtual inventory of the physical shopping container in possession of users in accordance with a second embodiment of the present disclosure.

FIG. 9 is a schematic block diagram of a computer vision system 900 comprising a number of functional software modules, referred to individually by references 910, 920, 930, 940, 950, 960 and 970, which, in response to execution by one or more processors of a computing device or system, cooperate to perform a method 990 of maintaining a virtual inventory of the physical shopping container in possession of users in accordance with a second embodiment of the present disclosure shown in FIG. 10 and described more fully below. The computer vision system 900 is an example of the computer vision system 230 of the retail management system 210. It will be appreciated that computer vision-based determining operations may comprise recognizing operations.

As described more fully below, at least some of the software modules of the computer vision system 900 may comprise one or more neural networks (NNs). Each NN may comprise one or more subnetworks ("subnets"), which may in turn comprise one or more NNs. The NNs may be CNNs, in particular deep CNNs, that are individually configured, by training to perform one or more steps or actions in the method 990 of maintaining the virtual inventory. The individual NNs of the system 900 are trained separately via appropriate methods, the details of which are described more fully below. The computer vision system 900 is connected to the cameras 104 located in the retail environment 100, by one or more of a wired or wirelessly communication path. The computer vision system 900 is also connected to the the retail management system 210 (FIG. 2). The computer vision system 900 may be located on-site or remotely from the retail environment 100.

A first neural network, which in the present embodiment is a customer detection CNN 910, is connected to and receives video frames from a video feed of each camera (e.g., video camera) 104 in the retail environment 100. As noted above, the retail environment 100 has a plurality of cameras 104, each camera 104 in the plurality of cameras 104 being uniquely located such that each camera 104 in the plurality of cameras 104 has a unique viewing angle, unique perspective and unique FOV of a portion of the retail environment 100. The FOV of the cameras 104 is preferably overlapping to account for occlusions in the retail environment 100 resulting from retail items, shelving units, bins, tables and other inventory storage locations, signage, lightning, and other obstacles. In addition, customers may face away from the cameras 104, which makes action detection more difficult from some angles. The amount of overlap between the cameras 104 depends on the store plan, fiscal budget and computing resources (more overlap results in more cameras and more processing).

The cameras 104 encode the captured video with metadata. The metadata comprises a timestamp including a date and time the video as captured. The timestamp of the video captured by each of the cameras 104 is synchronized using a common clock, such as a real-time clock of the retail management system 210, so that images captured by the cameras 104 at the same time have the same timestamp. Alternatively, the clock may be part of the processors of the computer vision system 900. The metadata may also comprise identifying information about the camera 104 and camera settings such as aperture, shutter speed, ISO (International Standards Organization) number, focal depth, dots per inch (DPI), etc. Other automatically generated metadata include the camera brand and model.

The customer detection CNN 910 is configured to perform customer detection 901 by processing video frames from a video feed of a camera 104. Each frame from each camera 104 is processed individually to detect one or more customers in the frame using an object detection algorithm such as the YOLO algorithm noted above. The customer detection CNN 910 may be configured in accordance with a suitable CNN from one of the state-of-the-art single-stage object detectors such as those described, for example, by Zheng Ge, Songtao Liu, Feng Wang, Zeming Li and Jian Sun in *YOLOX: Exceeding YOLO Series* in 2021, arXiv: 2107.08430, 6 Aug. 2021, Chien-Yao Wang, Alexey Bochkovskiy and Hong-Yuan Mark Liao in *YOLOv7: Trainable bag-of-freebies sets new state-of-the-art for real-time object detectors*, arXiv: 2207.02696, 6 Jul. 2022, or Chien-Yao Wang, I-Hau Yeh, and Hong-Yuan Mark Liao in *You Only Learn One Representation: Unified Network for Multiple Tasks*, arXiv: 2105.04206, 10 May 2021, the content of which is incorporated herein by reference. Implementation configurations and details for YOLOX in the PyTorch framework, including pretrained weights, may be found at https://github.com/open-mmlab/mmdetection/tree/master/configs/yolox, the content of which is incorporated herein by reference. A dataset for training YOLOX, referred to as the COCO dataset, is described by Tsung-Yi Lin, Michael Maire, Serge Belongie, Lubomir Bourdev, Ross Girshick, James Hays, Pietro Perona, Deva Ramanan, C. Lawrence Zitnick and Piotr Dollár in *Microsoft COCO: Common Objects in Context*, arXiv: 1405.0312, 21 Feb. 2015, the content of which is incorporated herein by reference.

The customer detection CNN 910 detects customers in each frame, generates a bounding box for each customer detected in the frame (referred to as a customer bounding box), and outputs a set of coordinates (x, y, h, w) of each customer bounding box (referred to as "customer bounding box coordinates" or "customer coordinates"), where x, y are pixel coordinates of top left corner of the respective customer bounding box, and h, w are the height and width (in pixels) of the respective customer bounding box.

A second neural network, which in the present embodiment is a pose estimation (also known as pose determination) CNN 920, is connected to and receives video frames from a video feed of each camera (e.g., video camera) 104 in the retail environment 100. The pose estimation CNN 920 is also connected to and receives customer bounding box coordinates from the customer detection CNN 910. The pose estimation CNN 920 is configured to perform pose estimation 903 for each customer detected in the frame by processing the pixels inside the customer bounding boxes determined by the customer detection CNN 910. The content of each customer bounding box is obtained from the full frame and the respective customer bounding box coordinates, for example, via cropping the content of the full frame using the bound respective customer bounding box coordinates. The content of each customer bounding box is processed individually to determine coordinates of body key points (such as key joints) of each customer in the frame using the top-down pose estimation approach. In other words, pose estimation is performed for each detected customer individually. The top-down pose estimation approach involves first localizing customers (which is achieved in the previous step by the customer detection CNN 910) and then estimating the body key points. The pose estimation CNN 920 may be configured in accordance with a suitable CNN-based pose estimator such as that described in High-Resolution Net (HRNet) by Ke Sun, Bin Xiao, Dong Liu and Jingdong Wang in *Deep High-Resolution Representation Learning for Human Pose Estimation*, arXiv: 1902.09212, 25 Feb. 2019, the content of which is incorporated herein by reference. The pose estimation CNN 920 outputs the coordinates of body key points and their confidence scores. Implementation configurations, pretrained weights, and details for HRNet may be found at https://github.com/open-mmlab/mmpose and https://mmpose.readthedocs.io/en/v0.28.0/papers/datasets.html#topdown-heatmap-hrnet-on-mpii, the content of which is incorporated herein by reference. A dataset for training HRNet is the MPII dataset is described by Mykhaylo Andriluka, Leonid Pishchulin, Peter Gehler and Bernt Schiele, 2D Human Pose Estimation: New Benchmark and State of the Art Analysis, 2014 IEEE Conference on Computer Vision and Pattern Recognition, 23-28 Jun. 2014, DIO10.1109/CVPR.2014.471, https://openaccess.thecvf.com/content_cvpr_2014/papers/Andriluka_2D_Human_P ose_2014_CVPR_paper.pdf, the content of which is incorporated herein by reference. The MPII dataset has 16 key points for each person.

Alternatively, in other embodiments the pose estimation CNN 920 is configured to perform pose estimation 903 for each customer in the frame by processing a full frame from a video feed of a camera 104 in the retail environment 100 without first localizing humans or generating customer coordinates output from the customer detection CNN 910. In such embodiments, the customer detection CNN 910 is omitted. The pose estimation CNN 920 receives a frame and performs pose estimation using a bottom-up pose estimation algorithm. The bottom-up pose estimation algorithm directly estimates pose (body key points) of multiple customers in the frame without previously performing customer detection, determining customer bounding boxes or cropping the content of customer bounding boxes from the full frame. This bottom-up estimation approach receives the full frame, instead of cropped portions of it, and estimates the pose for all the customers in the frame. In this alternative embodiment, the pose estimation CNN 920 may be configured in accordance with a suitable CNN-based bottom-up pose estimator such as that described by Zigang Geng, Ke Sun, Bin Xiao, Zhaoxiang Zhang and Jingdong Wang in *Bottom-Up Human Pose Estimation Via Disentangled Keypoint Regression*, arXiv: 2104.02300, 6 Apr. 2021, the content of which is incorporated herein by reference.

A customer tracking module 930 is connected to and receives video frames from a video feed of each camera (e.g., video camera) 104 in the retail environment 100. The customer tracking module 930 is also connected to and receives customer bounding box coordinates from the customer detection CNN 910. The content of each customer bounding box is also obtained from the full frame and the respective customer bounding box coordinates, for example, via cropping the content of the full frame using the bound respective customer bounding box coordinates.

The customer tracking module 930 is configured to perform tracking 905 for each customer throughout the video by processing the customer bounding box coordinates received from the customer detection CNN and the content inside the bounding boxes in a sequence of video frames consisting of the current frame and one or more previous frames using a multi-object tracking by detection algorithm with an appearance model and a motion model. Examples of suitable multi-object tracking detection algorithms with an appearance model and a motion model including *DeepSORT* described by Nicolai Wojke, Alex Bewley and Dietrich Paulus in *Simple Online and Realtime Tracking with a Deep Association Metric*, arXiv: 1703.07402, 21 Mar. 2017, *Tracktor* described by Philipp Bergmann, Tim Meinhardt and Laura Leal-Taixe in Tracking without bells and whistles, arXiv: 1903.05625, 17 Aug. 2019, and *JDE* described by Zhongdao Wang, Liang Zheng, Yixuan Liu, Yali Li and Shengjin Wang in *Towards Real-Time Multi-Object Tracking*, arXiv: 1909.12605, 14 Jul. 2020, the content of these documents being incorporated herein by reference. Implementation configurations and details for the Tracktor CNN, in the PyTorch framework, may be found at https://github.com/open-mmlab/mmtracking/tree/master/configs/mot/tracktor, the content of which is incorporated herein by reference.

The DeepSORT, Tracktor and JDE algorithms noted above have some differences, but all follow the same core principles to assign a unique tracking ID to each customer. Tracking by detection algorithms are first initialized with the customer bounding boxes in a first video frame in the sequence of video frames. A unique ID is assigned to each detected customer during the initialization. Then, for each subsequent frame in the sequence of video frames, the customer bounding boxes is propagated from the previous frame(s) to the subsequent frame using a motion model. Additionally, an appearance model encodes the appearance of the content inside the customer bounding boxes of each video frame in the sequence of video frames. Next, each propagated customer bounding box (estimated/determined by the motion model) is assigned to one of the customer bounding boxes detected in the customer detection operation 901 by the customer detection CNN 910 by minimizing a cost matrix using an optimization algorithm which may vary depending on the approach utilized. The cost matrix is defined based on the motion and appearance of propagated and detected customer bounding boxes.

Finally, any customer bounding box in the current frame that is assigned to a propagated bounding box from the previous frame(s), is assigned the same ID as the propagated bounding box. This essentially allows the computer vision system 900 to track customer bounding boxes throughout the sequence of video frames. If a propagated customer bounding box is not assigned to any newly detected customer bounding box for a certain number of frames (which may be configured), the algorithm stops tracking that customer bounding box. Conversely, if a new detected customer bounding box is not assigned to any propagated customer bounding box from the previous frame(s) for more than a threshold number of frames (which may be configured), it will be considered as a new customer and is assigned a new ID.

The customer tracking module 930 has three main components: a CNN 932, a Kalman filter 934, and a Hungarian optimization algorithm submodule 936. The CNN 932 applies the appearance model and generates and outputs a feature vector for each detected customer. The Kalman filter 934 is an algorithm that estimates/determines any variable, in the present disclosure the speed and location of bounding boxes, based on a previous values of that variable. The Kalman filter 934 applies the motion model and generates and outputs an estimated customer bounding box coordinate in the current frame for each detected customer. The Hungarian optimization algorithm submodule 936 receives the output of the CNN 932 (the appearance model) and the output of the Kalman filter 934 (the motion model) and solves an optimization problem, the output of which are the matched bounding boxes and the cost of matching them. The output of the CNN 932 are high-level features and the output of the Kalman filter 934 is the estimation of the next location of bounding boxes based on previous locations in the form of probability distributions. The CNN 932 and Kalman filter 934 operate separately, optionally in parallel. The Hungarian optimization algorithm submodule 936 applies the Hungarian algorithm, described more fully below, that is a combinatorial optimization algorithm which is used to solve the assignment problem between all the detected (or propagated) customer bounding boxes between the current and previous frames. By solving the assignment problem, the Hungarian algorithm determines which customer bounding boxes from previous and current frames should have the same ID. In other words, the Hungarian algorithm matches the detected customer bounding boxes from the previous frames with the detected customer bounding boxes of the new frames and the tracking algorithm assigns the matching detected customer bounding boxes the same ID.

The CNN 932, which encodes the appearance model, uses the content of each customer bounding box from the current frame and one or more previous frames. The algorithm may work with one previous frame, however more previous frames increase accuracy and the expense of increased computational cost and reduced speed. The maximum number of frames may be set based on a minimum acceptable speed and/or the maximum computational resources that may be allocate to this step. In some examples, the number of previous frames that are used by the appearance model is 10. This number of frames has been found to be effective at customer tracking while limiting the use of processing resources. The number of previous frames may vary and may be configurable. The CNN 932 of the customer tracking module 930 is configured to obtain the content of each customer bounding box from the full frame and the respective customer bounding box coordinates, for example, via cropping the content of the full frame using the bound respective customer bounding box coordinates. The CNN 932 is configured to extract high-level features from the content of the customer bounding boxes in the current frame and the previous frame(s). The CNN 932 outputs a feature vector for each detected customer.

The CNN 932 may be a Residual Network (ResNet), such as ResNet50 configured as described by Kaiming He, Xiangyu Zhang, Shaoqing Ren and Jian Sun in *Deep Residual Learning for Image Recognition*, arXiv: 1512.03385, 10 Dec. 2015, the content of which is incorporated herein by reference. The ResNet50 CNN may be trained on a large-scale person re-identification dataset such as MOT20 described by Patrick Dendorfer, Hamid Rezatofighi, Anton Milan, Javen Shi, Daniel Cremers, Ian Reid, Stefan Roth, Konrad Schindler and Laura Leal-Taixé in *MOT20: A benchmark for multi object tracking in crowded scenes*, arXiv: 2003.09003, 19 Mar. 2020, the content of which is incorporated herein by reference.

The computer vision system 900 may need to track customers in multiple cameras 104 and so uses a mechanism to re-identify customers if they leave the FOV of one camera 104 and enter the FOV of another camera 104. In addition, if the same customer is image by multiple cameras 104 at the same time, the computer vision system 900 may need to determine that the customer in the video frame of the multiple cameras 104 is the same person. These operations are done with the CNN 932, which may be configured to match detected customers in multiple cameras 104 in case of overlapping FOVs or re-identify customers when walking from the FOV of one camera 104 and enter the FOV of another camera 104. More details about the implementation of ResNet50 as the appearance model of the tracking module 930 may be found at https://github.com/open-mmlab/mmtracking, and pretrained weights may be found at https://download.openmmlab.com/mmtracking/mot/reid/reid_r50_6e_mot20_20210803_212426-c83b1c01. pth.

The Kalman filter 934, which encodes the motion model, receives as input the coordinates of detected customer bounding boxes in the current frame and one or more previous frames. In some examples, the number of previous frames that are used by the motion model is 100. This number of frames has been found to be effective at customer tracking while limiting the use of processing resources. The number of previous frames may vary and may be configurable. A constant velocity is assumed between two consecutive frames for each customer. The motion model estimates the current location of a customer bounding box based on its previous locations in previous frames. The Kalman filter 934 is used to recursively improve the estimated location of customer bounding boxes by considering the noise of the previous detections, the confidence score of the previous detections, and the noise of the constant velocity model. Kalman filters are described by Rudolph Emil Kalman in *A New Approach to Linear Filtering and Prediction Problems*, Transactions of the ASME, Journal of Basic Engineering, Volume 82, Series D, Pages 35-45, 1960, the content of which is incorporated herein by reference. The output of the Kalman filter 934 is an estimated customer bounding box coordinate in the form of probability distributions in the current frame for each detected customer. Although a constant velocity is assumed in the described example, a measured speed/velocity of the customer obtained by a motion (or speed) camera or other speed/velocity sensor may be used in other embodiments.

The Hungarian optimization algorithm submodule 936 receives the outputs of the CNN 932 (the appearance model) and the Kalman filter 934 (the motion model), which constructs or generates a cost matrix using an appearance cost matrix and a motion cost matrix. The appearance cost matrix is constructed using a cosine similarity (See, for example, https://en.wikipedia.org/wiki/Cosine_similarity, the content of which is incorporated herein by reference) between CNN features extracted by the motion model from content of bounding boxes in the current and previous frame(s). The motion cost matrix is constructed using the Mahalanobis distance (See, for example, https://en.wikipedia.org/wiki/Mahalanobis_distance, the content of which is incorporated herein by reference) between the estimated and observed motion information of each detected customer. The Hungarian optimization algorithm is used to solve an assignment problem by minimizing the total cost matrix. The Hungarian optimization algorithm is described by H. W. Kuhn in *The Hungarian method for the assignment problem*, Naval Research Logistics Quarterly, Volume 2, Issue 1-2, March 1955, Pages 83-97, https://doi.org/10.1002/nav.3800020109, the content of which is incorporated herein by reference. The output of the Hungarian optimization algorithm submodule 936 is matched bounding boxes and the cost of matching them. As noted above, the cost is defined based on the motion and appearance of propagated and detected customer bounding boxes.

As noted above, any customer bounding box in the current frame that is assigned to a propagated bounding box from the previous frame(s), is assigned the same ID as the propagated bounding box. This essentially allows the computer vision system 900 to track customer bounding boxes throughout the sequence of video frames. If a propagated customer bounding box is not assigned to any newly detected customer bounding box for a certain number of frames (which may be configured), the algorithm stops tracking that customer bounding box. Conversely, if a new detected customer bounding box is not assigned to any propagated customer bounding box from the previous frame(s) for more than a threshold number of frames (which may be configured), it will be considered as a new customer and is assigned a new ID. The output of the customer tracking module 930 is a set of IDs for pixel coordinates in the current frame.

Alternatively, in other embodiments the customer tracking module 930 may track customers based on the coordinates of their body key points which is estimated by the pose estimation CNN 920. In such embodiments, the coordinates of customer bounding boxes and appearance encoding are not used anymore. The customer tracking module 930 receives as input body key points of the current frame and one or more previous frame(s) and predicts which two poses temporally follow each other. The customer tracking module 930 may be configured based on *KeyTrack* described by Michael Snower, Asim Kadav, Farley Lai and Hans Peter Graf in 15 *Keypoints Is All You Need*, arXiv: 1912.02323, 13 Mar. 2020, the content of which is incorporated herein by reference. The KeyTrack algorithm uses transformer networks as described by Ashish Vaswani, Noam Shazeer, Niki Parmar, Jakob Uszkoreit, Llion Jones, Aidan N. Gomez, Lukasz Kaiser, and Illia Polosukhin in *Attention Is All You Need*, rXiv: 1706.03762, 6 Dec. 2017, the content of which is incorporated herein by reference. Alternatively, the customer tracking module 930 may be configured based on LightTrack, which uses a Siamese Graph Convolution Network (SGCN) and is described by Guanghan Ning and Heng Huang in *LightTrack: A Generic Framework for Online Top-Down Human Pose Tracking*, arXiv: 1905.02822, 7 May 2019, the content of which is incorporated herein by reference.

An action detection module 940, which comprises a CNN 944 and a Graph Convolutional Neural Network (GCN) 944, is configured to perform designated action detection of 907 for each customer in the frame by processing the content of customer bounding boxes and body key point coordinates for each customer for a sequence of video frames. Customers in the video frames are localized with their customer bounding box coordinates using the customer detection CNN 910 and are identified by an ID (e.g., customer ID) assigned by the customer tracking module 930. For every customer and every frame in the sequence of video frames, the action detection module 940 processes the content of the N latest extended bounding boxes (including the one in the current frame) and K latest body key point coordinates to detect the designated actions, wherein N and K are the number of latest extended bounding boxes and the number of latest body key point coordinates. In one example, wherein N and K are 16. An extended bounding box is the smallest box that encloses all the N latest customer bounding boxes regardless of customer displacement.

The action detection module 940 has two processing streams based on the two input types: a spatiotemporal stream and a pose stream, the output of which is connected by a fusion layer. The spatiotemporal stream comprises the CNN 942, which in the present embodiment is a 3D CNN for spatiotemporal feature extraction. The 3D feature extraction CNN receives as input the content of the N latest extended bounding boxes (including the content of the extended bounding box for the current frame) for each tracked customer obtained by the customer tracking module 930. The extended bounding boxes are obtained by cropping the full frames around the smallest boxes that contain all the N bounding boxes detected by the customer detection CNN 910 with the same ID. The N extended bounding boxes are stacked on each other and fed to the 3D feature extraction CNN. The 3D CNN outputs a feature vector with encoded motion and appearance information.

The 3D feature extraction CNN may be configured based on MoViNets described by Dan Kondratyuk, Liangzhe Yuan, Yandong Li, Li Zhang, Mingxing Tan, Matthew Brown and Boqing Gong *in MoViNets: Mobile Video Networks for Efficient Video Recognition*, arXiv: 2103.11511v2, 18 Apr. 2021, the content of which is incorporated herein by reference. The MoViNet implementation of the 3D feature extraction CNN 942 may be pretrained on Kinetics-600 dataset as described by Joao Carreira, Eric Noland, Andras Banki-Horvath, Chloe Hillier and Andrew Zisserman in *A Short Note about Kinetics*-600, arXiv: 1808.01340, 3 Aug. 2018, the content of which is incorporated herein by reference. The MoViNet implementation of the CNN 942 may be fine-tuned, or alternately trained, using the NTU-RGBD dataset, available at https://rose1. ntu.edu.sg/dataset/action-Recognition/. Implementation configurations, and details for the MoViNet implementation of the CNN 942 in the PyTorch framework, including pretrained weights, may be found at https://github.com/Atze00/MoViNet-pytorch, the content of which is incorporated herein by reference.

The pose stream comprises the GCN 944 for feature extraction. For each ID assigned by the customer tracking module 930, the GCN receives as input a sequence of body key point coordinates from the pose estimation CNN 920. The GCN 944 outputs a feature vector with encoded motion information. The GCN 944 may be configured based on the Spatio-Temporal Graph Convolutional Network (ST-GCN) described by Sijie Yan, Yuanjun Xiong and Dahua Lin in *Spatial Temporal Graph Convolutional Networks for Skeleton-Based Action Recognition*, arXiv: 1801.07455, 25 Jan. 2018, the content of which is incorporated herein by reference. Implementation configurations, pretrained weights, and details for ST-GCN in the PyTorch framework may be found at https://github.com/open-mmlab/mmskeleton/blob/master/doc/START_RECOGNITION.md, the content of which is incorporated herein by reference. If the GCN 944 is pretrained on an action recognition dataset with a different number of pose key points than the output of pose estimation CNN 920, a custom pose-based action recognition dataset may be prepared using CNN 920 to fine-tune the GCN 944. The fine-tuning dataset may be Kinetics-600 dataset.

Alternatively, the GCN 944 may be configured based on the Adaptive Graph Convolutional Network (AGCN) described by Lei Shi, Yifan Zhang, Jian Cheng and Hanqing Lum in Two-Stream Adaptive Graph Convolutional Networks for Skeleton-Based Action Recognition, CVPR 2019, https://openaccess.thecvf.com/content_CVPR_2019/papers/Shi_Two-Stream_Adaptive_Graph_Convolutional_Networks_for_Skeleton-Based_Action_Recognition_CVPR_2019_paper.pdf, 2019, the content of which is incorporated herein by reference.

The feature vectors from the 3D feature extraction CNN 942 in the spatiotemporal stream and the GCN 944 in the pose stream are concatenated and given as the input to a fusion layer (or block) comprising a few layers of fully connected or convolutional layers. The fusion layer concatenates pre-softmax outputs from each of the 3D feature extraction CNN 942 and the GCN 944 via a concatenate block and fuses these accumulated features to generate an output through a reparameterized fully connected layer. The fusion layer outputs actions and confidence scores associated therewith for all customers in the frame. In some examples, the fusion layer is implemented in the PyTorch framework and is fully trained on Kinetics-600 dataset using a loss function of negative log-likelihood. In some examples, the training of the action detection module 940, i.e. the combined neural network of the 3D feature extraction CNN 942, GCN 944, and fusion layer, is fine-tuned using proprietary of a video of a retail environment 100 or a mock-up thereof.

A customer localization module 950 is configured to perform customer localization 909 using camera parameters, such as intrinsic, extrinsic and lens distortion parameters, and pixel coordinates of customer body key points estimated by the pose estimation CNN 920 which performs pose estimation from one or more camera 104. Preferably, a single frame from multiple cameras 104 at the same timestamp is used in which the same customer is captured/imaged. The camera parameters may be used to locate objects in real world 3D coordinates based on their image coordinates. As described more fully below, the camera parameters may be determined using calibration software such as Camera Calibrator from MathWorks, available at https://www.mathworks.com/help/vision/ref/cameracalibrator-app.html, the content of which is incorporated herein by reference.

The coordinates of body key points are converted from image 2D coordinate system to 3D world coordinate system using camera intrinsic and extrinsic matrices as described, for example, by Zhengyou Zhang in *A Flexible New Technique for Camera Calibration*, Technical Report MSR-TR-98-71, Dec. 2, 1998, https://www.microsoft.com/en-us/research/wp-content/uploads/2016/02/tr98-71. pdf, the content of which is incorporated herein by reference. Camera intrinsic and extrinsic matrices may be estimated using camera calibrator software, such as Camera Calibration toolbox for MATLAB, described by Bouguet, J.-Y., in Camera Calibration Toolbox for Matlab (Version 1.0), [Computer software], CaltechDATA, https://doi.org/10.22002/D1.20164, the content of which is incorporated herein by reference, or the calibration function from Open Source Computer Vision library (OpenCV) as described by Bradski, G., The OpenCV Library. *Dr. Dobb' s Journal of Software Tools,* 2000, the content of which is incorporated herein by reference. These calibrators estimate the intrinsic and extrinsic parameters using calibration patterns (e.g., checkboard patterns) with known dimensions in world coordinates. The checkboard patterns may be downloaded and printed out for calibration from, for example, the following https://markhedleyjones.com/projects/calibration-checkerboard-collection, the content of which is incorporated herein by reference. The customer localization module 950 outputs 3D real world coordinates of body key points (such as joints, in particular hand joints).

An item determination module 960 is configured to perform item determination 911 in which an item associated with a designated action and the involving customer are determined. The item determination module 960 may comprise a CNN for object detection and/or object retrieval. The input to the item determination module 960 comprises customer actions, their confidence scores, and their timestamps obtained from the action detection module 940, as well as customer locations obtained from the customer localization module 950, customer body key points estimated by the pose estimation CNN 920 and the full frames. Customers are associated with digital carts when they start a new session in the shopping application 560. This is done by having customers start sessions individually, for example using NFC, detecting the customer who is trying to start a session through the customer detection CNN 910 and the action detection module 940, and pairing them with a new session. The customer-cart pairs are then tracked until the customers leave the retail environment 100 (e.g., store) using the customer tracking module 930. When a customer scans an item 103, the search space for the item 103 will be limited to an area (e.g., a fixed size box) around the customer's hand key points which are estimated with the pose estimation CNN 920.

In some retail environments 100 (e.g., stores) scanned items 103 in the shopping application 560 are associated with a sample picture of the product. If the inventory database 225 does not include images by default, a merchant or store website may be used to retrieve item images by product name. If the merchant or store website does not have product images, the videos may be used to obtain images of the products and generate a planogram of the store at the same time. This is a semi-automatic process as it requires manual specification of product inventory areas initially. Computer vision may then extract useful features from each inventory storage area using a suitable CNN-based feature extractor, such as ResNets, and re-identify items 103 if the items are subsequently relocated. The manual process is only required again for new items 103. Once product images are available, item texture, color, and pattern may be used to re-identify the items in an area around customer's hand key points. This is a simpler problem than direct product detection as it does not require training data for the specific products. To further improve the accuracy, customer's location may be compared to the store planogram. This will limit the search space to products that are known to be located near the customer. The association is validated (and revised if necessary), every time a new event is detected through the shopping application 560, or a new designated action is detected with the action detection module 940. For a customer-cart pair to be valid, the history of scanning events from the shopping application 560 (e.g., scanned items, event timestamps, event locations) should match the history of customer's virtual inventory (e.g., scanned items, scanning action timestamps, scanning action locations) obtained with computer vision.

The inventory updating module 970 receives action and item pairs with confidence scores for each action and for each item in each respective pair, and updates the virtual inventory of the physical shopping container in response to a determination that both the confidence score of an action in the set of actions having the highest confidence score exceeds an action confidence threshold and the confidence score of an item in the set of items having the highest confidence score exceeds an item confidence threshold. Updating the virtual inventory of the physical shopping container comprises one of adding the item having the highest confidence score to the virtual inventory of the physical shopping container in response to detection of an item being added to the physical shopping container or removing the item having the highest confidence score from the virtual inventory of the physical shopping container in response to detection of an item being removed from the physical shopping container. The action confidence threshold and item confidence threshold may be the same or different. For example, the item confidence threshold may be lower than the action confidence threshold to accommodate instances in which there is a high confidence that an action has been added or remove but a low confidence as to what the item is. The action confidence threshold and item confidence threshold are typically 50% or more, and may be configurable.

FIG. 10 is a flowchart of a method 990 of maintaining a virtual inventory of the physical shopping container in possession of users in accordance with a second embodiment of the present disclosure. The method 990 is performed at least in part by the computer vision system 900 described above in connection with FIG. 9.

At operation 901, the computer vision system 900 performs customer detection by processing video frames from a video feed of a camera 104. Each frame from each camera is processed individually to detect one or more customers in the frame using an object detection algorithm such as the YOLO algorithm noted above. Each detected customer is associated with an inventory of an electronic shopping cart of the shopping application 560. This association can be determined in one of many ways and potentially at different times, depending on the implemented method. This is done by having customers start sessions individually, for example using NFC, detecting the customer who is trying to start a session through the customer detection CNN 910 and the action detection module 940, and pairing them with a new session.

At operation 903, the computer vision system 900 performs pose estimation for each customer detected in the frame as described above.

At operation 905, the computer vision system 900 performs customer tracking for each customer in the frame as described above. As part of the operation 905, a customer ID is assigned to each customer bounding box detected in step 901.

At operation 907, the computer vision system 900 performs designated action detection for each customer in the frame as described above, the output of which is a set of actions and confidence scores associated therewith, for all customers in the frame.

At operation 909, the computer vision system 900 performs customer localization 909 in which pixel coordinates are converted from relative coordinates to 3D "real world" which are output.

At operation 911, the computer vision system 900 performs item determination in which an item associated with set of actions is determined, the output of which is a set of items and confidence scores associated therewith, for all customers in the frame.

At operation 913, the computer vision system 900 updates the virtual inventory of the physical shopping container in response to a determination that both the confidence score of an action in the set of actions having the highest confidence score exceeds an action confidence threshold and the confidence score of an item in the set of items having the highest confidence score exceeds an item confidence threshold. Updating the virtual inventory of the physical shopping container comprises one of adding the item having the highest confidence score to the virtual inventory of the physical shopping container in response to detection of an item being added to the physical shopping container or removing the item having the highest confidence score from the virtual inventory of the physical shopping container in response to detection of an item being removed from the physical shopping container.

Alternatives

In the above-described embodiments, a single type of detection zone 107 is provided in the retail environment 100 although there may be more than one detection zone 107 in the retail environment 100. In other embodiments, there may be two types of a detection zones: A first detection zone and a second detection zone. The second detection zone is located in front of, and surrounding, an entrance/exit 105 which functions like the detection zones 107 described above. The first detection zone is located inward on an inside of the second detection zone relative to the retail environment 100. A first detection zone may be immediately beside or adjacent to a second detection zone or spaced apart therefrom depending on the layout of the retail environment 100. The first detection zone may be, or comprise, a checkout or cashier zone (area) of the retail environment 100 depending on the system configuration and store layout. The second detection zones located in front of, and surrounding, the entrances/exits 105 may be smaller than the first detection zones.

In response to a cart being s alarmed and an alert being triggered while the user and/or physical shopping container is in a first detection zone of the retail environment 100, an electronic alert is generated for the user, the electronic alert including a reminder to checkout. The reminder may include a Checkout button for checking out. An electronic alert for the merchant may also be generated. In response to a cart being alarmed and an alert being triggered while the user and/or physical shopping container is in a second detection zone of the retail environment, an audible generated by a speaker 132 in the retail environment 100 and/or a visual alert generated by a light 234 in the retail environment 100 is generated.

In the above-described embodiments, a security check is performed in response to a trigger. In other embodiments, the security check for each user/cart may be performed continuously or regularly, for example, every minute or other suitable interval. In such embodiments, an electronic alert/notification may be displayed on the wireless communication device 202 of a threshold duration after an item has been determined to have been added to the physical shopping container by a user if the item has not been added to the user's electronic shopping cart. For example, a countdown timer has a threshold duration (e.g., 30 seconds, 1 minute, etc.) may be triggered by detection of an item being added to the physical shopping container. The countdown timer is cancelled if the item has not been added to the user's electronic shopping cart. However, if item has not been added to the user's electronic shopping cart before the expiry of the countdown timer, an electronic alert/notification comprising a reminder to add the item to the user's electronic shopping cart may be displayed. The electronic alert/notification may be a window, dialog or other suitable VUI displayed on the display of the electronic alert/notification with the shopping application 560. The VUI may include a button to add the corresponding item to the electronic shopping cart and a button to ignore/dismiss the electronic alert/notification.

General

The foregoing description refers to a number of documents, datasets, programs/applications and code, the content of which is incorporated herein by reference in their entirety.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified, as appropriate.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only and are thus not limiting as to the types of memory usable for storage of a computer program.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present disclosure as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "database" may refer to either a body of data, a relational database management system (RDBMS), or to both. As used herein, a database may comprise any collection of data comprising hierarchical databases, relational databases, flat file databases, object-relational databases, object-oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples but should be given the broadest interpretation consistent with the description as a whole.

The invention claimed is:

1. A method performed by a computing device of maintaining virtual inventories of physical shopping containers in possession of persons in a retail environment, comprising:

maintaining, via data received by one or more wireless communication devices, an inventory of an electronic shopping cart of one or more users in a retail environment, wherein maintaining the inventory of the electronic shopping cart comprises adding and removing items from the inventory of each electronic shopping cart in response to inputs received via a visual user interface (VUI) of an electronic shopping application operating on a respective wireless communication device, wherein each user is associated with a respective electronic shopping cart in response to initiation of a session in the electronic shopping application via respective wireless communication device;

maintaining, via a sensor data collected by sensors in the retail environment, a virtual inventory of a physical shopping container in possession of the one or more users in the retail environment, maintaining the virtual inventory of the physical shopping container comprising:

detecting, via a computer vision system, each person in video captured by one or more cameras located in the retail environment, wherein each detected person is associated with a respective electronic shopping cart of the electronic shopping application and a respective inventory of the respective electronic shopping cart, wherein the electronic shopping cart is associated with an active session of a respective user;

determining, via the computer vision system, a pose of each detected person in the video from the respective coordinates of the detected person;

tracking, via the computer vision system, each detected person in the video;

determining, via the computer vision system, a set of actions associated with each detected person from the pose of the detected person in the video, wherein the set of actions comprise an action of placing an item in the physical shopping container and an action of removing an item from the physical shopping container, wherein a first set of confidence scores for the set of actions is output in response to determining the set of actions, one confidence score associated with each action in the set of actions;

localizing the coordinates of each detected person within the retail environment in a three-dimensional (3D) coordinate system using camera parameters;

determining, via the computer vision system, a set of items associated with the set of actions of each detected person based on an inventory storage location associated with the localized coordinates of the respective person within the retail environment and a planogram of the retail environment, wherein a second set of confidence scores for the set of items is output in response to determining the set of items, one confidence score associated with each item in the set of items; and updating the virtual inventory of the physical shopping containers for each detected person in response to a determination that, for the respective person, both the confidence score of an action in the set of actions having the highest confidence score exceeds an action confidence threshold and the confidence score of an item in the set of items having the highest confidence score exceeds an item confidence threshold;

performing a security check in response to a trigger, wherein performing a security check comprises determining whether the virtual inventory of the physical shopping container matches the inventory of the electronic shopping cart, wherein the trigger is one of one or more designated events, the one or more designated events comprising (i) receiving input from a wireless communication device of the user to perform an electronic checkout, or (ii) a determination that the user and/or physical shopping container is in a detection zone of the retail environment; and generating an alert in response to a determination that the virtual inventory of the physical shopping container does not match the inventory of the electronic shopping cart;

wherein an electronic checkout is not allowed to proceed in response to a determination that the virtual inventory of the physical shopping container does not match the inventory of the electronic shopping cart;

wherein the electronic checkout is allowed to proceed in response to a determination that the virtual inventory of the physical shopping container matches the inventory of the electronic shopping cart.

2. The method of claim 1, wherein updating the virtual inventory of the physical shopping container comprises one of:

adding the item having the highest confidence score to the virtual inventory of the physical shopping container in response to detection of an item being added to the physical shopping container; or removing the item having the highest confidence score from the virtual inventory of the physical shopping container in response to detection of an item being removed from the physical shopping container.

3. The method of claim 1, wherein updating the virtual inventory of the physical shopping container comprises:

in response to detection of an item being added to the physical shopping container, the item is added to the virtual inventory of the physical shopping container; and in response to detection of an item being removed from the physical shopping container, the item is removed from the virtual inventory of the physical shopping container.

4. The method of claim 1, wherein, in response to the trigger comprising receiving input from the wireless communication device of the user to perform an electronic checkout, the electronic checkout is not allowed to proceed in response to the generation of the alert.

5. The method of claim 1, wherein the detection zone is an entrance/exit zone of the retail environment.

6. The method of claim 1, wherein the one or more designated events further comprise (iii) detection of a radio frequency identification (RFID) tag by an RFID reader located in the detection zone of the retail environment.

7. The method of claim 1, wherein determining whether the virtual inventory of the physical shopping container matches the inventory of the electronic shopping cart comprises:

comparing items in the virtual inventory of the physical shopping container with the inventory of the electronic shopping cart; and determining any items in the virtual inventory of the physical shopping container that are not in the electronic shopping cart;

wherein a determination that virtual inventory of the physical shopping container does not match the inventory of the electronic shopping cart is made in response to a determination that one or more items in the virtual inventory of the physical shopping container are not in the electronic shopping cart.

8. The method of claim 1, wherein determining whether the virtual inventory of the physical shopping container matches the inventory of the electronic shopping cart comprises:

determining any items associated with an RFID tag in the virtual inventory of the physical shopping container;

comparing any items associated with an RFID tag in the virtual inventory of the physical shopping container with the inventory of the electronic shopping cart; and determining any items in the virtual inventory of the physical shopping container associated with an RFID tag that are not in the electronic shopping cart based on the comparing;

wherein a determination that the virtual inventory of the physical shopping container does not match the inventory of the electronic shopping cart is made in response to a determination that one or more items in the virtual inventory of the physical shopping container associated with an RFID tag are not in the electronic shopping cart.

9. The method of claim 1, further comprising:

determining a confidence score that the virtual inventory of the physical shopping container does not match the inventory of the electronic shopping cart;

wherein the alert is generated in response to a determination that the confidence score exceeds a confidence threshold.

10. The method of claim 1, wherein the alert comprises an audible alert generated via a speaker.

11. The method of claim 10, wherein the speaker is located in the detection zone of the retail environment.

12. The method of claim 1, wherein the alert comprises a visual alert generated via a light.

13. The method of claim 12, wherein the light is located in the detection zone of the retail environment.

14. The method of claim 1, wherein the alert comprises an electronic alert, wherein the electronic alert is an electronic message or notification sent to a local or remote communication device or an in-application notification.

15. The method of claim 1, wherein:

the computer vision system has been trained by artificial intelligence or machine learning; and/or the computer vision system comprises a trained neural network.

16. The method of claim 1, further comprising:

generating an alert in response to a determination that the virtual inventory of the physical shopping container matches the inventory of the electronic shopping cart while the user and/or physical shopping container is in the detection zone of the retail environment and the electronic shopping cart has an unpaid cart status.

17. The method of claim 1, wherein the item associated with each detected action is determined based on an identification of an inventory storage area and an identification of a product area in the inventory storage area performed by computer vision.

18. The method of claim 1, wherein each user is associated with a respective person detected in the video and a respective electronic shopping cart by: at a time of the initiation of a session by a user on a respective wireless communication device, detecting, via the computer vision system, each user as a respective person in the video; determining, via the computer vision system, that the respective person is performing an action of initiating a session in the electronic shopping application; and generating an association between data associated with the respective person detected in the video and the respective electronic shopping cart.

19. The method of claim 1, wherein the initiation of a session in the electronic shopping application occurs in response to detection, by a Near Field Communication (NFC) wireless transceiver of the wireless communication device of the respective user, of an NFC tag encoding a link to the electronic shopping application.

20. A computing device, comprising:

a processor;

a communication subsystem for communicating with one or more wireless communication devices and one or more sensors, the one or more sensors including one or more cameras; and a computer-readable medium having tangibly stored thereon executable instructions that, in response to execution by the processor, cause the computing device to maintain virtual inventories of physical shopping containers in possession of persons in a retail environment by:

maintaining, via data received by one or more wireless communication devices, an inventory of an electronic shopping cart of one or more users in a retail environment, wherein maintaining the inventory of the electronic shopping cart comprises adding and removing items from the inventory of each electronic shopping cart in response to inputs received via a visual user interface (VUI) of an electronic shopping application operating on a respective wireless communication device, wherein each user is associated with a respective electronic shopping cart in response to initiation of a session in the electronic shopping application via a respective wireless communication device;

maintaining, via a sensor data collected by the sensors in the retail environment, a virtual inventory of a physical shopping container in possession of the one or more users in the retail environment, maintaining the virtual inventory of the physical shopping container comprising:

detecting, via a computer vision system, each person in video captured by one or more cameras located in the retail environment, wherein each detected person is associated with a respective electronic shopping cart of the electronic shopping application and a respective inventory of the respective electronic shopping cart, wherein the electronic shopping cart is associated with an active session of a respective user;

determining, via the computer vision system, a pose of each detected person in the video from the respective coordinates of the detected person;

tracking, via the computer vision system, each detected person in the video;

determining, via the computer vision system, a set of actions associated with each detected person from the pose of the detected person in the video, wherein the set of actions comprise an action of placing an item in the physical shopping container and an action of removing an item from the physical shopping container, wherein a first set of confidence scores for the set of actions is output in response to determining the set of actions, one confidence score associated with each action in the set of actions;

localizing the coordinates of each detected person within the retail environment in a three-dimensional (3D) coordinate system using camera parameters;

determining, via the computer vision system, a set of items associated with the set of actions of each detected person based on an inventory storage location associated with the localized coordinates of the respective person within the retail environment and a planogram of the retail environment, wherein a second set of confidence scores for the set of items is output in response to determining the set of items, one confidence score associated with each item in the set of items; and updating the virtual inventory of the physical shopping containers for each detected person in response to a determination that, for the respective person, both the confidence score of an action in the set of actions having the highest confidence score exceeds an action confidence threshold and the confidence score of an item in the set of items having the highest confidence score exceeds an item confidence threshold;

performing a security check in response to a trigger, wherein performing a security check comprises determining whether the virtual inventory of the physical shopping container matches the inventory of the electronic shopping cart, wherein the trigger is one of one or more designated events, the one or more designated events comprising (i) receiving input from a wireless communication device of the user to perform an electronic checkout, or (ii) a determination that the user and/or physical shopping container is in a detection zone of the retail environment; and generating an alert in response to a determination that the virtual inventory of the physical shopping container does not match the inventory of the electronic shopping cart;

wherein an electronic checkout is not allowed to proceed in response to a determination that the virtual inventory of the physical shopping container does not match the inventory of the electronic shopping cart;

wherein the electronic checkout is allowed to proceed in response to a determination that the virtual inventory of the physical shopping container matches the inventory of the electronic shopping cart.

* * * * *